(12) United States Patent
Sevindik

(10) Patent No.: US 12,256,414 B2
(45) Date of Patent: *Mar. 18, 2025

(54) METHODS AND APPARATUS FOR MANAGING UPLINK RESOURCE GRANTS IN WIRELESS NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,019

(22) Filed: Nov. 20, 2023

(65) Prior Publication Data

US 2024/0089980 A1 Mar. 14, 2024

Related U.S. Application Data

(63) Continuation of application No. 17/180,761, filed on Feb. 20, 2021, now Pat. No. 11,825,485.

(51) Int. Cl.
*H04W 72/23* (2023.01)
*H04L 1/1829* (2023.01)
*H04W 72/1268* (2023.01)

(52) U.S. Cl.
CPC ........... *H04W 72/23* (2023.01); *H04L 1/1861* (2013.01); *H04W 72/1268* (2013.01)

(58) Field of Classification Search
None
See application file for complete search history.

(56) References Cited

U.S. PATENT DOCUMENTS

| | | | |
|---|---|---|---|
| 12,034,511 B2* | 7/2024 | Cirik | H04L 1/1848 |
| 2009/0238122 A1* | 9/2009 | Vukovic | H04W 72/53 |
| | | | 370/329 |
| 2013/0223397 A1* | 8/2013 | Kim | H04W 74/085 |
| | | | 370/329 |
| 2017/0311182 A1* | 10/2017 | Tenny | H04W 76/27 |
| 2018/0098349 A1* | 4/2018 | Sun | H04W 72/20 |
| 2018/0167976 A1* | 6/2018 | Wentink | H04W 74/0816 |
| 2020/0022160 A1* | 1/2020 | Zou | H04W 72/21 |
| 2024/0322891 A1* | 9/2024 | Cirik | H04W 72/046 |

* cited by examiner

*Primary Examiner* — Steve R Young
(74) *Attorney, Agent, or Firm* — Straub & Straub; Stephen T. Straub; Michael P. Straub

(57) ABSTRACT

The present invention relates to methods and apparatus for managing uplink resource grants in wireless networks. An exemplary method embodiment includes a mobile terminal: receiving from a base station a first uplink resource grant schedule including a first uplink resource grant and a second uplink resource grant, the first uplink resource grant giving the mobile terminal an exclusive right to use a first set of resource blocks on a recurring basis and the second uplink resource grant giving the mobile terminal a non-exclusive right to use a second set of resource blocks on a recurring basis; and using, by the mobile terminal, the second set of resource blocks to transmit data to the base station during at least a first time interval of the first period of time, said first period of time including multiple time intervals during which the mobile terminal has been granted the right to transmit data.

20 Claims, 20 Drawing Sheets

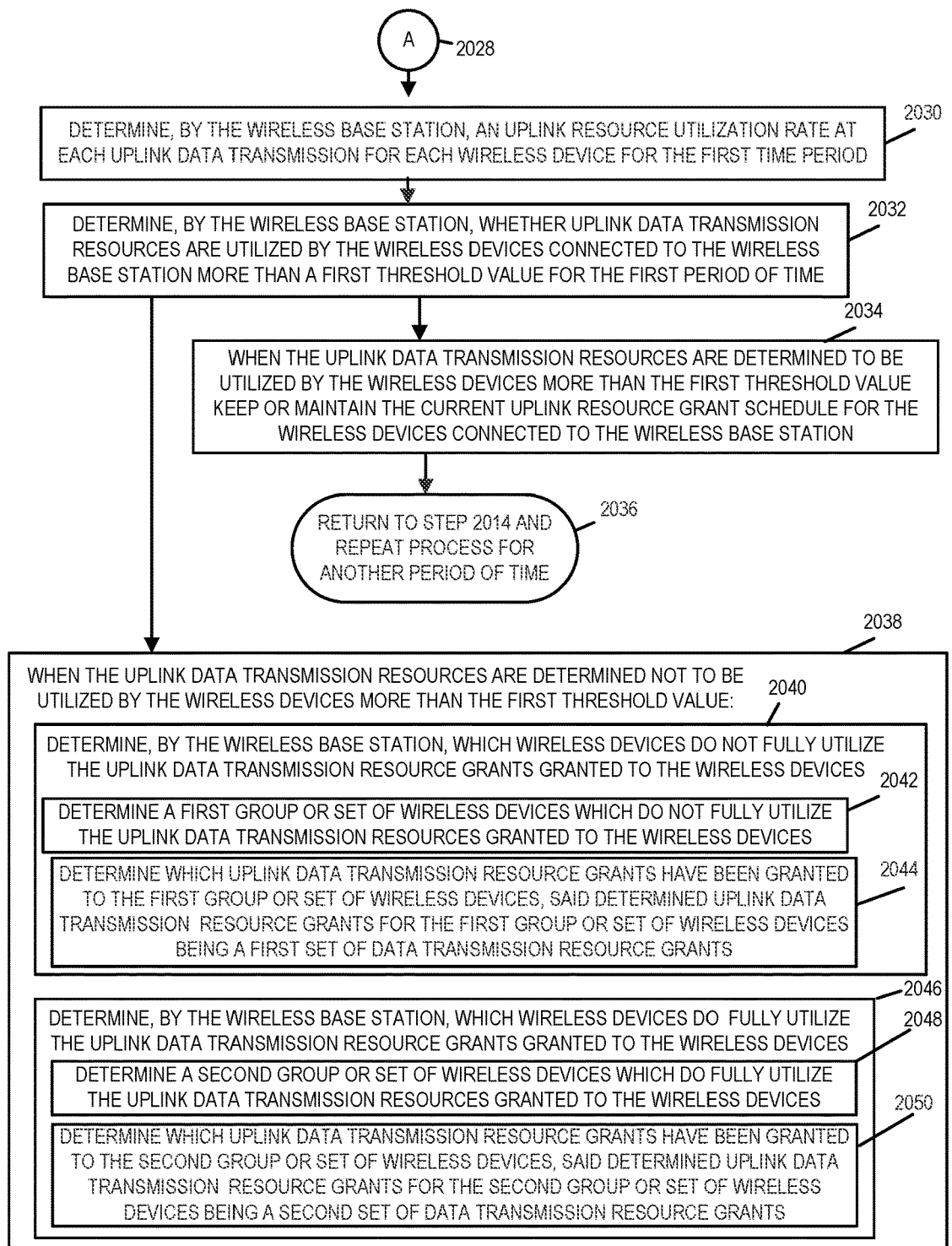

| FIGURE 3A |
| FIGURE 3B |
| FIGURE 3C |
| FIGURE 3D |
| FIGURE 3E |

METHODS AND APPARATUS FOR MANAGING UPLINK RESOURCE GRANTS IN WIRELESS NETWORKS

RELATED APPLICATIONS

The present application is a continuation of U.S. patent application Ser. No. 17/180,761 which was filed on Feb. 20, 2021 and which published as United States Patent Application Publication No.: US 2022-0272746 A1 on Aug. 25, 2022 and which is hereby expressly incorporated by reference in its entirety.

FIELD OF INVENTION

The present invention relates to methods and apparatus for managing uplink resource grants, e.g., uplink data transmission grants, in wireless networks. More particularly, the present invention relates to methods and apparatus for managing and/or scheduling uplink data transmission grants by wireless base stations for wireless devices, e.g., mobile terminals and/or user equipment devices. The present invention further relates to methods and apparatus for uplink resource grant management in new radio 5G wireless networks such as new radio 5G Citizens Broadband Radio Service (CBRS) Wireless Networks. The present invention further relates to methods for mobile terminals to utilize shared uplink resources while minimizing or reducing collisions during uplink transmissions.

BACKGROUND OF THE INVENTION

A CBRS network includes a plurality of Citizen Broadband Radio Service Devices (CBSDs). The CBSD devices which are wireless base stations provide wireless services to subscribers' wireless devices, e.g., mobile terminals such as user equipment devices. Spectrum is granted to each of the CBSDs, i.e., wireless base stations, using a centralized system called the Spectrum Access System (SAS). The Spectrum Access System is a central processing and database system that receives and processes spectrum grant requests. In the CBRS network, interference is managed through power management of CBSD devices by the Spectrum Access System (SAS). The SAS stores information regarding which CBSD uses how much spectrum at which location in the CBRS network.

In the new radio 5G standard, uplink (UL) resources, e.g., resource blocks, are assigned to wireless devices, e.g., mobile terminals such as user equipment devices and customer premise equipment devices, at fixed intervals and this is referred to as "proactive grants". In fixed wireless access networks, a user terminal is a customer premises equipment (CPE) device which acts the same as a user equipment device, e.g., a mobile phone, does. The new radio 5G base station, e.g., a CBSD in a CBRS wireless network, assigns uplink resources periodically to each wireless device which is wirelessly attached or connected to it. These wireless devices appear as terminals or endpoints to the new radio 5G wireless base station. If a wireless device connected to the wireless base station does not have data to send in the uplink, the wireless device skips this data transmission opportunity. Since the amount of data that a mobile terminal sends over the uplink channel to the wireless base station changes over time, and the wireless uplink channel also changes because of the mobility of the mobile terminal, the uplink grant schedule for the wireless devices and in particular the mobile terminals supported by the wireless base station should also change dynamically. Furthermore, different mobile device types can require different uplink usage requirements as sensors, vehicles, phone and non-phone terminals have different functions and different uplink usage requirements. For example, vehicles with sensor reporting typically are uplink dominated and send up large quantities of data whereas phones have a more balanced uplink and downlink usage. Wireless media players on the other hand are downlink dominated devices in which more data is sent down to the media player than data is sent up to the wireless base station. When a mobile terminal is skipping usage of uplink grant opportunities, uplink resources are being wasted. Dynamic uplink grant management is crucial for efficient and effective use of the limited uplink channel resources in a wireless network.

From the above it should be appreciated that there is a need for new and/or improved methods and apparatus for managing uplink resources in wireless networks. There is a further need for new and/or improved methods of managing uplink resources by wireless base stations which provide wireless services, e.g., wireless broadband services, to wireless devices such as mobile terminals, e.g., smartphones, sensors, vehicles which are implemented using new radio 5G and/or CBRS wireless access networks. There is a further need for new and/or improved methods and apparatus for increasing the utilization of uplink resources in wireless networks which use proactive uplink resource grants. Additionally, there is a need for new and/or improved methods and apparatus for more effectively and efficiently managing uplink resource grants for data transmission of mobile terminals, e.g., user equipment devices or end-point devices. There is a further need for new and/or improved methods and/or apparatus for assigning different uplink resource grant schedules based on one or more wireless device attributes such as type, e.g., a mobile terminal type such as a sensor, a phone, a smartphone, a lap-top, a media player, or a vehicle. In wireless systems, e.g., 5G and CBRS wireless networks, wherein the frequency spectrum and power level of transmission are controlled by a spectrum management entity such as for example a spectrum access system to minimize interference and maximize frequency spectrum usage/efficiency, there is a need for new and/or improved methods and apparatus to solve the technological problem of how to efficiently manage uplink data transmission grants for wireless devices such as mobile terminals. There is also a need for new and/or improved methods and apparatus to solve the technological problem of how to prioritize by a wireless base station uplink resource grants to the different types of wireless devices being supported by the wireless base station. There is a further need for new and/or improved methods and apparatus that take into account a device's properties, attributes and/or past uplink resource usage history when determining and/or managing uplink resource grants for a device. There is a further need for new and/or improved methods and apparatus that allow for the shared use of uplink resources while minimizing and/or reducing collisions due to attempted simultaneous use of the shared uplink resources by multiple wireless devices, e.g., mobile terminals.

SUMMARY OF THE INVENTION

The present invention provides a technological solution of how to efficiently manage uplink resources in a wireless network. The present invention provides technological solutions that increase and/or improve the uplink resource utilization in wireless networks. The present invention further provides a technological solution of how a wireless base station can take into account various attributes (e.g., device type), characteristics, proprieties and/or historical uplink resource utilization of one or more devices, e.g., mobile terminals, to which the wireless base station is providing wireless services in a wireless network. The present invention further provides a technological solution of how wireless devices, e.g., mobile terminals, may share uplink resources while minimizing and/or reducing collusions when multiple devices attempt to transmit uplink data simultaneously using the shared resources. Various embodiments of the present invention include novel methods and apparatus to solve one or more of the problems identified above.

By using one or more of the techniques described herein a wireless base station can manage the uplink resource grants to wireless devices, e.g., mobile terminals, attached/connected to the wireless base station. The present invention also provides new and/or improved techniques for uplink resource grant scheduling and implementation for mobile terminals based on device type. The present invention also provides techniques for increasing the utilization of uplink resources by multiple mobile terminals. The present invention also provides techniques for minimizing and/or reducing collisions when multiple devices attempt to utilize the same shared uplink resources.

An exemplary method embodiment in accordance with the present invention includes performing the following steps: receiving, by a first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis; using, by the first mobile terminal, the first set of resource blocks to transmit uplink data to the wireless base station during a first period of time; and using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station. In some embodiments, the resource blocks are physical resource blocks. In some embodiments, the first uplink resource grant schedule is derived from or included in downlink control information received from the wireless base station over a Physical Downlink Shared Control Channel. In some embodiments, the first mobile terminal and the wireless base station are part of a Citizens Broadband Radio Service network; and the wireless base station is a Citizens Broadband Radio Service Device (CBSD). In some embodiments, the first mobile terminal and wireless base station communicate using the 5G New Radio wireless protocol.

In most embodiments, the first uplink resource grant and the second uplink resource grant are proactive uplink resource grants.

In various embodiments, the first set of resource blocks includes one or more resource blocks; and the second set of resource blocks includes one or more resource blocks which are different from the resource blocks in said first set of resource blocks.

In various embodiments, the second set of resource blocks are resource blocks also granted to a second mobile terminal for use in communicating uplink data to the wireless base station during the first period of time; and the method further comprises: receiving, by the first mobile terminal from the wireless base station in connection with the first uplink resource grant schedule, an instruction to not transmit uplink data on every recurrence of the second set of resource blocks.

In some embodiments, the method further includes that in response to receiving the instruction to not transmit uplink data on every recurrence of the second set of resource blocks, the first mobile terminal refrains from transmitting uplink data on every recurrence of the second set of resource blocks.

In some embodiments, the method further includes that in response to receiving the instruction to not transmit uplink data on every recurrence of the second set of resource blocks, the first mobile terminal selects one or more recurrences of the second set of resource blocks to transmit uplink data using statistically generated data on when the second mobile terminal will transmit uplink data using the second set of resource blocks.

In some embodiments, the method further includes in response to receiving the instruction to not transmit uplink data on every recurrence of the second set of resource blocks, the first mobile terminal randomly selects recurrences of the second set of resource blocks to transmit uplink data during the first period of time. In some such embodiments, the random selection is based on an output of a random number generator included in the first mobile terminal that generates numbers between 0 and 1 using a gaussian distribution. For each recurrence of the second set of resource blocks during the second period of time, the first mobile terminal generates a random number between 0 and 1 and when the random generated number is less than 0.5, the first mobile terminal refrains from transmitting uplink data using the second set of resource blocks, and when the random number generated is equal to or greater than 0.5 the first mobile terminal transmits uplink data using the second set of resource blocks.

In most embodiments, the second set of resource blocks were granted to the second mobile terminal for the exclusive use of the second mobile terminal during a second period of time but were not used or had low usage by the second mobile terminal during the second period of time, said second period of time occurring prior to the first period of time.

In some embodiments, the method further includes operating the wireless base station to generate the first uplink resource grant schedule based on first resource utilization information about utilization of said first set of resource blocks by the first mobile terminal during the second period of time and second resource utilization information about the utilization of said second set of resource blocks by the second mobile terminal during the second period of time. The first set of resource blocks having been granted to the first mobile terminal for the first mobile terminal's exclusive use to transmit uplink data to the wireless base station during the second period of time.

In various embodiments, the first resource utilization information indicates: when the resource blocks granted to the first mobile terminal were used during the second period of time, a portion or amount of the first set of resource blocks that were used during the second period of time (e.g., whether they were fully used or only a portion was used to transmit data—this information can be indicated as a utilization portion with a 1 indicating full utilization or a fraction indicating less than full utilization).

In various embodiments, the second resource utilization information indicates, when the resource blocks granted to the second mobile terminal were used during the second period of time, a portion or an amount of the second set of resource blocks that were used during the second period of time (e.g., whether they were fully used or only a portion was used to transmit data—this information can be indicated as a utilization portion with a 1 indicating full utilization or a fraction indicating less than full utilization).

The wireless base station in various embodiments generates and stores in memory the first resource utilization information and the second resource utilization information.

In some embodiments during implementation of the method, the first resource utilization information indicates that all resource blocks granted to the first mobile terminal during the second period of time were used for transmitting uplink data from the first mobile device to the wireless base station; and the second resource utilization information indicates that no or low utilization of the resource blocks granted to the second mobile terminal to transmit uplink data from the second mobile terminal to the wireless base station during the second period of time.

In some embodiments, upon receiving a NACK by the first mobile terminal in response to an uplink data transmission using one or more of the resource blocks of the second set of resource blocks during the first period of time, the first mobile terminal makes a determination as to whether or not the NACK resulted from uplink channel conditions.

In some embodiments, upon receiving a NACK by the first mobile terminal in response to an uplink data transmission using one or more of the resource blocks of the second set of resource blocks during the first period of time, the first mobile terminal makes a determination as to whether or not the NACK resulted from multiple mobile terminals simultaneously transmitting uplink data using one or more of the same resource blocks of the second set of resource blocks.

In some embodiments, the determination, by the first mobile terminal, as to whether the NACK resulted from uplink channel conditions is based on Reference Signal Received Power (RSRP) measurements of one or more resource blocks in the second set of resource blocks used to transmit the uplink data corresponding to the received NACK. In some embodiments, the reference signal is a Sounding Reference Signal.

In some embodiments, the determination, by the first mobile terminal, as to whether the NACK resulted from uplink channel conditions is based on Reference Signal Strength Indicator (RSSI) measurements of one or more resource blocks in the second set of resource blocks used to transmit the uplink data corresponding to the received NACK. In some embodiments, the RSSI measurements are RSSI measurements of a Sounding Reference Signal.

In various embodiments, the first mobile terminal determines that the NACK resulted from uplink channel conditions when the RSSI measurements of one or more resource blocks in the second set of resource blocks used to transmit the uplink data corresponding to the received NACK is greater than an RSSI threshold value. In many embodiments, the RSSI threshold value is a value greater than an RSSI average value generated by the first mobile terminal using RSSI measurements of the one or more resource blocks in the second set of resource blocks when uplink data was successfully transmitted from the first mobile terminal to the wireless base station using the one or more resource blocks in the second set of resource blocks.

In some embodiments, the method further includes the steps of: measuring, by the first mobile terminal, a Reference Signal Received Power (RSRP) value for at least one resource block in the second set of resource blocks whenever the first mobile terminal transmits uplink data to the wireless base station; determining, by the first mobile terminal, a moving average or mean RSRP value as each RSRP value of the at least one resource block in the second set of resource blocks is measured; and determining, by the first mobile terminal, a RSRP standard deviation for the measured RSRP values.

In some embodiments, the step of making a determination, by the first mobile terminal, as to whether the NACK resulted from uplink channel conditions includes: determining whether a RSRP value for the at least one resource block in the second set of resource blocks measured during the uplink data transmission for which the NACK was received has a value which is greater than K times the moving average or mean RSRP value for the resource block times the RSRP standard deviation for the resource block, where K is a value greater than 1. In some embodiments, the value of K is based on the location of the first mobile terminal. In some embodiments, the value of K is equal to 1.2. In some embodiments, the value of K is equal to 2. In some embodiments, the value of K is equal to 3.

In some embodiments, when the first mobile terminal makes the determination that the NACK received in response to the uplink data transmission is the result of uplink channel conditions, the first mobile terminal continues to use the second set of resource blocks to transmit uplink data to the wireless base station.

In some embodiments, when the first mobile terminal makes the determination that the NACK received in response to the uplink data transmission is not the result of uplink channel conditions, the first mobile terminal ceases to use the second set of resource blocks to transmit uplink data to the wireless base station for a random amount of time, said random amount of time being less than the first period of time. In some embodiments, when the first mobile terminal makes the determination that the NACK received in response to the uplink data transmission is not the result of uplink channel conditions, the first mobile terminal takes a data collision mitigation action to reduce the possibility of a future collision resulting from multiple mobile terminals transmitting at the same time using the same uplink resources, e.g., resource blocks. In some embodiments, the mitigation action includes the first mobile terminal ceasing to use the second set of resource blocks to transmit uplink data to the wireless base station for an amount of time. In some embodiments, the mitigation action includes reducing the frequency of transmissions by the first mobile terminal using the second set of resource blocks.

In some embodiments, when the first mobile terminal makes the determination that the NACK received in response to the uplink data transmission resulted from multiple mobile terminals simultaneously transmitting uplink data using one or more of the same resource blocks, the first mobile terminal ceases to use the second set of resource blocks to transmit uplink data to the wireless base station for a random amount of time, said random amount of time being less than the first period of time. In some embodiments, when the first mobile terminal makes the determination that the NACK received in response to the uplink data transmission resulted from multiple mobile terminals simultaneously transmitting uplink data using one or more of the same resource blocks, the first mobile terminal takes a data collision mitigation action to reduce the possibility of a future collision resulting from multiple mobile terminals transmitting at the same time using the same uplink resources, e.g., the second set of resource blocks. In some embodiments, the mitigation action includes the first mobile terminal ceasing to use the second set of resource blocks to transmit uplink data to the wireless base station for an amount of time. In some embodiments, the mitigation action includes reducing the frequency of transmissions by the first mobile terminal using the second set of resource blocks. In some embodiments, a data collision mitigation action includes ceasing to use the second set of resource blocks to a different set of resource blocks for uplink data transmissions.

In some embodiments, when the first mobile terminal makes the determination that the NACK received in response to the uplink data transmission did not result from multiple mobile terminals simultaneously transmitting uplink data using one or more of the same resource blocks, the first mobile terminal continues to use the second set of resource blocks to transmit uplink data to the wireless base station.

The present invention is also applicable to and includes apparatus and systems such as for example, apparatus and systems that implement one or more of the steps of the method embodiments. An exemplary wireless communications system in accordance with the present invention includes a first mobile terminal, said first mobile terminal including: a memory; and a first processor, said first processor controlling the first mobile terminal to perform the following operations: receive, by the first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis; use, by the first mobile terminal, the first set of resource blocks to transmit uplink data to the wireless base station during a first period of time; and use, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station.

In various embodiments, the resource blocks are physical resource blocks. In some embodiments, the first uplink resource grant schedule is derived from or included in downlink control information received from the wireless base station over a Physical Downlink Shared Control Channel. In some embodiments, first mobile terminal and the wireless base station are part of a Citizens Broadband Radio Service network; and said wireless base station is a Citizens Broadband Radio Service Device (CBSD). In some embodiments, the first mobile terminal and wireless base station communicate using the 5G New Radio wireless protocol. In most embodiments, the first uplink resource grant and the second uplink resource grant are proactive uplink resource grants.

In some embodiments, the first set of resource blocks includes one or more resource blocks; and the second set of resource blocks includes one or more resource blocks which are different from the resource blocks in said first set of resource blocks.

In some embodiment, the second set of resource blocks are resource blocks also granted to a second mobile terminal for use in communicating uplink data to the wireless base station during the first period of time. In some such embodiments, the first processor further controls the first mobile terminal to perform the following additional operation: receive, by the first mobile terminal from the wireless base station in connection with the first uplink resource grant schedule, an instruction to not transmit uplink data on every recurrence of the second set of resource blocks.

In some embodiments, in response to receiving the instruction to not transmit uplink data on every recurrence of the second set of resource blocks, the first processor further controls the first mobile terminal to: refrain from transmitting uplink data on every recurrence of the second set of resource blocks.

In some embodiments, in response to receiving the instruction to not transmit uplink data on every recurrence of the second set of resource blocks, the first processor further controls the first mobile terminal to select one or more recurrences of the second set of resource blocks to transmit uplink data using statistically generated data on when the second mobile terminal will transmit uplink data using the second set of resource blocks.

In some embodiments, in response to receiving the instruction to not transmit uplink data on every recurrence of the second set of resource blocks, the first processor further controls the first mobile terminal to: randomly select recurrences of the second set of resource blocks to transmit uplink data during the first period of time. In some such embodiments, the random selection is based on an output of a random number generator included in the first mobile terminal that generates numbers between 0 and 1 using a gaussian distribution. For each recurrence of the second set of resource blocks during the second period of time the first mobile terminal generates a random number between 0 and 1 and when the random generated number is less than 0.5, the first mobile terminal refrains from transmitting uplink data using the second set of resource blocks, and when the random number generated is equal to or greater than 0.5 the first mobile terminal transmits uplink data using the second set of resource blocks.

In some embodiments, second set of resource blocks were granted to the second mobile terminal for the exclusive use of the second mobile terminal during a second period of time but were not used or had low usage by the second mobile terminal during the second period of time, said second period of time occurring prior to the first period of time.

In some embodiments, the wireless base station includes a second processor, said second processor controlling the wireless base station to perform the following operations: to generate the first uplink resource grant schedule based on first resource utilization information about utilization of said first set of resource blocks by the first mobile terminal during the second period of time and second resource utilization information about the utilization of said second set of resource blocks by the second mobile terminal during the second period of time, the first set of resource blocks being granted to the first mobile terminal for the first mobile terminal's exclusive use to transmit uplink data to the wireless base station during the second period of time.

In various embodiments, the uplink resource grants for a wireless device included in an uplink resource grant schedule received from a wireless base station are semi-persistent or pro-active resource grants which remain in effect until a new or updated uplink resource grant schedule is received by the wireless device, e.g., a mobile terminal, from the wireless base station. In various embodiments, the uplink resource grants included in each uplink resource grant schedule are based on the utilization of the resource grants during a prior period of time.

Various apparatus disclosed herein include a processor and memory, the memory including instructions which when executed by the apparatus control the apparatus to perform one or more of the steps and/or functions described in connection with the various embodiments described herein.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 2 illustrates the combination of FIGS. 2A, 2B, 2C and 2D.

FIG. 2B illustrates the steps of the second part of an exemplary method in accordance with an embodiment of the present invention.

DETAILED DESCRIPTION

Figure 1:
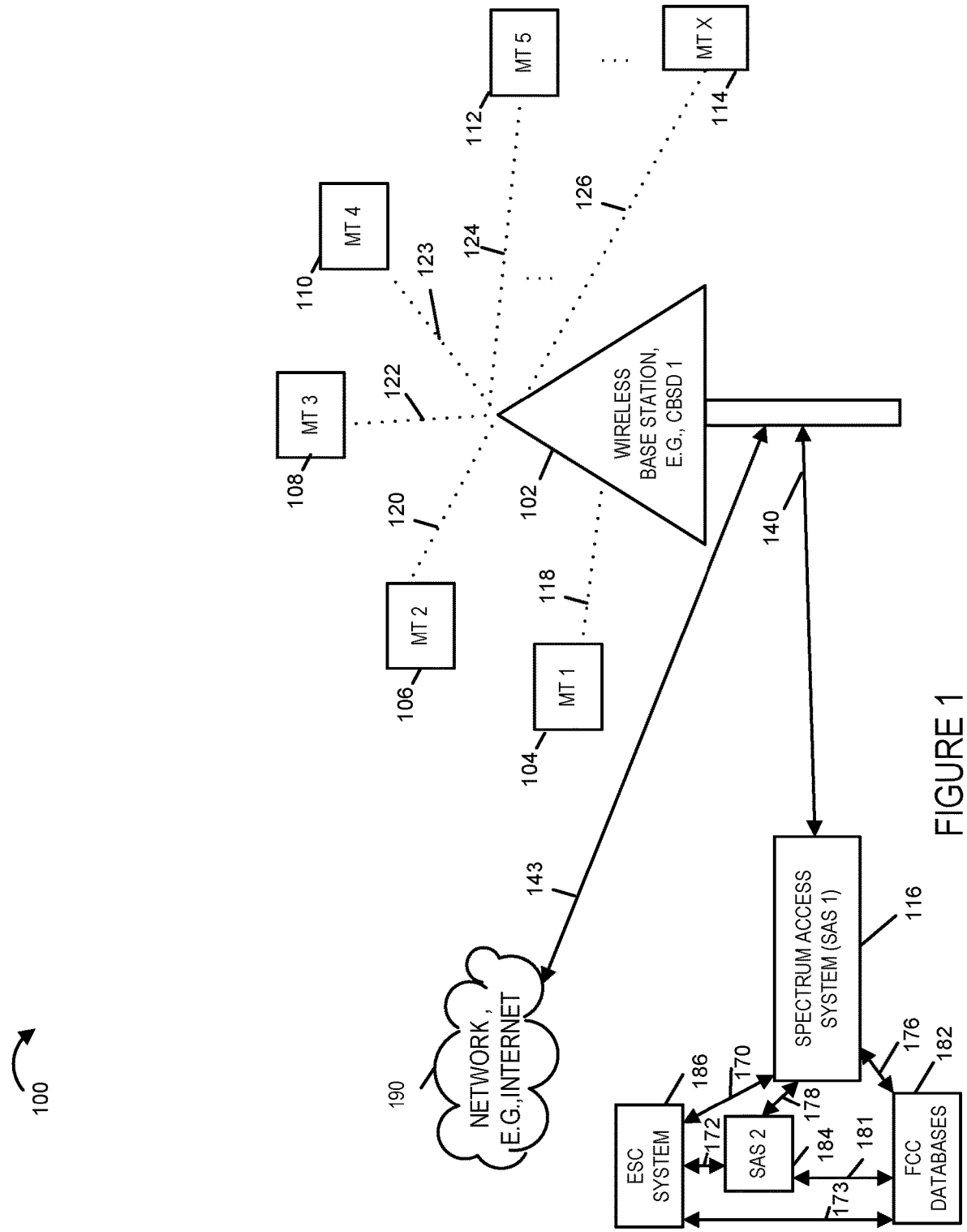
FIG. 1 illustrates an exemplary wireless communications system shown as a Citizens Broadband Radio Service network system 100 that provides wireless communications services in accordance with one embodiment of the present invention.

The current invention is applicable to wireless networks, e.g., new radio 5G wireless networks and Citizens Broadband Radio Service (CBRS) networks, that provide wireless communications services, e.g., broadband services, to wireless devices, e.g., mobile terminals such as wireless sensors, smartphones, cell phones, laptops, media players, vehicles including one or more wireless terminals such as sensors, controllers and communications devices. The present invention is particularly useful in wireless access networks in which different types of mobile terminals with different uplink usage requirements are being serviced by a wireless base station. The present invention provides new and/or improved methods and apparatus for managing uplink resource grants to wireless devices, e.g., mobile terminals, connected and/or attached to wireless base stations. Various embodiments of the present invention are directed to new apparatus and methods for managing uplink resource grants, e.g., proactive grants or assignments of resource blocks to use for uplink data transmission, by mobile terminals to communicate with wireless base stations. While the invention is explained using an exemplary Citizens Broadband Radio Service network, it should be understood that the invention is not limited to Citizens Broadband Radio Service networks. U.S. patent application Ser. No. 17/115,790 filed on Dec. 8, 2020 describes a wireless network system and is explicitly incorporated herein by reference in its entirety.

In wireless systems, such as 5G new radio wireless systems, proactive uplink resource grants are determined by a wireless base station. The proactive uplink resource grants are sent to all mobile terminals connected to the wireless base station. These proactive uplink resource grants remain fixed for a period of time until new proactive uplink resource grants are transmitted to the mobile terminals. Each of the mobile terminals is expected to transmit its own uplink data during fixed time intervals at a specified frequency or frequencies using the resource blocks assigned by the wireless base station in the proactive uplink resource grant. Mobile terminal(s) might skip certain grants if the mobile terminal does not have any data to transmit during the time interval of its assigned resource grant. This will leave those resource blocks at the assigned time interval empty in the uplink channel wasting these uplink channel resources.

In an exemplary embodiment of the present invention, the wireless base station assigns the same uplink resource grant to multiple mobile terminals allowing the sharing of uplink resources to more fully utilize the uplink resources of the wireless network. The multiple mobile terminals both utilize the shared uplink resources to transmit data to the wireless base station while using various methods and techniques to detect and avoid collisions on the shared uplink resources, e.g., physical resource blocks of the shared uplink resource grant.

In one exemplary method embodiment of the present invention, the method includes the steps of: (i) wireless base station, e.g., CBSD, registering with a resource management system, e.g., spectrum access system, and being assigned spectrum for use in communicating with wireless devices, e.g., mobile terminals, connected and/or attached to the wireless base station; (ii) mobile terminals, e.g., smartphones, sensors, wireless vehicle devices, laptops, connect and/or attach to the wireless base station with the wireless base station identifying the mobile terminals by device type during connection to the wireless base station; (iii) the wireless base station determines uplink resource data transmission grant(s) forming a uplink grant schedule for each mobile terminal in the wireless network connected to the wireless base station, e.g., proactive grants which are fixed or semi-persistent grants upon which the mobile terminal is granted and/or assigned the right to transmit its own uplink data at specified time intervals using the resource blocks assigned by the wireless base station in the grant; (iv) each mobile terminal connected or attached to the wireless base station determines whether it has uplink data to be sent at or during its granted recurring time intervals and when it has data starts data transmission in the uplink channel using the resource blocks in its assigned grant at the specified time and each mobile terminal skips data transmission in the uplink channel when it determines it does not have data to transmit during the time interval; (v) the wireless base station monitors and records or stores in memory the number of uplink grants that are skipped the most, and by which mobile terminal and the wireless terminal type (e.g., mobile terminal 1 which is type mobile phone) skips the most uplink data transmission opportunities); (vi) the wireless base station monitors, checks, determines and/or records which mobile terminals fill up their assigned uplink resource blocks fully at each uplink transmission opportunity without skipping an opportunity as well as their wireless terminal type (e.g., mobile terminal 2 which is type vehicle); (vii) the wireless base station sends the uplink grant schedule of the mobile device which skips the most uplink transmission opportunities (e.g., mobile terminal 1 which is a phone) to the mobile terminal which fills up the uplink resource blocks fully at each UL transmission opportunity without skipping an opportunity (e.g., mobile terminal 2 which is a vehicle) and instructs the mobile terminal 2 to use mobile terminal 1's uplink resource grants in a random order, that is mobile terminal 2 will not use mobile terminal 1's grants all the time assuming that mobile terminal 1 will never send data in the uplink channel to the wireless base station. The randomness will decrease the probability of a collision between the mobile terminal 1 and mobile terminal 2's use of the uplink channel.

When mobile terminal 2 uses one of mobile terminal 1's assigned uplink grants, and receives an ACK signal from the wireless base station via the Hybrid Automatic Repeat Request (HARQ) mechanism, the mobile terminal 2 will increase the number of uplink grants of mobile terminal 1 that mobile terminal 2 will use till mobile terminal 2 receives a NACK from the wireless base station. The ACK indicates a successful reception of a wireless device's data. If mobile terminal 2 receives a NACK from the wireless base station, the mobile terminal 2 will make a determination as to whether the NACK resulted from an uplink channel condition or from a collision, i.e., both mobile terminal 1 and mobile terminal 2 attempting to send data using the same resource blocks. When the determination is that the NACK is the result of a collision, mobile terminal 2 will decrease the number of used (borrowed) mobile terminal 1's uplink grants and will increase the level of randomness to select a particular mobile terminal 1's uplink grant to transmit its own uplink data. For instance, mobile terminal 2 can wait longer to borrow uplink grants from mobile terminal 1. Alternatively, mobile 2 can generate its own statistics to decide when to send data. If mobile terminal 2's uplink data transmission in a particular mobile terminal 1 grant receives no NACKs then mobile terminal 2 might use this particular uplink grant all the time.

When mobile terminal 2 determines that a received NACK was caused by the uplink channel conditions, mobile terminal 2 will continue to use the resource blocks for which the NACK was received. In some embodiments, the mobile terminal 2 makes the determination of whether a received NACK is caused by uplink channel conditions or a collision based on Received Signal Reference Power (RSRP) level and/or Received Signal Strength Indictor level (RSSI) of uplink physical resource blocks used to transmit uplink data. For example, in one embodiment the mobile terminal 2 measures the RSRP of each PRB assigned in the uplink channel at each data transmission. Mobile terminal 2 then calculates and/or generates an average RSRP and standard deviation. This is done for each PRB granted in the uplink. The mobile terminal will then determine if the RSRP of the uplink data transmission which resulted in the NACK is lower than a RSRP threshold value. In some embodiment the RSRP threshold value is (average RSRP value*K multiplier*Standard Deviation of this PRB) where RSRP is the value of the RSRP measured for the PRB when a NACK is received, K is a multiplier equal to or greater than 1, average RSRP value is the average RSRP value calculated or generated for the PRB based on previously measured RSRP values and the Standard Deviation of this PRB is the standard deviation of the RSRP values calculated or generated for the PRB based on previously measured RSRP values for the PRB. When the measured RSRP value for the PRB is lower than the RSRP threshold then the NACKs are determined to be caused by the uplink channel conditions, e.g., RF channel conditions. When the measured RSRP value is higher than (or equal to or higher than) the NACKs are determined to be caused by simultaneous transmissions in the same uplink PRB, i.e., mobile terminal 1 and mobile terminal 2 are both transmitting uplink data on the same PRB. In some embodiments, mobile terminal 2 will measure and/or determine the RSSI for each uplink PRB, and if the measured RSSI for a PRB for which a NACK was received is higher than an RSSI threshold, the NACK will be determined to be caused by uplink channel conditions or dynamics, e.g., RF channel dynamics. When the measured and/or determined RSSI value is below or equal to the RSSI threshold value, the NACKs are determined to be caused by the data collisions resulting from multiple devices transmitting data simultaneously using the same PRBs. The RSSI may be, and in some embodiments is, the average RSSI value measured by mobile terminal 2 for the PRB. In some embodiments, the RSSI threshold may be a multiplier*the average value for example 2.5 times the average RSSI measured for the PRB. The multiplier value being 1 or greater. If two devices are transmitting on the same PRB, the RSSI value should be higher than a single device transmitting on the PRB but still within a certain range of the average PRB value which is lower than the RSSI threshold.

In some embodiments, the mobile terminal 2 bases its determination as to whether the NACKs received in response to uplink data transmission using a PRB is due to uplink channel conditions or multiple devices transmitting using the same PRB based on RSSI measurements and RSRP measurements for the PRB. In some embodiments, the reference signal for which the RSRP and RSSI are measured and/or determined is the Sounding Reference Signal, e.g., 5G New Radio (NR) Sounding Reference Signal. The 5G NR Sounding Reference Signal is described in ETSI TS 138 211 V15.2.0 (2018-07) technical specification entitled, 5G; NR; Physical channels and modulation (3GPP TS 38.211 version 15.2.0 Release 15) from the European Telecommunications Standards Institute which is herein explicitly incorporated by reference in its entirety.

The determination of whether a NACK received by the wireless device is a result of an RF condition may be determined in a number of different ways. Exemplary methods described using RSRP statistics and/or RSSI statistics have been described above. By way of further explanation, RSSI is a wideband power measurement, that means, it measures interference+noise+signal power+all other power/energy in the frequency band being measured. Therefore, if RSSI is higher than a defined threshold (since signal is always transmitted at a fixed power allowed by the Federal Communications Commission (FCC), that means interference+noise is high in that frequency band, and that interference will destruct the signal on its way to the mobile terminal receiver. RSSI is measured by the mobile terminal. RSRP is a pure signal power measured by the mobile terminal. If measured RSRP is lower than the expected RSRP, then there is some blockage in the channel causing the RSRP signal loss during signal's transmission over the RF channel. If RSRP is in the expected limits, then NACK is being caused by simultaneous signal transmission. The RSSI and RSRP methods to determine whether the NACK is caused by RF or uplink channel conditions can be used alone or in combination to make the determination. In some embodiments, the mobile terminal uses all available power measurements defined by the wireless standard being implemented, e.g., the 5G New Radio wireless standard to determine whether the NACK is the result of interference or a collision.

The above described method may be, and in some embodiments is, implemented using system 100 shown in FIG. 1. Various additional features and/or embodiments of the present invention will be explained in further detail below.

Figure 6:
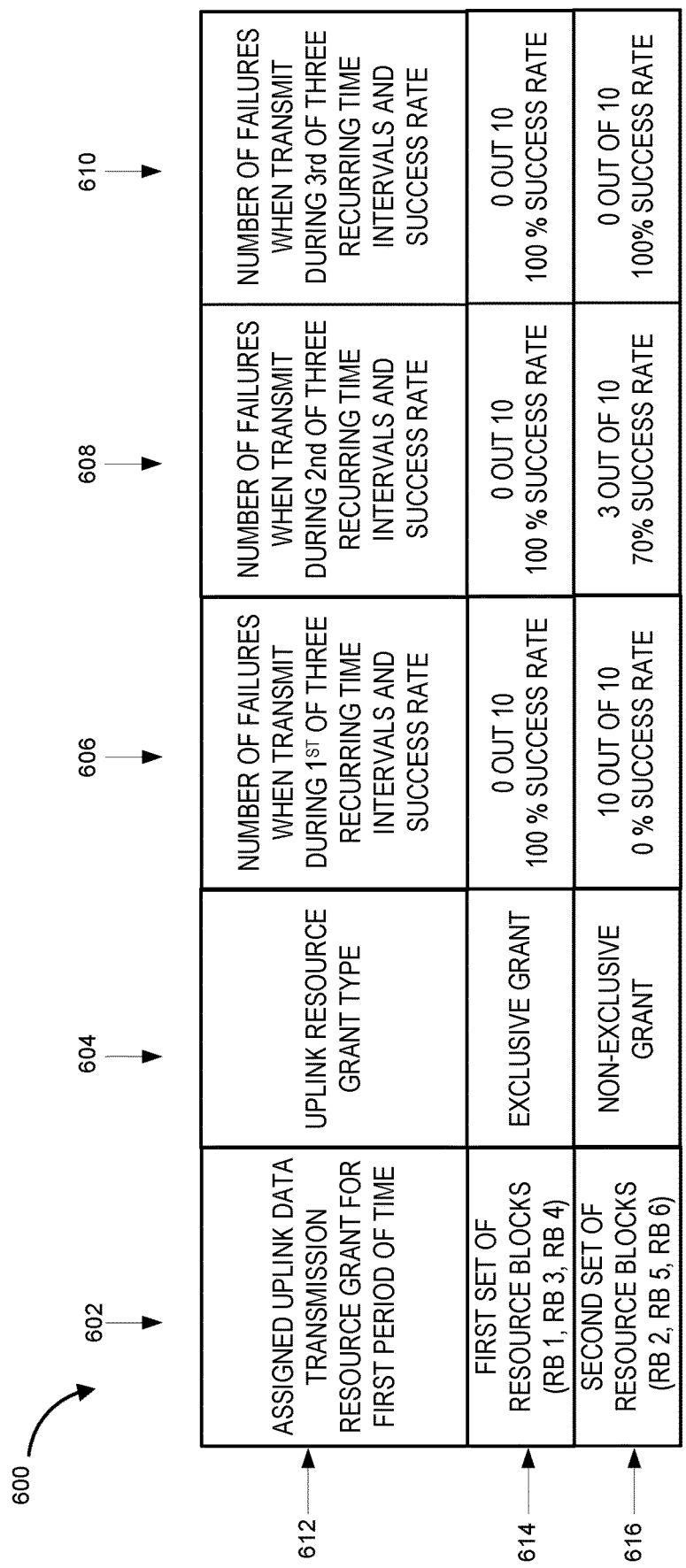
FIG. 6 illustrates details of an exemplary record of statistics tracked and/or logged by a wireless device, e.g., a mobile terminal, in accordance with an embodiment of the present invention.

FIG. 6 illustrates details of an exemplary record 600 of statistics tracked and/or logged by a wireless device, e.g., a mobile terminal, in accordance with an embodiment of the present invention. The record 600 is illustrated in the form of a table. The exemplary record 600 which may be, and in some embodiments is, stored in memory or a storage device by the wireless device, e.g., mobile terminal. The table 600 includes information about a wireless device's uplink resource grants connected to the wireless base station during a first period of time including metrics or statistics that may be, and in some embodiments, is, used to determine when to use shared uplink resources.

Table 600 includes columns 602, 604, 606, 608, 610 and rows 612, 614, and 616. The first row 612 includes labels identifying the information contained in the each of the columns. The entries in column 602 identify the assigned uplink data transmission resource grant for the first period of time (col. 602, row 612 entry) for the wireless device. In this example, the first period of time includes a first recurring time interval, a second recurring time interval and a third recurring time interval. Each of the first, second and third recurring time intervals recurring 10 times during the first period of time. The entry (column 604, row 612) indicates that the entries in column 604 includes the uplink resource grant type which is either exclusive or non-exclusive (i.e., shared) for the resource grant identified in the same row. The entries in column 606 are the number of failures of uplink data transmission when the wireless device transmitted data during the first of three recurring time intervals during the first period of time and the success rate of using the first time interval to transmit uplink data (col. 606, row 612 entry) using the grant identified in the same row. The entries in column 608 are the number of failures of uplink data transmission when the wireless device transmitted data during the second of three recurring time intervals during the first period of time and the success rate of using the second time interval to transmit uplink data (col. 608, row 612 entry) using the grant identified in the same row. The entries in column 610 are the number of failures of uplink data transmission when the wireless device transmitted data during the third of three recurring time intervals during the first period of time and the success rate of using the third time interval to transmit uplink data (col. 610, row 612 entry) using the grant identified in the same row.

Row 614 includes information for the first set of resource blocks (RB 1, RB 3, RB4) (col. 602, row 614 entry) that indicates: (i) the wireless device was assigned the first set of resource blocks which included resource block (RB) 1, RB 3 and RB4 for its uplink data transmission resource grant for the first period of time (col. 602, row 614 entry), (ii) the first set of resource blocks are an exclusive grant so the wireless device is the only device which will be using these resource blocks at the scheduled times of the uplink resource grant (col. 604, row 614 entry), (iii) the wireless device's uplink data transmissions using the first set of resource blocks during the 1st of three recurring time intervals had no failures out of 10 transmissions and was 100% successful (col. 606, row 614 entry); (iv) the wireless device's uplink data transmissions using the first set of resource blocks during the 2nd of three recurring time intervals had no failures out of 10 transmissions and was 100% successful (col. 608, row 614 entry); (v) the wireless device's uplink data transmissions using the first set of resource blocks during the 3rd of three recurring time intervals had no failures out of 10 transmissions and was 100% successful (col. 610, row 614 entry).

Row 616 includes information for the second set of resource blocks (RB 2, RB 5, RB 6) (col. 602, row 616 entry) that indicates: (i) the wireless device was also assigned the second set of resource blocks which included resource block (RB) 2, RB 5 and RB 6 for its uplink data transmission resource grant for the first period of time (col. 602, row 616 entry), (ii) the second set of resource blocks are a non-exclusive or shared uplink resource grant so the wireless device is not the only device granted the right to use these resource blocks at the scheduled times of the uplink resource grant (col. 604, row 616 entry), (iii) the wireless device's uplink data transmissions using the second set of resource blocks during the 1st of three recurring time intervals had 10 failures out of 10 transmissions and had 0% success rate (col. 606, row 616 entry); (iv) the wireless device's uplink data transmissions using the second set of resource blocks during the 2nd of three recurring time intervals had 3 failures out of 10 transmissions and had a 70% success rate (col. 608, row 616 entry); (v) the wireless device's uplink data transmissions using the second set of resource blocks during the 3rd of three recurring time intervals had 0 failures out of 10 transmissions and had a 100% success rate (col. 610, row 616 entry).

Based on the metrics included in table 600, the wireless device, e.g., mobile terminal, can adjust its uplink data transmissions so that the first selection is to use first use the three recurring intervals of the first set of resource blocks which is an exclusive grant, then to use the 3rd recurring interval of the second set of resource blocks which is the non-exclusive grant for which 100% success rate has been recorded, then to use the second set of resource blocks during the 2nd of the three recurring time intervals for which a 70% success rate was recorded. The wireless device in this example would either select the second set of resource blocks during the 1st of the three recurring time intervals last or would decide against using these uplink data transmission opportunities as they have not resulted in any success.

The record 600 and the information/metrics contained therein are only exemplary and other statistics and metrics may be, and in some embodiments are, utilized to track and determine the best uplink grants to use and which will result in the highest probability of a successful uplink data transmission.

Figure 9:
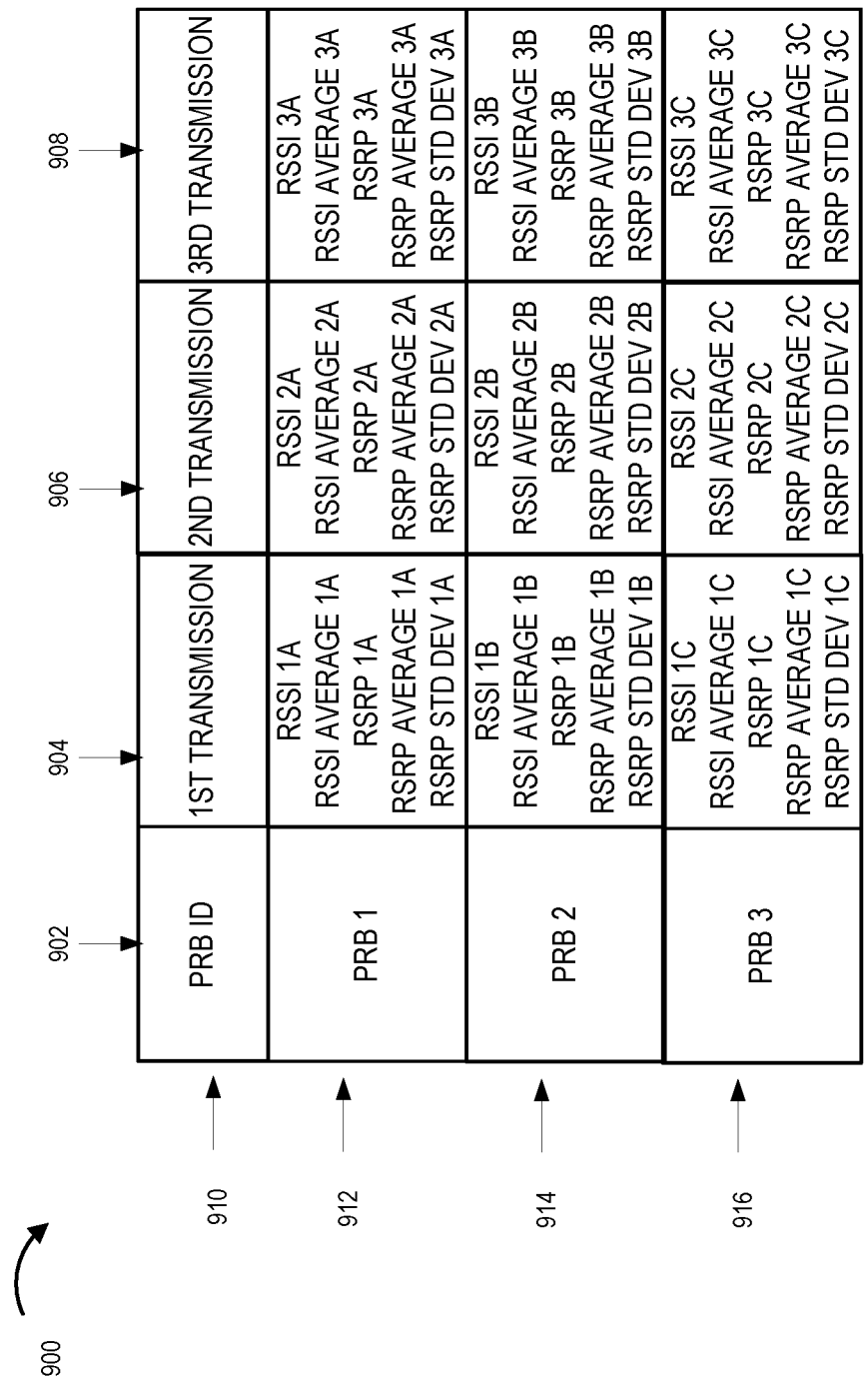
FIG. 9 illustrates an exemplary record maintained by a wireless device, e.g., a mobile terminal, in the form of a table used to track uplink data transmission metrics for the wireless device.

FIG. 9 illustrates an exemplary record maintained by a wireless device, e.g., a mobile terminal, in the form of a table used to track uplink data transmission metrics for the wireless device in accordance with an embodiment of the present invention. The record 900 is illustrated in the form of a table. The exemplary record 900 which may be, and in some embodiments is, stored in memory or a storage device by the wireless device, e.g., mobile terminal. The table 900 includes information and/or metrics about a wireless device's uplink data transmissions on a resource block basis, e.g., a physical resource block basis. Information contained in record 900 may be, and in some embodiments of the present invention is used to determine whether data transmission failures are the result of uplink channel conditions or a result of the simultaneous transmission of uplink data on the same resource block resulting in a collision and a failure.

Table 900 includes columns 902, 904, 906, 908 and rows 910, 912, 914, and 916. The first row 910 includes labels identifying the information contained in the each of the columns. The entries in column 902 identify physical resource block ID (col. 902, row 910 entry). The entry 1st transmission (column 904, row 910) indicates that the entries in column 904 correspond to a first data transmission using the PRB identified in the same row. The entry 2nd transmission (column 906, row 910) indicates that the entries in column 906 correspond to a second data transmission using the PRB identified in the same row. The entry 3rd transmission (column 908, row 910) indicates that the entries in column 908 correspond to a third data transmission using the PRB identified in the same row.

Row 912 includes information for the physical resource block 1 (PRB 1) (col. 902, row 912 entry) that indicates: (i) the mobile device determined that during the first transmission using PRB 1 it had an RSSI 1A value, RSSI average 1A value, RSRP 1A value, RSRP average 1A value and a RSRP standard deviation 1A value for the PRB 1 (col. 904, row 912 entry); (ii) the mobile device determined that during the second transmission using PRB 1, the PRB 1 had an RSSI 2A value, RSSI average 2A, RSRP 2A value, RSRP average 2A value and a RSRP standard deviation 2A value for the PRB 1 (col. 906, row 912 entry); and (iii) the mobile device determined that during the third transmission using PRB 1, the PRB 1 had an RSSI 3A value, RSSI average 3A value, RSRP 3A value, RSRP average 3A value and a RSRP standard deviation 3A value for the PRB 1 (col. 908, row 912 entry). The RSSI 1A value and RSRP 1A value are being measured during the 1st transmission using the PRB 1. The RSSI average 1A, RSRP average 1A, RSRP standard deviation 1A are being generated on an on-going basis using the currently measured values and past measured transmission values for the PRB 1. The RSSI 2A value and RSRP 2A value are being measured during the 2nd transmission using the PRB 1. The RSSI average 2A, RSRP average 2A, RSRP standard deviation 2A value are being generated on an on-going basis using the currently measured values and past measured transmission values for the PRB 1, e.g., RSSI 1A value and the RSRP 1A value. This process continues so that the averages and standard deviations are constantly being updated with each new data transmission measure by the mobile device using PRB 1.

Row 914 includes information for the physical resource block 2 (PRB 2) (col. 902, row 914 entry) that indicates: (i) the mobile device determined that during the first transmission using PRB 2 it had an RSSI 1B value, RSSI average 1B value, RSRP 1B value, RSRP average 1B value and a RSRP standard deviation 1B value for the PRB 2 (col. 904, row 914 entry); (ii) the mobile device determined that during the second transmission using PRB 2, the PRB 2 had an RSSI 2B value, RSSI average 2B, RSRP 2B value, RSRP average 2B value and a RSRP standard deviation 2B value for the PRB 2 (col. 906, row 914 entry); and (iii) the mobile device determined that during the third transmission using PRB 2, the PRB 2 had an RSSI 3B value, RSSI average 3B value, RSRP 3B value, RSRP average 3B value and a RSRP standard deviation 3B value for the PRB 2 (col. 908, row 914 entry). The measurements and generation of the RSSI value, RSSI average value, RSRP value, RSRP average value and RSRP standard deviation value for the PRB 2 during the 1st, 2nd and 3rd data transmission by the wireless device is similar to the method described in connection with PRB 1 but with the values being for PRB 2.

Row 916 includes information for the physical resource block 3 (PRB 3) (col. 902, row 916 entry) that indicates: (i) the mobile device determined that during the first transmission using PRB 3 it had an RSSI 1C value, RSSI average 1C value, RSRP 1C value, RSRP average 1C value and a RSRP standard deviation 1C value for the PRB 3 (col. 904, row 916 entry); (ii) the mobile device determined that during the second transmission using PRB 3, the PRB 3 had an RSSI 2C value, RSSI average 2C value, RSRP 2C value, RSRP average 2C value and a RSRP standard deviation 2C value for the PRB 3 (col. 906, row 916 entry); and (iii) the mobile device determined that during the third transmission using PRB 3, the PRB 3 had an RSSI 3C value, RSSI average 3C value, RSRP 3C value, RSRP average 3C value and a RSRP standard deviation 3C value for the PRB 3 (col. 908, row 916 entry). The measurements and generation of the RSSI value, RSSI average value, RSRP value, RSRP average value and RSRP standard deviation value for the PRB 3 during the 1st, 2nd and 3rd data transmission by the wireless device is similar to the method described in connection with PRB 1 but with the values being for PRB 3.

Figure 10:
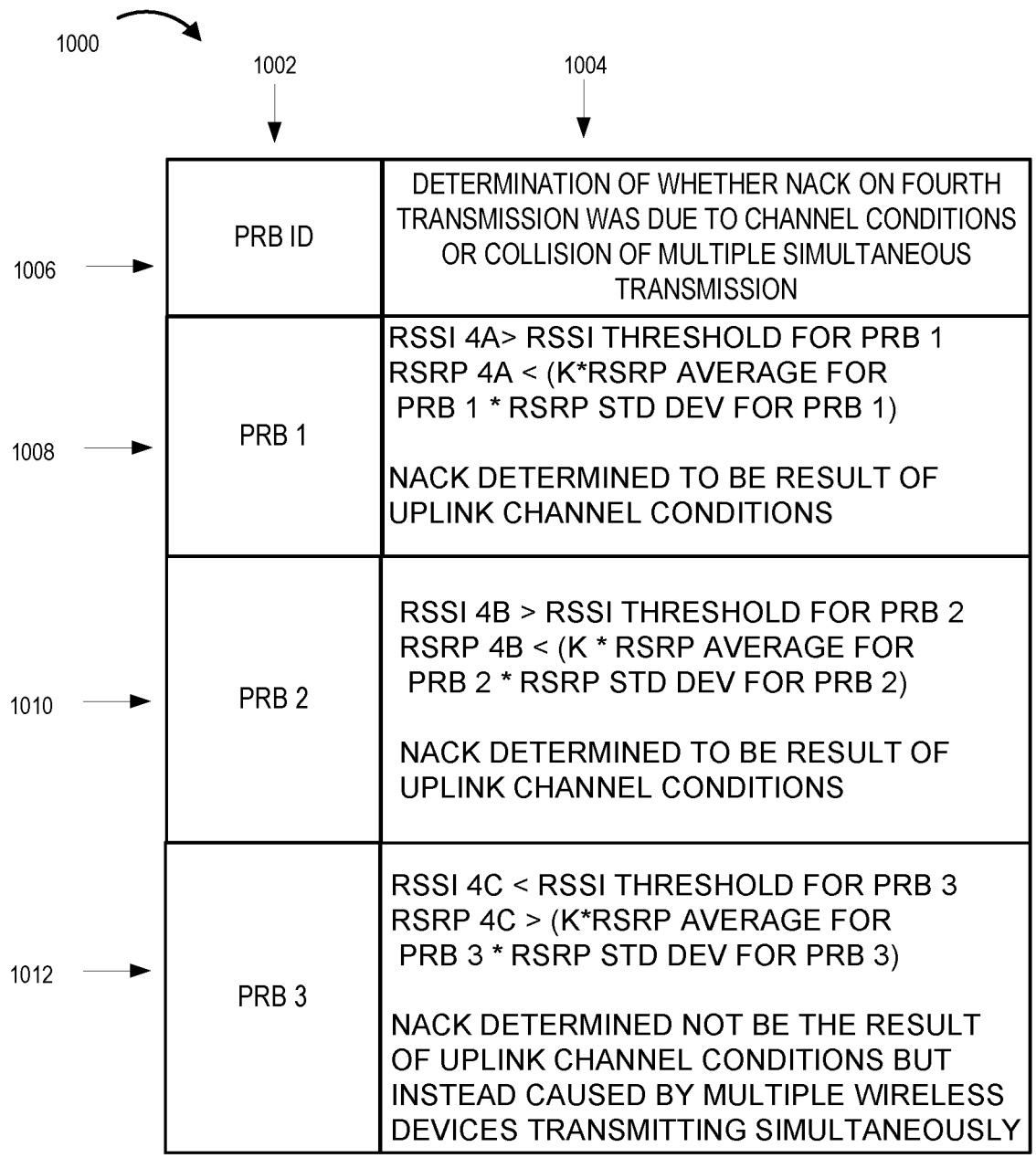
FIG. 10 illustrates an exemplary record maintained by a wireless device, e.g., a mobile terminal, in the form of a table that shows metrics and decisions made by a wireless device in connection with uplink data transmission failures.

FIG. 10 illustrates an exemplary record 1000 maintained by a wireless device, e.g., a mobile terminal, in the form of a table that shows metrics and decisions made by a wireless device in connection with uplink data transmission failures.

Information contained in record 1000 shows information, and determinations made regarding whether a transmission failure is the result of uplink channel conditions or a collision resulting from multiple wireless devices transmitting in the same resource block, e.g., physical resource block.

Table 1000 includes columns 1002, 1004 and rows 1006, 1008, 1010, and 1012. The first row 1006 includes labels identifying the information contained in the each of the columns. The entries in column 1002 identify physical resource block ID (col. 1002, row 1006 entry). The determination whether NACK resulted from channel conditions or collisions of simultaneous data transmissions (column 1004, row 1006) indicates that the entries in column 1004 correspond to a fourth data transmission using the PRB identified in the same row. The table 1000 represents a fourth data transmission by the wireless device that created the table 900. The fourth data transmission occurring after the third data transmission measurements and metric determinations shown in table 900 column 908. The fourth data transmission resulting in a NACK message or signal being received by the wireless device for each of PRB 1, PRB 2, and PRB 3. PRB 1, PRB 2, and PRB 3 for illustrative purposes in connection with table 1000 are each part of a different non-exclusive shared resource grant allocated/granted to the wireless device.

As the information in row 1008 indicates, the wireless device measured RSSI 4A value for the fourth data transmission is greater than RSSI threshold for PRB 1. (col. 1004, row 1008). The wireless device measure RSRP 4A value for the fourth data transmission is less than K*RSRP average for PRB 1*RSRP Standard Deviation for PRB 1 which is the K*RSRP average 3A*RSRP standard deviation 3A determined after the third data transmission. K is a number having a value greater than 1. The value of K is sometimes based on additional factors including the location and/or velocity of the wireless device. In this example, K is 3. The wireless device determines that the NACK received in response to the fourth data transmission of uplink data using PRB 1 by the wireless device was determined to be the result of the uplink channel conditions and not the result of multiple wireless devices transmitting simultaneously using the PRB 1. In some embodiments, the RSSI threshold for PRB 1 is the moving RSSI average for PRB 1 times a multiplier, the multiplier having a value greater than 1. In such an embodiment, the RSSI threshold for PRB 1 would be RSSI average 3A value times a multiplier greater than 1 such as for example 1.2.

As the information in row 1010 indicates, the wireless device measured RSSI 4B value for the fourth data transmission is greater than RSSI threshold for PRB 2. (col. 1004, row 1010). The wireless device measured RSRP 4B value for the fourth data transmission is less than K*RSRP average value for PRB2*RSRP Standard Deviation for PRB 2 which is the K*RSRP average 3B*RSRP standard deviation 3B determined after the third data transmission. K is a number having a value greater than 1. The value of K is sometimes based on additional factors including the location and/or velocity of the wireless device. In this example, K is 3. The wireless device determines that the NACK received in response to the fourth data transmission of uplink data using PRB 2 by the wireless device was determined to be the result of the uplink channel conditions and not the result of multiple wireless devices transmitting simultaneously using the PRB 2.

As the information in row 1012 indicates, the wireless device measured RSSI 4C value for the fourth data transmission is less than RSSI threshold for PRB 3. (col. 1004, row 1012). The wireless device measure RSRP 4C value for the fourth data transmission is greater than K*RSRP average for PRB 3*RSRP Standard Deviation for PRB 3 which is the K*RSRP average 3C*RSRP standard deviation 3C determined after the third data transmission. K is a number having a value greater than 1. The value of K is sometimes based on additional factors including the location and/or velocity of the wireless device. In this example, K is 3. The wireless device determines that the NACK received in response to the fourth data transmission of uplink data using PRB 3 by the wireless device was determined not to be the result of the uplink channel conditions but instead was the result of a collision of multiple wireless devices transmitting simultaneously using the PRB 3.

While the determination of what caused the received NACK for PRB 1, PRB 2, and PRB 3 during the fourth transmission of data using the PRB 1, PRB 2, and PRB 3 in the example of FIG. 10 uses both the RSSI value and RSRP value measured during the fourth transmission for each PRB in some embodiments only the RSSI value or the RSRP value is used to make the determination of whether the uplink channel condition or simultaneous transmission caused the resulting NACK.

Citizens Broadband Radio Service networks are networks that include user equipment devices, e.g., mobile or wireless devices such as for example wireless sensors, wireless vehicle devices, cell phones, smart phones, laptops, tablets, smart TVs, Citizens Broadband Radio Service Devices (CBSDs) which serve as access points/base stations, and Spectrum Access Systems which provides spectrum assignments and manage frequency interference through power management of the CBSDs transmission power. The Citizens Broadband Radio Service network utilizes the 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

Various embodiments of the present invention describe methods, apparatus, systems and techniques for managing and/or utilizing uplink resource grants and/or assignments for mobile terminals, e.g., smartphones, wireless sensors, wireless vehicle devices, etc., in wireless networks therein providing wireless services in an efficient and effective manner. In some embodiments of the present invention, Citizen Broadband Radio Service spectrum, 3.5 GHz frequency spectrum band, is used to serve nomadic and stationary users. The invention is useful to provide broadband services to geographically isolated or remote areas, e.g., rural areas, where wired or optical connections are expensive and not economical given the number of customers to be serviced.

In the some embodiments of the present invention, a CBRS Customer Premise Equipment device (CPE) is located at a customer's premises inside of a house, business or any place where there are CBRS network users. The CBRS CPE device is coupled or connected to at least one CBRS fixed wireless access (FWA) tower base station (e.g., CBSD) over wireless communications links. The CBRS CPE is typically located in a building such as a home and is coupled to one or more antennas or an antenna array through which the CBRS CPE device transmits to and receives from the antenna(s) of the CBRS FWA tower base station (CBSD) wireless signals over the wireless communications link. These wireless communications links being in the 3.5 GHz frequency spectrum band. The CBRS CPE device in some embodiments includes external antennas. In some embodiments, the CBRS CPE device includes one or more internal antennas. In some embodiments, the CBRS CPE device includes one or more internal antennas and one or more antenna ports to which one or more external antennas are connected. The CBRS CPE device is coupled through a wired connection, e.g., a cable to one or more Wireless Fidelity (Wi-Fi) Access Points. The CBRS CPE device also referred to herein as CPE device or CPE serves the subscribers or users located in its coverage area, e.g., in the house, building, or on the customer's premises. The one or more Wi-Fi access points provide Wi-Fi services to the one or more end point devices or user equipment devices located at the customer premises. The one or more Wi-Fi access points are connected over a cable or wired communications to the CBRS CPE device through which backhaul is provided. The CBRS CPE devices are not mobile but are fixed location devices that the wireless base station serves in addition to the mobile terminals in the wireless base station's coverage area.

The wireless base station in the exemplary embodiment is a CBSD device and as such its transmission power levels and spectrum bandwidth are allocated or assigned to it via a Spectrum Access System of the CBRS network. The CBRS network includes multiple CBSD devices though only a single wireless base station, CBSD, is shown in the exemplary system 100 illustrated in FIG. 1.

Each wireless base station, e.g., CBSD, is coupled to and registered with a CBRS network Spectrum Access System (SAS) of the CBRS network. The CBRS network Spectrum Access System manages the allocation of CBRS network spectrum and transmission power levels. The SAS is responsible for assigning/allocating spectrum to the wireless base station. The wireless base station manages the downlink and uplink resource assignments/grants to be utilized by the wireless devices, e.g., mobile terminals, e.g., smartphones, wireless phones, media player, mobile user devices, wireless sensors, wireless vehicle devices, and fixed wireless devices, e.g., CPE devices, connected and/or attached to the wireless base station.

The transmission power levels allocated for the wireless base stations, e.g., CBSDs, are high in comparison to the transmission power level of the mobile terminals or fixed wireless terminals.

FIG. 1 illustrates an exemplary wireless communications system 100 illustrated as a CBRS network communications system, having an architecture implemented in accordance with an embodiment of the present invention and being coupled to a network 190 (e.g., the internet). The communications system 100 also referred to as the CBRS communications network system 100 includes at least one wireless base station 1 102 illustrated as a Citizens Broadband Radio Service Device (CBSD) (e.g., CBSD 1), a plurality of Spectrum Access System devices (SAS 1 116, SAS 2 184), a plurality of mobile terminals (MT 1 104, MT 2 106, MT 3 108, MT 4 110, MT 5 112, . . . , MT X 114, X being integer greater than 5), an ESC system 186, a FCC Database System 182, and a plurality of communications links 118, 120, 122, 123, 124, 126, 143, 140, 170, 172, 173, 176, 178, and 181. The CBRS system 100 is coupled to a network 190, e.g., the Internet, through which various services can be provided such as for example voice over internet call services, video on demand services, video conferencing services, sensor uplink services, vehicle sensor data upload, vehicle software download. In some embodiments, the network is a part of a 5G/CBRS network and the services are provided from CBRS network service providers. In the example system shown in FIG. 1 the wireless base station 102, e.g., CBSD 1, is illustrated as being coupled or connected to the network 190 via communications link 143 which may be a wired, wireless or an optical link. Though not shown the CBRS network typically includes other wireless base stations, e.g., CBRS tower base stations or CBSDs, which are also typically coupled or connected to the network 190 via communications links. In some embodiments, the wireless base stations, e.g., CBRS tower base stations or CBSDs, are coupled to a packet gateway system which is part of and located in the network 190.

The wireless base station 102, e.g., CBSD 1 102, supports mobile terminals which may be, and in some embodiments do, include user equipment devices which communicate with the CBSD 1 102 using a 5G new radio protocol or CBRS wireless protocol. In some embodiments, the mobiles terminals are CBRS user equipment devices or mobile terminals that communicate using 3.5 GHz wireless spectrum. In wireless communications system 100, the MT 1 104, MT 2 106, MT 3 108, MT 4 110, MT 5 112, . . . , MT X 114 are mobile terminals. In some embodiments, some of MT devices wireless connected to the wireless base station may instead be fixed wireless terminals, user equipment devices, or Customer Premises Equipment devices. In such systems, the wireless base station 102 supports both fixed and mobile terminals and allocates or assigns uplink resource data transmission grants among all of the wireless terminals (fixed and mobile terminals) connected and/or attached to the wireless base station 102.

The SAS 1 116 is coupled to SAS 2 184 via communications link 178. SAS 1 110 is coupled to FCC Databases 182 via communications link 176. SAS 2 184 is coupled to FCC Databases 182 via communications link 181. ESC system 186 is coupled to SAS 1 116 and SAS 2 184 via communications links 170 and 172 respectively. The ESC System 186 is coupled to the FCC Databases 182 via communications link 173. The ESC system 186 is used to detect and/or sense Navy radar operations in CBRS operation within 3550-3650 MHz near the coasts and provide notifications over the communications links to SAS 1 116 and SAS 2 184. SAS 1 116 manages the CBRS base station 1 102 spectrum allocation and transmission power to limit interference in the CBRS network. SAS 2 184 manages CBSDs including other CBSD or wireless base stations in the CBRS network which are not shown in FIG. 1. SAS 1 116 and SAS 2 184 communicate and share information regarding the CBRS network coverage of the CBSDs in the network each respectively manage and coordinate management of the allocation of spectrum and power transmission levels of CBSDs throughout the CBRS network. While only two SAS devices are shown in FIG. 1, it should be understood that additional SAS devices are typically used in the CBRS network. In some embodiments, one or more of the CBSD wireless base stations of the CBRS network are also coupled or connected to each other either through wired and/or wireless communications links so that they can communicate and exchange information.

In the exemplary embodiment, the communications links 118, 120, 122, 123, 124, and 126 are wireless communications links in the 3.5 GHz frequency spectrum band. The communications link 118 couples or connects the wireless base station 102, e.g., CBSD 1 102, to MT 1 104. The communications link 120 couples or connects wireless base station 102 to MT 2 106. The communications link 122 couples or connects wireless base station 102 to MT 3 108. The communications link 123 couples or connects wireless base station 102 to MT 4 110. The communications link 124 couples or connects wireless base station 102 to MT 5 112. The communications link 126 couples or connects wireless base station 102 to MT X 114.

Communications links 140, 143, 170, 172, 173, 176, 178, 181 are typically wired communications links or fiber optical cables. Communications link 140 couples or connect SAS 1 116 to wireless base station 102, e.g., CBSD 1 102.

It is to be understood that the communications links shown in system 100 are only exemplary and other network configurations and communications links may be employed that couple together the devices, base stations, access points, nodes, entities, and databases of the system 100. Elements or steps with the same reference numbers used in different figures are the same or similar and those elements or steps will not be described in detail again.

While for the sake of simplicity in explaining the invention system 100 only illustrates a single wireless base station shown as CBSD 1 102, two SAS devices and a few mobile terminals, it will be appreciated that system 100 typically includes a large plurality of wireless base stations, e.g., CBRS tower base stations or CBSDs, each of the wireless base stations servicing a large plurality of mobile terminals as well as in some embodiments fixed wireless terminals, with the wireless base stations being managed by a plurality of SAS devices which are in communication with one another.

Figure 4:
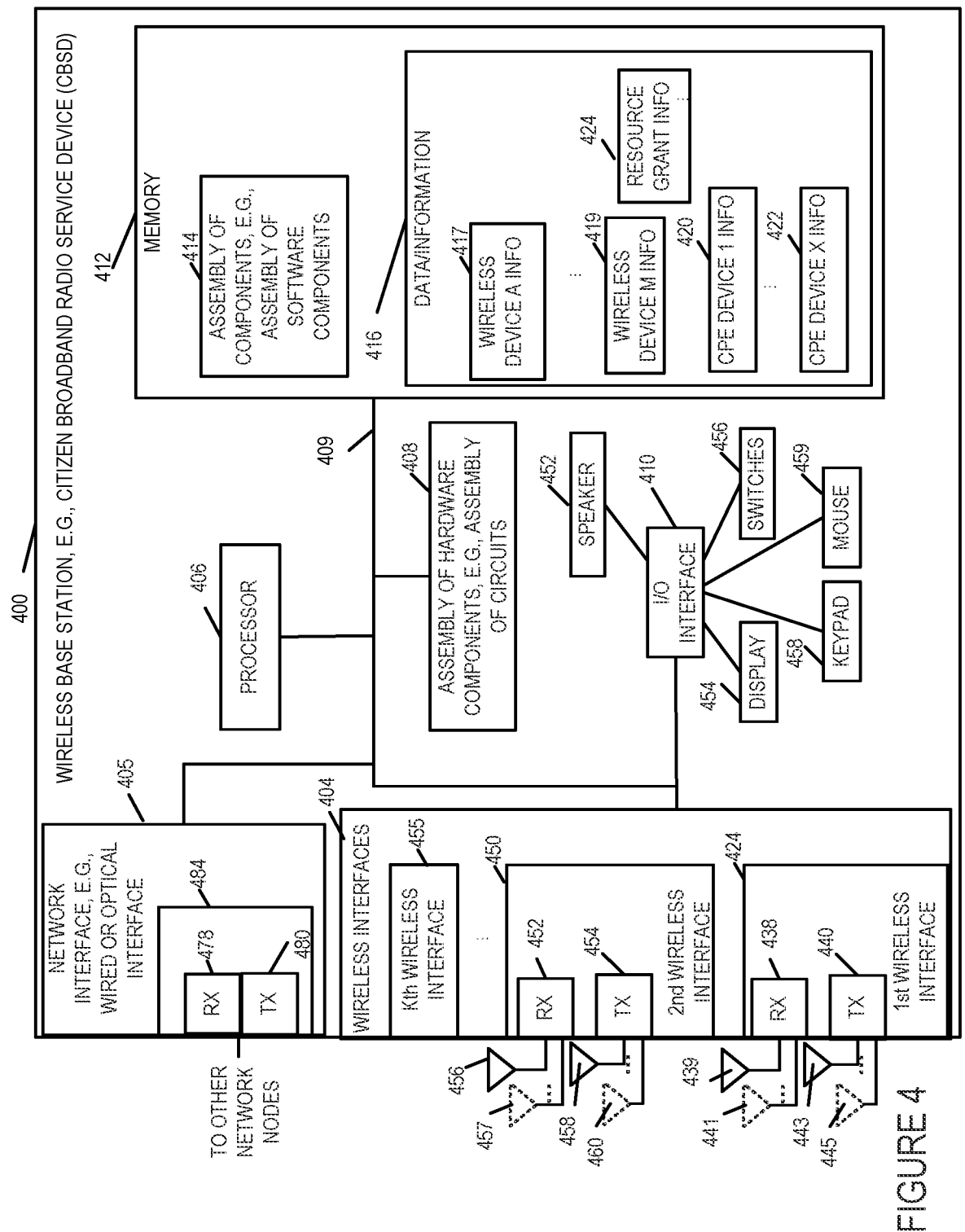
FIG. 4 illustrates details of an exemplary wireless base station, e.g., a Citizens Broadband Radio Service Device, in accordance with an embodiment of the present invention.

FIG. 4 is a drawing of an exemplary wireless base station 400, e.g., a Citizens Broadband Radio Service Device (CBSD) 400, in accordance with an exemplary embodiment. Exemplary wireless base station 400, e.g., CBSD 400, includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the wireless devices including mobile wireless terminals and fixed wireless terminals. The first wireless interface 424 is used for example to communicate with wireless devices, e.g., a mobile terminal such as MT 1 104. The second wireless interface can also be used to communicate with wireless such as mobile terminals, e.g., CBRS enabled user equipment device or fixed terminals, e.g., CPE devices. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a mobile terminal, a fixed terminal, a CPE device, aCBRS user equipment device, etc. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a mobile terminal, a fixed terminal, a CPE device, aCBRS user equipment device, etc. The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., a mobile terminal, a fixed terminal, a CPE device, aCBRS user equipment device, etc., using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a SAS system, other networks, e.g., internet, or other wireless base stations.

Memory 412 includes an assembly of components 414, e.g., an assembly of software components, and data/information 416. Data/information 416 includes wireless device information corresponding to a plurality of wireless devices (wireless device A information 417, . . . , M information 419 where A to M are the wireless devices being serviced by the wireless base station such as for example MT 1 104, MT 2 106, MT 3 108, MT 4 110, MT 5 112, . . . , MT X 114) and resource grant information 424. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example hundreds of CPE devices and thousands of user equipment devices and/or mobile terminals. The wireless device information includes wireless device profiles for the various mobile and fixed terminals being provided wireless services by the wireless base station. The wireless device information includes profile record(s), wireless device type (phone, sensor, media players, version, model, release), wireless device characteristics (uplink, downlink or balanced data traffic), wireless device attributes and/or capabilities (wireless protocols supported), information on the uplink data transmission resource grants assigned to the wireless device, the uplink resource utilization of the wireless device, the wireless device ID and/or signature used to identify/decode communications from the wireless device. In some embodiments, in which CPE devices are supported, CPE device information is tracked separately from other wireless devices. In CPE device 1 information 420, . . . , CPE device X Information 422. The CPE device information includes information for a CPE device including CPE device profile record(s), information on the uplink data transmission resource grants assigned to the CPE device, the uplink resource utilization of the CPE device, the CPE device ID and/or signature used to identify/decode communications from the CPE device. The resource grant information 424 includes information on the uplink data transmission resource grants assigned to each wireless device, e.g., mobile terminal or fixed wireless terminal, e.g., CPE device, supported and/or connected to the wireless base station, an indication of which resources/resource grants are being shared, the number of collisions on a shared resource, statistics on the utilization of resources by the wireless devices, the set of resource blocks included in each resource grant, the number of skipped uplink data transmission opportunities for each resource grant and each wireless device, the amount of resource blocks in a set of resource blocks utilized during each uplink data transmission, statistics on the resource blocks and/or resource grants being fully utilized and/or amount of utilization of the resource blocks and/or resource grants. In some embodiments, one or more of the wireless base stations discussed and/or shown in the Figures and/or in connection with the methods discussed herein including wireless base station 102 are implemented in accordance with the wireless base station 400.

Figure 5:
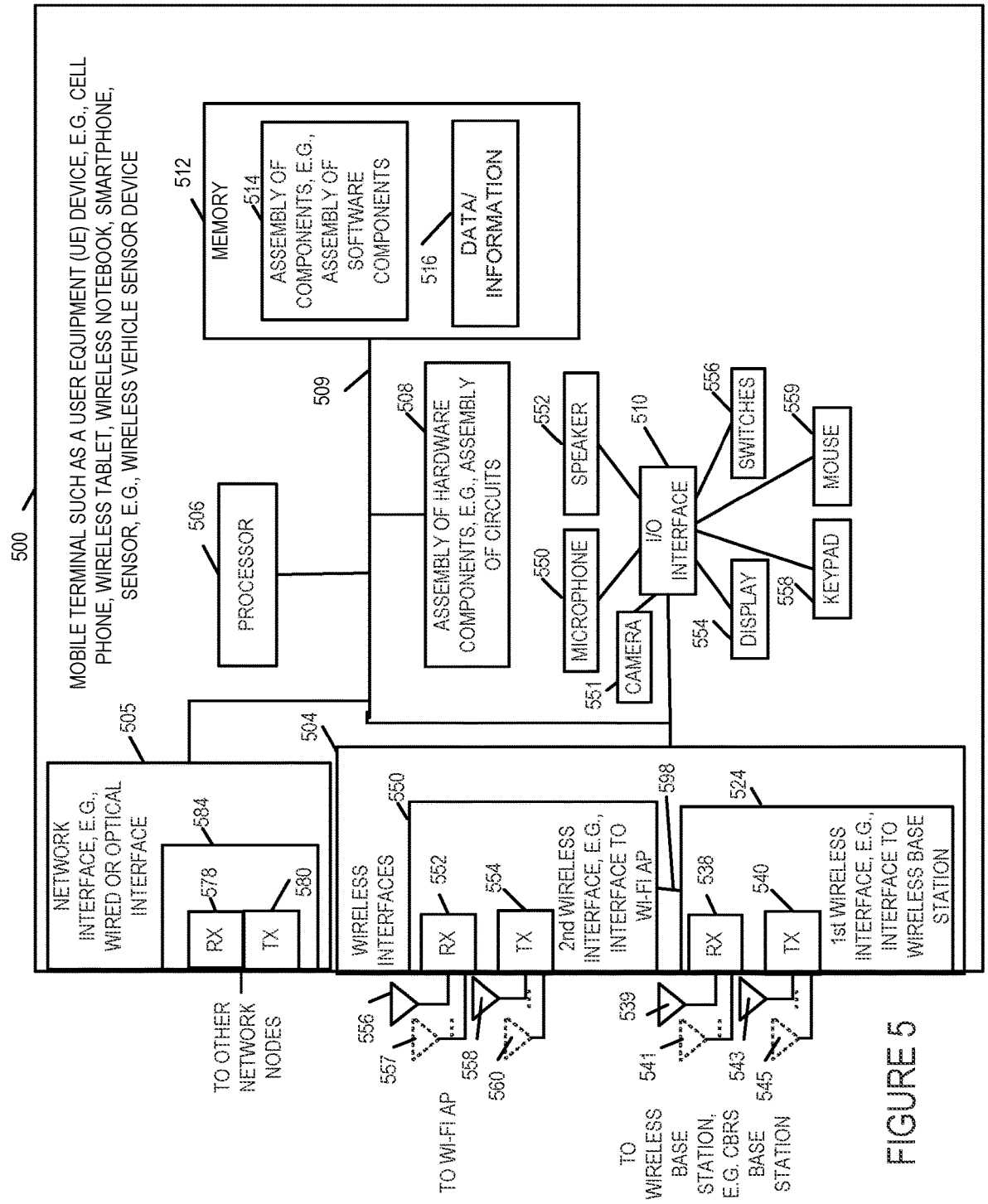
FIG. 5 illustrates details of an exemplary mobile terminal in accordance with one embodiment of the present invention.

FIG. 5 is a drawing of an exemplary mobile terminal 500 in accordance with an exemplary embodiment. Mobile Terminal (MT) 500 is, e.g., a wireless mobile device such as a cell phone, a smart phone, wireless tablet or wireless notebook, a smartTV, wireless sensors, wireless vehicle sensors and/or devices. Mobile terminal 500 includes optional WiFi device capabilities. Mobile terminal 500 is enabled to communicate using a wireless protocol, e.g., 5G wireless protocol, 5G new radio wireless protocol, CBRS wireless protocol or cellular wireless protocol in addition to the optional Wi-Fi protocol. The mobile terminal 500 in some embodiments is a CBRS user equipment device operating at the 3.5 GHz band which also has Wi-Fi capabilities and can be operated to work in dual mode where it is capable of receiving packets via two different paths or two different wireless protocol connections. For example the first path or wireless protocol connection being a Wi-Fi protocol connection or channel and a second path or wireless protocol connection being via a 5G wireless protocol connection or channel (e.g., 5G New Radio wireless protocol), CBRS wireless protocol connection or channel or a cellular protocol connection or channel, e.g., a wireless protocol which supports pro-active uplink grants. Exemplary mobile terminal 500 includes wireless interfaces 504, a network interface 505, a processor 506, e.g., a CPU, an assembly of hardware components 508, e.g., an assembly of circuits, and I/O interface 510 and memory 512 coupled together via a bus 509 over which the various elements may interchange data and information. Mobile terminal 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the mobile terminal. Network interface 505 includes a receiver 578 and a transmitter 580. The network interface 505 can be coupled to other devices, e.g., a printer or router, or to wired (e.g., cable) or optical (e.g., fiber-optic) networks. In some embodiments, receiver 578 and transmitter 580 are part of a transceiver 584.

Wireless interfaces 504 include a plurality of wireless interfaces including first wireless interface 524 and a second wireless interface 550. The first wireless interface 524 is used to communicate with the wireless base station, e.g., CBSD base station. The second wireless interface is optional and is used to communicate with a Wi-Fi Access Point. The first wireless interface 524 includes wireless receiver 538 and a wireless transmitter 540. In some embodiments, receiver 538 and transmitter 540 are part of a transceiver. In various embodiments, the first wireless interface 524 includes a plurality of wireless receivers and a plurality of wireless transmitters. Wireless receiver 538 is coupled to a plurality of receive antennas (receive antenna 1 539, . . . , receive antenna M 541), via which mobile terminal 500 can receive wireless signals from other wireless communications devices including a wireless base station, e.g., wireless base station 102, e.g., CBSD 102 for example using 3.5 GHz bandwidth spectrum. Wireless transmitter 540 is coupled to a plurality of wireless transmit antennas (transmit antenna 1 543, . . . , transmit antenna N 545) via which the mobile terminal 500 can transmit signals to other wireless communications devices including a second wireless communications device, e.g., wireless base station such as a CBRS base station. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the mobile terminal and the mobile terminal includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including a second wireless communications device, e.g., a Wi-Fi Access Point using Wi-Fi protocol. Wireless transmitter 554 is coupled to one or more wireless transmit antennas (transmit antenna 1 558, . . . , transmit antenna N 560) via which the mobile terminal 500 can transmit signals to other wireless communications devices including a second wireless communications device. The mobile terminal network interface 505 may be coupled to LAN or WAN networks or routers so that the mobile terminal can also obtain services via a hardwired connection in addition to through the wireless interfaces. In the exemplary embodiment the second wireless interface is a Wi-Fi wireless interface. The first wireless interface is connected or coupled to the second wireless interface via wire 598 so that the two interfaces can exchange information.

Memory 512 includes an assembly of components 514, e.g., an assembly of software components, and data/information 516.

In some embodiments, one or more of the mobile terminals shown in the figures or discussed herein for example in connection with the methods described including for example mobile terminals MT 1 104, MT 2 106, MT 3 108, . . . , MT 4 110, MT 5 112, . . . , MT X 114 are implemented in accordance with exemplary mobile terminal 500. While the mobile terminal 500 has been illustrated as a dual mode device that has two wireless interfaces 550 and 524, the mobile terminal 500 may be, and in some embodiments is, not a dual mode device but instead is a single mode operation device with a single wireless interface. The single wireless interface being the wireless interface 1 524 which is enabled to communicate with a wireless base station using a first wireless protocol, e.g., a 5G protocol or CBRS wireless protocol that utilizes proactive grants. For example, MT 1 104, MT 2 106, MT 3 108, MT 4 110, MT 5 112, . . . , MT X 114 in some embodiments include the first wireless interface 524 through which these devices communicate with the wireless base station 102 and do not include the second wireless interface 550 which is a Wi-Fi wireless interface.

Figure 7:
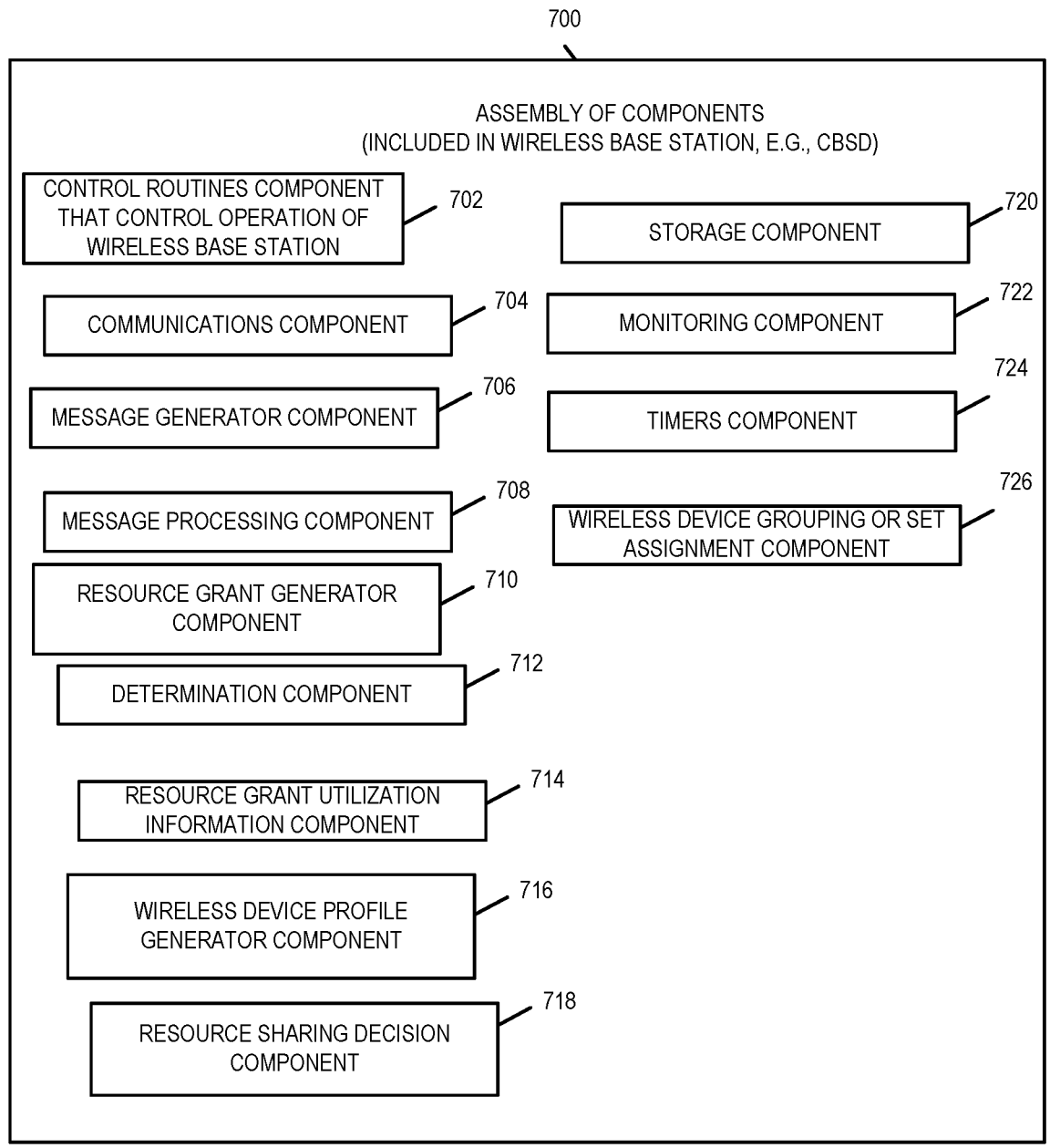
FIG. 7 illustrates an exemplary assembly of components for a wireless base station, e.g., CBSD, in accordance with an embodiment of the present invention.

FIG. 7 is a drawing of an exemplary assembly of components 700 which may be included in a wireless base station, e.g., exemplary wireless base station 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station device 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions or operations corresponding to one or more described and/or illustrated steps of an exemplary method.

Assembly of components 700 includes a control routines component 702, a communications component 704, a message generator component 706, a message processing component 708, a resource grant generator component 710, a determination component 712, a resource grant utilization component 714, a wireless device profile generator component 716, a resource sharing decision component 718, a storage component 720, a monitoring component 722, a timers component 724, a wireless device grouping or set assignment component 726.

The control routines component 702 is configured to control operation of the wireless base station. The communications component 704 is configured to handle communications, e.g., transmission and reception of messages, sending of ACK and NACK messages, and protocol signaling for the wireless base station. The message generator component 706 is configured to generate messages for transmission to other devices. The message processing component 708 is configured to process received messages and is sometimes a sub-component of communications component 704.

The resource grants generator component 710 is configured to generate resource grant schedules, resource grants, e.g., uplink data transmission resource grants for wireless devices, e.g., mobile terminals, and to generate updated resource grants/resource grant schedules based on resource utilization information.

The determination component 712 makes various determinations for the wireless base station including for example, determining resource grant schedules for wireless devices, determining resource grants, e.g., uplink data transmission resource grant assignments, for wireless devices, e.g., mobile terminals, determining which resource grants are to be shared by which wireless devices (e.g., mobile terminals), determining statistics based on measured or monitored utilization of resources and collisions in uplink data transmission attempts on shared uplink resources, determining skipped uplink data transmission opportunities, determining resource utilization information (e.g., uplink data transmission resource utilization per wireless device), determining which wireless device transmitted the data received on resource blocks of a shared resource grant, location of a wireless device, wireless device type, software type, version, and/or release, wireless device hardware type, version, and/or release, an amount of downlink traffic communicated from the wireless base station to a wireless device during a time period, an amount of uplink traffic communicated from a wireless device to a wireless base station during a time period.

The resource grant utilization information component 714 is configured to determine resource utilization information, e.g., the uplink data transmission resource utilization information, information indicating the number of uplink resource grant opportunities are skipped by a device, and the amount of grant resources utilized by a device during a period of time.

The wireless device profile generator component 716 generates wireless device profiles for example based on a wireless device's characteristics, attributes and/or properties including monitored activity such as uplink resource grant utilization. Wireless device profiles include a wireless device's type such as phone, vehicle, sensor, smartphone, mobile device, stationary device, hardware version/release, software version release, manufacturer identification information, device capabilities (e.g., wireless protocols supported).

The resource sharing decision component 718 makes decisions on which resources, e.g., uplink data transmission resources, e.g., set of resource blocks comprising an uplink resource grant, are to be shared by wireless devices, e.g., mobile terminals, for example based on information about the resource utilization of the uplink resources over a period of time.

The storage component 720 controls the storage and retrieval of information and data in the memory of the wireless base station.

The monitoring component 726 monitors wireless base station activities and wireless device activities of wireless devices connected and/or attached to the wireless base station. The monitoring of wireless base station activities includes monitoring the uplink data transmission resource grant utilization over a period of time, the number of collisions of uplink data transmitted from wireless devices (e.g., mobile terminals) and the number of skipped uplink data transmission opportunities.

The timers component 724 measures and tracks periods of time such as a first period of time and a second period of time.

The wireless device grouping or set assignment component 726 assigns wireless devices to a wireless device group and/or wireless device set based on utilization of granted uplink data transmission resources, e.g., set or sets of recurring resource blocks for transmitting data from the wireless device to the wireless base station.

Figure 8:
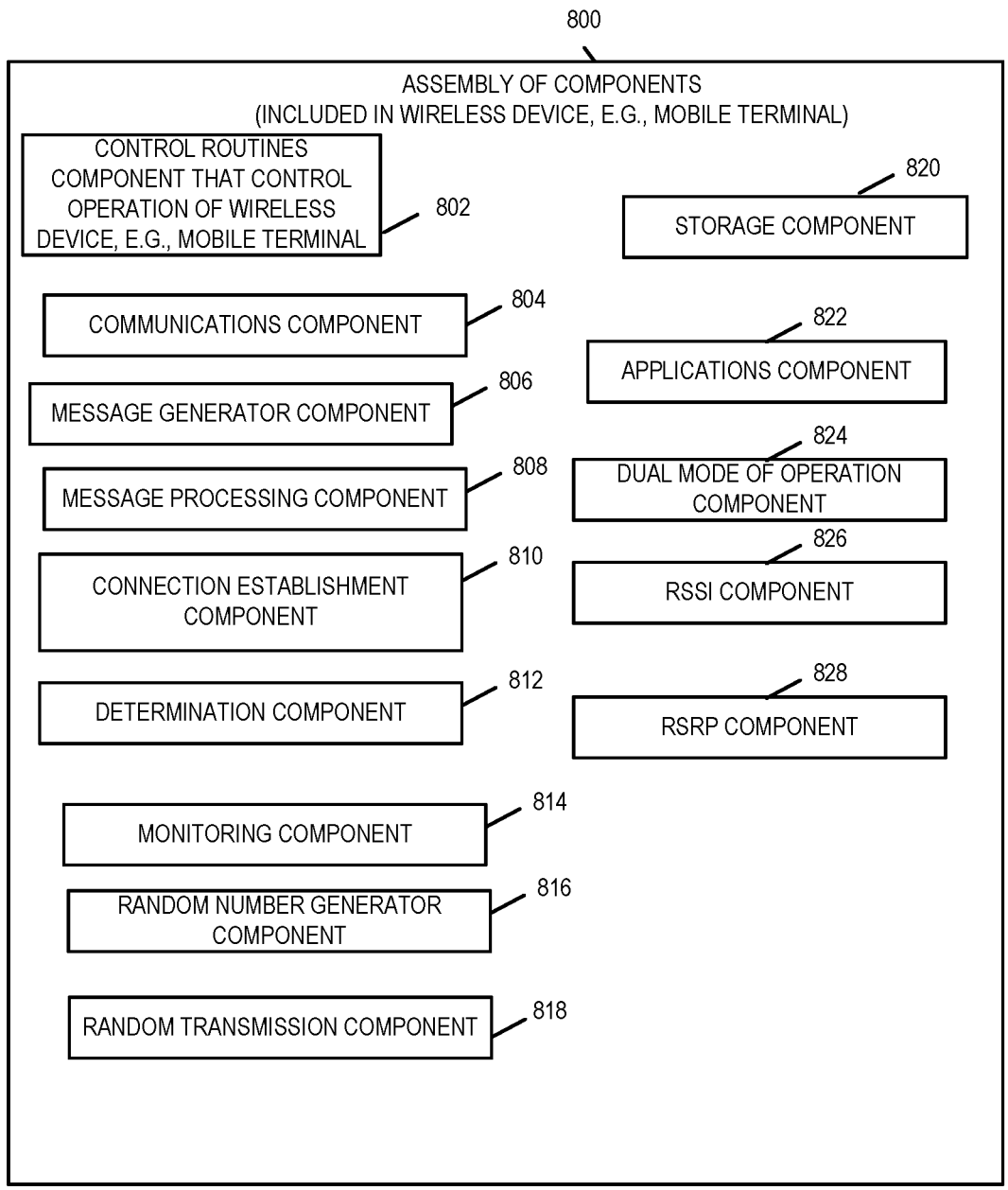
FIG. 8 illustrates an exemplary assembly of components for a mobile terminal in accordance with an embodiment of the present invention.

FIG. 8 is a drawing of an exemplary assembly of components 800 which may be included in an exemplary wireless terminal, e.g., a mobile terminal such as mobile terminal 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the mobile terminal 500, with the components controlling operation of mobile terminal 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the mobile terminal 500 or elements therein such as the processor 506, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method.

Assembly of components 800 includes a control routines component 802, a communications component 804, message generator component 806, a message processing component 808, a connection establishment component 810, a determination component 812, a monitoring component 814, a random number generator component 816, a random uplink transmission component 818, a storage component 820, an applications component 822, a dual mode of operation component 822, a RSSI component 824, and a RSRP component 826.

The control routines component 802 controls the operation of the wireless device. The communications component 804 performs operations for handling communications with other devices including generation, transmission, receiving, and processing messages, establishing connections, signal processing for different communications protocols. The message generator component 806 generates messages and signals, e.g., messages/signals to be sent to: (i) a wireless base station including access request signals/message and response/acknowledgement messages and (ii) Wi-Fi access points. In some embodiments, the message generator component 806 is a sub-component of communications component 804. The message processing component 808 processes received messages and performs operations in response to received messages.

The connection establishment component 810 handles establishment and termination of communications connections, e.g., device to device communications connections between the wireless device and wireless base stations and/or Wi-Fi Access Points. In some embodiments, the connection establishment component 810 is a sub-component of communications component 804.

The determination component 812 makes various determinations for the wireless device including whether the wireless device has any data to transmit in an uplink data transmission opportunity, whether to transmit using an uplink data transmission opportunity or not, whether to increase or decrease the use of a shared uplink data transmission grant for example in response to ACK and NACK messages, determining statistics for which uplink data transmission opportunities to utilize to avoid collisions, determining whether a received NACK message or signal was caused by RF channel dynamics such as interference or an obstruction of the RF channel, determining RSSI values, e.g., for resource blocks, determining RSRP values, e.g., for resource blocks, determining RSSI values for each resource block, e.g., physical resource block used to transmit uplink data from the wireless device to the wireless base station, determining RSSI values for each resource block in an uplink resource grant each time uplink data is transmitted in the resource block, determining an RSSI average value for each resource block over a period of time; determining RSRP values for each resource block in an uplink resource grant each time uplink data is transmitted in the resource block, determining an average RSRP value for each resource block over a period of time or a number of uses; determining a RSRP standard deviation for each resource block over a period of time or a number of uses, determining whether an RSSI value meets, exceeds or is less than a RSSI threshold, determining whether a RSRP value meets, exceeds or is less than a RSRP threshold, making decisions as to whether a NACK was received as a result of a collision, i.e., two or more wireless devices transmitting using the same resources, e.g., resource block; making decisions as to whether a NACK was received as a result of channel dynamics and/or RF interference.

The monitoring component 814 monitors for various conditions e.g., conditions indicative of a collision with another wireless device in an uplink data transmission attempt such as the receipt of a NACK message or signal in response to an uplink transmission, condition indicative of a successful uplink data transmission such as receipt of an ACK message or signal in response to an uplink transmission. The random number generator component 816 generates random numbers, e.g., between 0 and 1 using a gaussian distribution.

The random transmission component 818 randomly determines which shared resource grant transmission opportunities to utilize for transmitting uplink data, i.e., the component determines using random probability which uplink data transmission opportunities on a shared uplink data transmission resource grant, i.e., set of resource blocks shared for use with one or more other wireless devices, to use for sending uplink data to the wireless base station. The randomness of the use of the shared uplink resource grant is done to minimize or reduce the number of collisions when more than one wireless device is attempting to use the shared uplink data transmission resource. The random transmission component in some embodiments is a sub-component of the communications component 804.

The storage component 820 is responsible for the management of the storage and retrieval of data and information in the memory of the wireless device.

The applications component 822 is configured to provide various application services for the wireless device, e.g., voice over internet protocol calling services, video on demand services, media download services, conferencing services, internet access and web browsing services, sensor upload services, etc.

The dual mode of operation component 824 is configured to establish different transmission paths for receiving data packets using different wireless protocols (e.g., CBRS or 5G NR wireless protocol and Wi-Fi protocol) depending on the selection of the mode of operation.

The RSSI component 826 is configured to generate RSSI measurements for resource blocks, e.g., physical resource blocks, used to transmit uplink data, generate average RSSI measurements, e.g., running or moving averages of RSSI for resource blocks, make determinations of whether a RSSI measurement for a physical resource block is above, equal to or below a RSSI threshold, use RSSI measurements to determine if one or more received NACKs was the result of uplink channel conditions, and use RSSI measurements to determine if one or more received NACKs was the result of collisions of multiple wireless devices transmitting data using the same resource blocks or same uplink resource grant simultaneously.

The RSRP component 828 is configured to generate RSRP measurements or values for resource blocks, e.g., physical resource blocks, used to transmit uplink data, generate average RSRP measurements, e.g., running or moving averages of RSRP values for resource blocks, generate RSRP standard deviations for a resource block over a time period or a period including a number of uses; make determinations of whether a RSRP measurement for a physical resource block is above, equal to or below a RSRP threshold, use RSRP measurements to determine if one or more received NACKs was the result of uplink channel conditions, and use RSRP measurements to determine if one or more received NACKs was the result of collisions of multiple wireless devices transmitting data using the same resource block or blocks or the same uplink resource grant simultaneously.

Figure 2A:
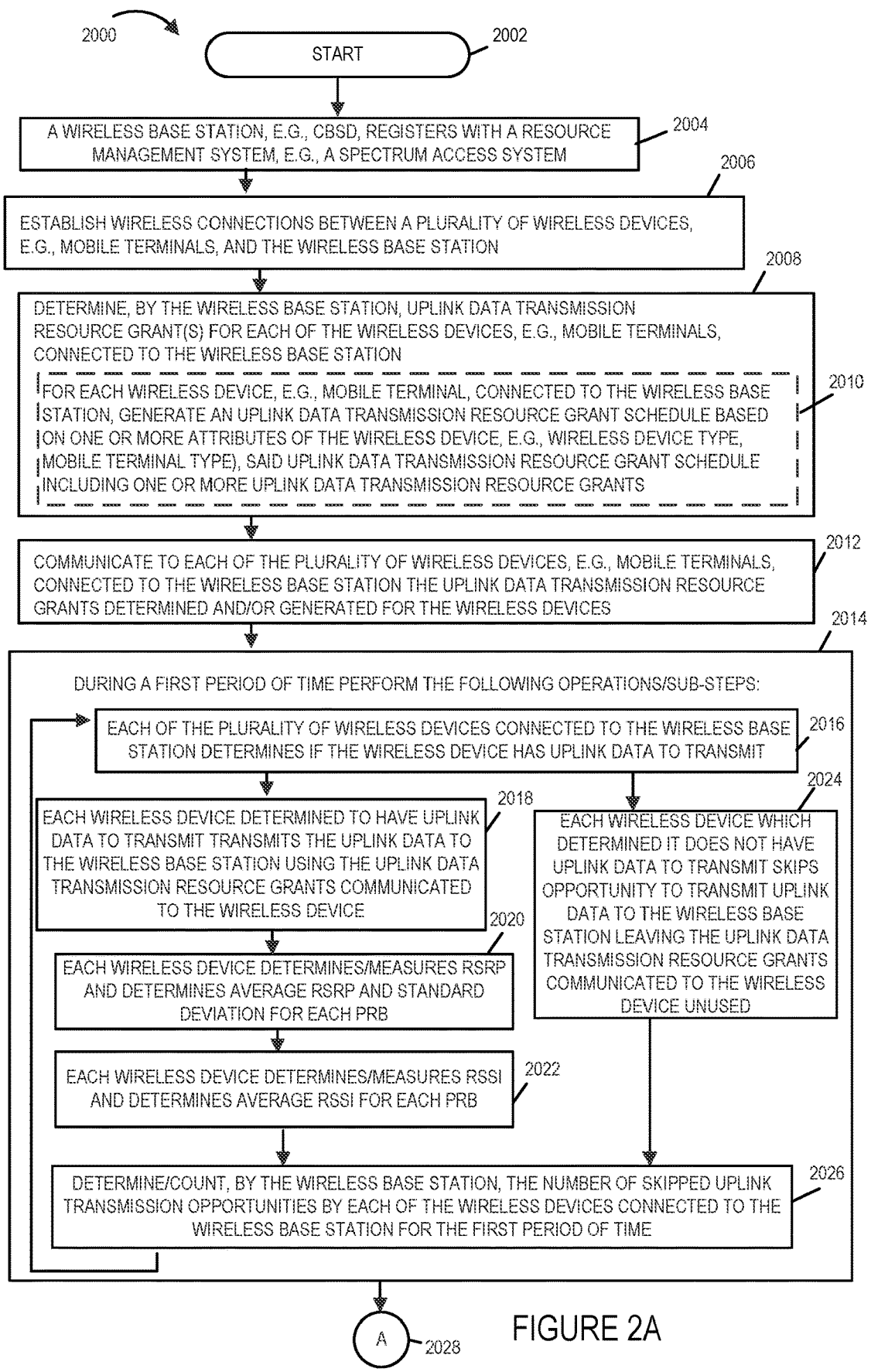
FIG. 2A illustrates the steps of the first part of an exemplary method in accordance with an embodiment of the present invention.
Figure 2C:
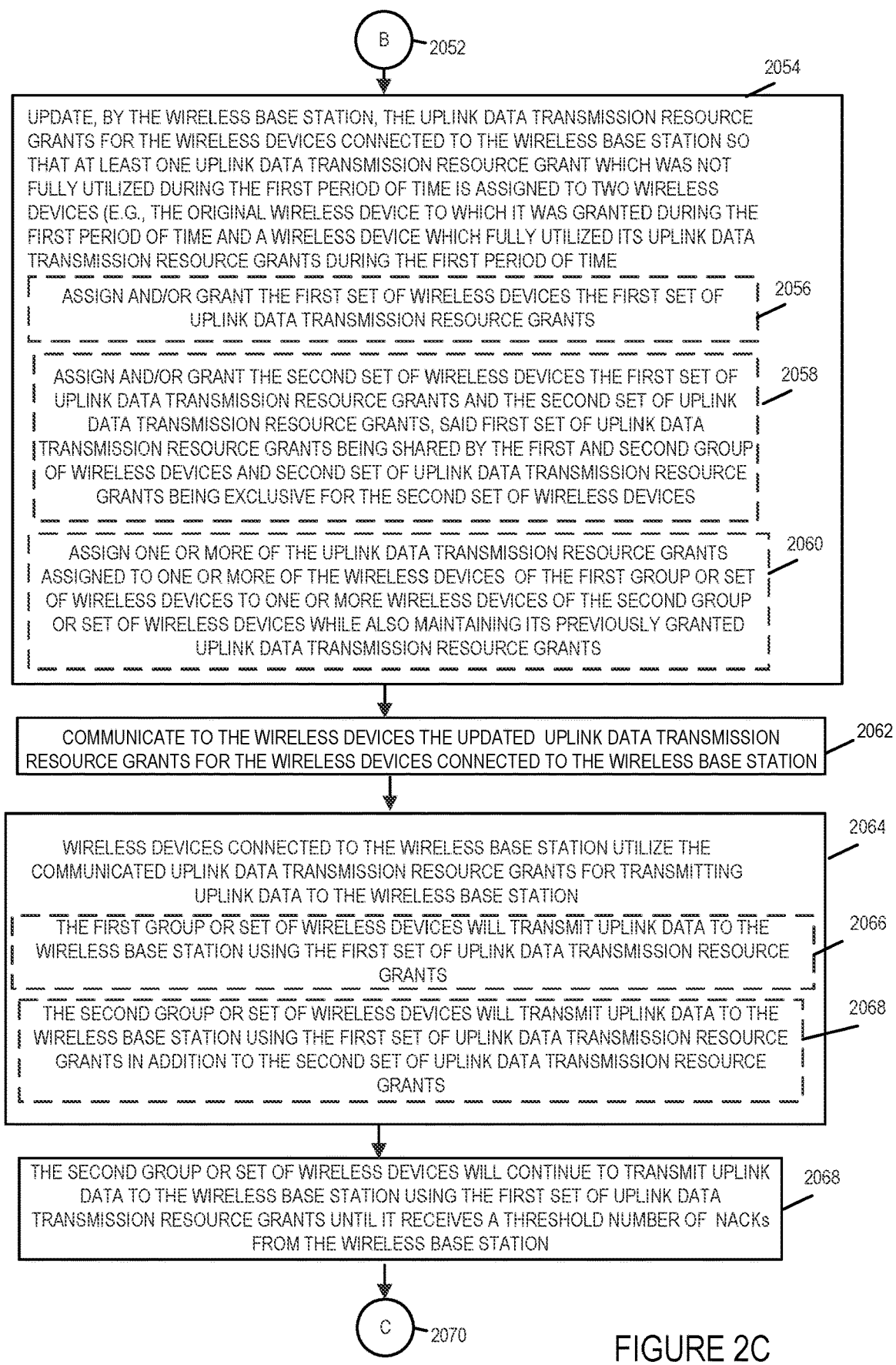
FIG. 2C illustrates the steps of the third part of an exemplary method in accordance with an embodiment of the present invention.
Figure 2D:
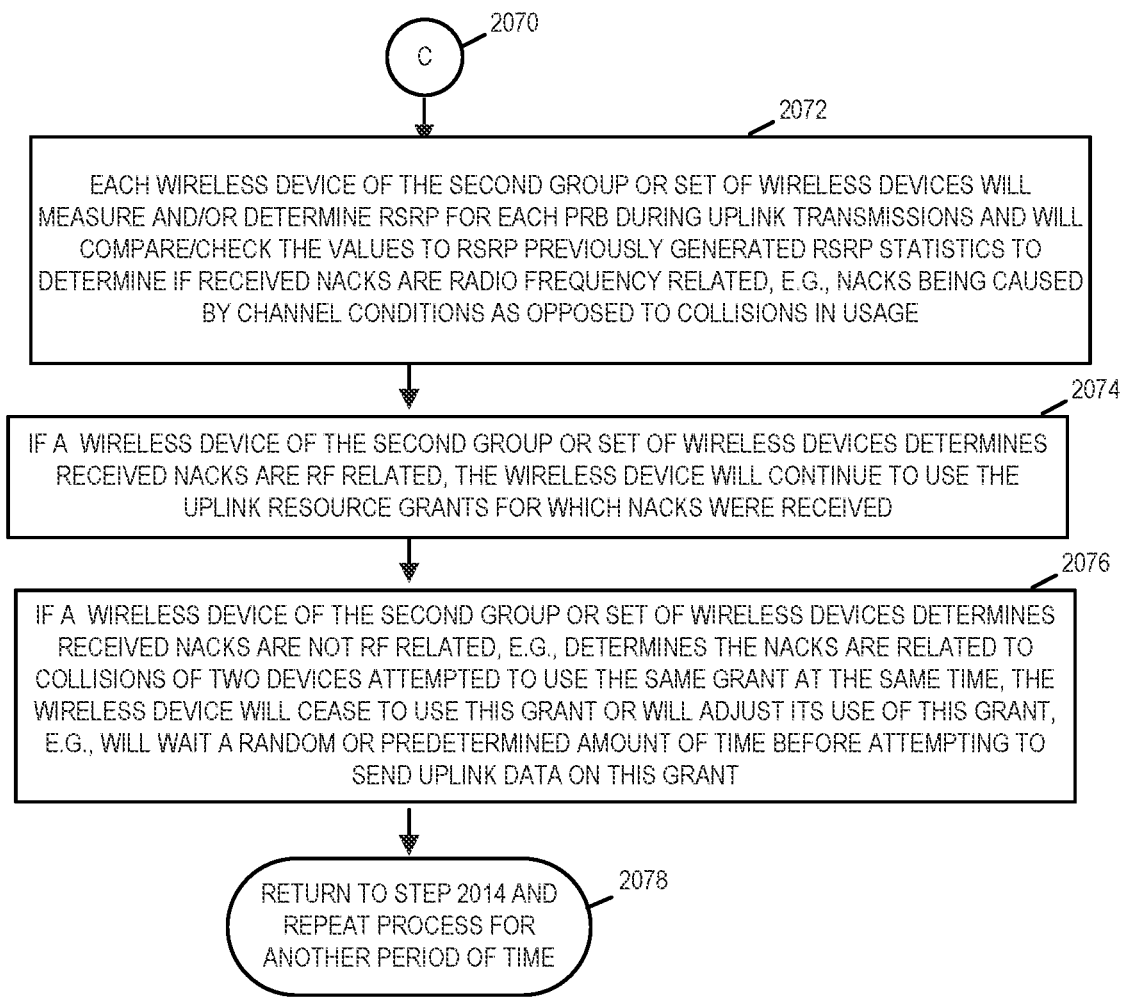
FIG. 2D illustrates the steps of the fourth part of an exemplary method in accordance with an embodiment of the present invention.

FIG. 2, which comprises the combination of FIGS. 2A, 2B, 2C, and 2D illustrates an exemplary method 2000. FIG. 2A illustrates the steps of the first part of an exemplary method 2000 in accordance with one embodiment of the present invention. FIG. 2B illustrates the steps of the second part of the exemplary method 2000 in accordance with one embodiment of the present invention. FIG. 2C illustrates the steps of the third part of the exemplary method 2000 in accordance with one embodiment of the present invention. FIG. 2D illustrates the steps of the fourth part of the exemplary method 2000 in accordance with an embodiment of the present invention.

For explanatory purposes the exemplary method 2000 will be explained in connection with the exemplary communications system 100 illustrated in FIG. 1 although it should be understood that the method may be implemented using other systems and other system configurations then those illustrated in FIG. 1. While it will be readily understood that additional steps and signaling are performed in connection with communicating information, messages, and packets between devices, the method 2000 focuses on and discusses the steps and signaling for understanding the invention.

The method 2000 shown in FIG. 2 will now be discussed in detail. The method starts in start step 2002 shown on FIG. 2A with the devices in system 100 being initialized and becoming operational. Operation proceeds from step 2002 to step 2004.

In step 2004, a wireless base station, e.g., CBSD 1 102 of system 100, registers with a spectrum access system, e.g., SAS 1 116, and obtains frequency spectrum in 3.5 GHz bandwidth to use for communicating with devices in a first wireless protocol format, e.g., a 5G new radio wireless protocol format, CBRS wireless protocol packet format, or a cellular wireless protocol format. Operation proceeds from step 2004 to step 2006.

In step 2006, wireless connections are established between a plurality of wireless devices, e.g., mobile terminals, and the wireless base station, e.g., MT 1 104, MT 2 106, MT 3 108, MT 4 110, MT 5 112, . . . , MT X 114 establish wireless connections with wireless base station 102 in system 100. Operation proceeds from step 2006 to step 2008.

In step 2008, the wireless base station (e.g., wireless base station 102) determines uplink data resource grant(s) for each of the wireless devices, e.g., mobile terminals, connected and/or attached to the wireless base station. The uplink data transmission resource grants for example identifying resource blocks, e.g., physical or logical resource blocks, that the wireless device is granted the right to use for transmitting uplink data from the wireless device to the wireless base station. The uplink data transmission resource grants are typically proactive grants that are fixed and which the wireless device, e.g., mobile terminal, is expected to use for transmitting its own uplink data at the time intervals specified by the grant using the resource blocks assigned to the wireless device by the wireless base station. In some embodiments, step 2008 includes sub-step 2010. In sub-step 2010, the wireless base station generates for each wireless device, e.g., mobile terminal, connected or attached to the wireless base station an uplink data transmission resource grant schedule based on one or more attributes of the wireless device, e.g., based on the wireless device type such as smartphone type, sensor type, vehicle device type, uplink traffic dominated device type, downlink traffic dominated device type, balanced traffic device type. The uplink data transmission resource grant schedule including one or more uplink data transmission resource grants. Operation proceeds from step 2008 to step 2012.

In step 2012, the wireless base station (e.g., wireless base station 102) communicates to each of the plurality of wireless devices, e.g., mobile terminals, connected and/or attached to the wireless base station the uplink data transmission resource grants, e.g., resource blocks and time interval, determined and/or generated for the wireless device. The uplink data transmission resource grants are communicated to the wireless devices in the downlink control information (DCI) transmitted to the wireless devices using the Physical Downlink Control Channel (PDCCH). Operation proceeds from step 2012 to step 2014.

In step 2014, during a first period of time the operations/sub-steps 2016, 2018, 2020, 2022, 2024m and 2026 are performed.

In sub-step 2016 each of the plurality of wireless devices, e.g., mobile terminals, connected to the wireless base station determines if the wireless device has uplink data to transmit. Operation proceeds from sub-step 2016 to sub-steps 2018 and 2024. Operation proceeds to sub-step 2018 when the determination is that the wireless device has uplink data to transmit. Operation proceeds to sub-step 2024 when the determination is that the wireless device does not have uplink data to transmit.

In sub-step 2018, each wireless device determined to have uplink data to transmit to the wireless base station transmits the uplink data to the wireless base station using the uplink data transmission resource grants (e.g., granted right to use uplink resource blocks assigned to the wireless device) communicated to the wireless device from the wireless base station. Operation proceeds from sub-step 2018 to sub-step 2020. In sub-step 2020, each wireless device, e.g., mobile terminal, determines and/or measures the Reference Signal Received Power (RSRP) and determines the average RSRP and standard deviation for each physical resource block, e.g., each PRB on which the mobile terminal is transmitting uplink data. Operation proceeds from sub-step 2020 to sub-step 2022.

In sub-step 2022, each wireless device determines and/or measures the Received Signal Strength Indictor (RSSI) and determines the average RSSI for each physical resource block, e.g., each PRB on which the mobile terminal is transmitting uplink data. Operation proceeds from sub-step 2022 to sub-step 2026.

Returning to sub-step 2024, each wireless device which determined it does not have uplink data to transmit to the wireless base station skips the opportunity to transmit uplink data to the wireless base station leaving the uplink data transmission resource grants communicated to the wireless device unused (e.g., the resource blocks granted to the wireless device are not used). Operation proceeds from sub-step 2024 to sub-step 2026.

In sub-step 2026, the wireless base station determines and/or counts the number of skipped uplink transmission opportunities by each of the CPE devices connected to the wireless base station for the first period of time. Operation proceeds from sub-step step 2026 back to sub-step 2016 where the process repeats for the duration of the first period of time. Operation proceeds from step 2014 to step 2030 shown on FIG. 2B via connection node A 2028 when the sub-step 2014 is completed for first period of time.

In step 2030, the wireless base station determines an uplink resource utilization rate at each uplink data transmission for each wireless device for the first time period. Operation proceeds from step 2030 to steps 2032 or step 2038 based on the determination made.

In step 2032, the wireless base station determines whether uplink data transmission resources are utilized by the wireless devices, e.g., mobile terminals, connected to the wireless base station more than a first threshold value for the first period of time. In some embodiments the first threshold value is one of the following values 50%, 75% or 85%. It should be understood that these values are only exemplary and other threshold values may be used. Operation proceeds from sub-step 2032 to sub-step 2034.

In step 2034, when the uplink data transmission resources are determined to be utilized by the wireless devices more than the first threshold value, the wireless base station keeps or maintains the current uplink resource grant schedule for the wireless devices connected to the wireless base station. Operation proceeds from step 2034 to step 2036. In step 2036, the method returns to step 2014 and the process is repeated for another or an additional period of time.

In step 2038, when the uplink data transmission resources are determined to not be utilized by the wireless devices, e.g., mobile terminals, more than the first threshold value the following operations/sub-steps 2040 and 2046 are performed. In step 2040, the wireless base station determines which wireless devices do not fully utilize the uplink data transmission resource grants granted to the wireless devices for use during the first period of time. In some embodiments, sub-step 2040 includes sub-steps 2042 and 2044. In sub-step 2042, the wireless base station determines a first group or set of wireless devices which do not fully utilize the uplink data transmission resources granted to the wireless devices, e.g., the group or set of wireless devices which skipped an opportunity for uplink transmission. In some embodiments, sub-step 2042 is performed in sub-step 2026 and stored in memory which is then retrieved in sub-step 2042. In sub-step 2044, the wireless base station determines which uplink data transmission resource grants have been granted to the first group or set of wireless devices, said determined uplink data transmission resource grants for first group or set of wireless devices being a first set of data transmission resource grants.

In sub-step 2046, the wireless base station determines which wireless devices do fully utilize the uplink data transmission resources granted to the wireless devices. In some embodiments, sub-step 2046 is performed as part of step 2026 with the information stored in memory and then retrieved at sub-step 2046 in the process. In some embodiments sub-step 2046 includes one or more sub-steps 2048 and 2050. In sub-step 2048, the wireless base station determines a second group or set of wireless devices, e.g., mobile terminals, which do fully utilize the uplink data transmission resources granted to the wireless devices. In sub-step 2050, the wireless base station determines which uplink data transmission resource grants have been granted to the second group or set of wireless devices for use during the first period of time. The determined uplink data transmission resource grants for the second group or set of wireless devices being a second set of data transmission resource grants. Operation proceeds from step 2038 via connection node B 2052 to step 2054 shown on FIG. 2C.

In step 2054, the wireless base station updates the uplink data transmission resource grants for the wireless devices connected and/or attached to the wireless base station so that at least one uplink data transmission resource grant which was not fully utilized during the first period of time is assigned to two wireless devices becoming a shared uplink data transmission resource grant. For example, the shared resource grant is granted to both the original wireless device to which the uplink data transmission resource grant was assigned/granted during the first period of time and a wireless device which fully utilized its uplink data transmission resource grants during the first period of time. In some embodiments step 2054 includes one or more sub-steps 2056, 2058, and 2060.

In sub-step 2056, the wireless base station assigns and/or grants the first set of wireless devices the first set of uplink data transmission resource grants.

In sub-step 2058, the wireless base station assigns and/or grants the second set of wireless devices the first set of uplink data transmission resource grants. The first set of uplink data transmission resource grants being shared by the first and second group or set of wireless devices. In some such embodiments, each uplink data transmission resource grant is only shared by two wireless devices, one wireless device from the first group or set of wireless devices and one wireless device from the second group or set of wireless devices. The second set of uplink data transmission resource grants are exclusively used by the second set of wireless devices. In some embodiments, each resource grant of the second set of uplink data transmission resource grants is assigned/granted to a single wireless device of the second group or set of wireless devices.

In sub-step 2054, the wireless base station assigns one or more of the uplink data transmission resource grants assigned to one or more of the wireless devices of the first group or set of wireless devices to one or more wireless devices of the second group or set of wireless devices while also maintaining its previously granted uplink data transmission resource grants.

Operation proceeds from step 2054 to step 2062. In step 2062, the wireless base station communicates to the wireless devices connected and/or attached to the wireless base station the updated data transmission resource grants for the wireless devices connected and/or attached to the wireless base station. Operation proceeds from step 2062 to step 2064.

In step 2064, the wireless devices connected to the wireless base station after receiving the updated data transmission resource grants utilize the communicated uplink data transmission resource grants for transmitting uplink data to the wireless base station. That is each wireless device uses the updated grants assigned to the wireless device for transmitting uplink data to wireless base station. In some embodiments step 2064 includes one or more sub-steps 2066 and 2068.

In sub-step 2066, the first group or set of wireless devices transmit uplink data to the wireless base station using the first set of uplink data transmission resource grants.

In sub-step 2068, the second group or set of wireless devices transmit uplink data to the wireless base station using the first set of uplink data transmission grants in addition to the second set of uplink data transmission resource grants. The wireless base station receives the uplink data transmission from the wireless devices. When the wireless base station receives an uplink data transmission on an uplink data resource which is shared by two wireless devices it determines the sending wireless device by determining which wireless device has signed the uplink data transmission.

Operation proceeds from step 2064 to step 2068. In step 2068, the second group or set of wireless devices will continue to transmit uplink data to the wireless base station using the first set of uplink data transmission resource grants as long as the wireless device does not receive a plurality of NACKs from the wireless base station. During the transmission of uplink data by a wireless device, the wireless device determines and/or measures RSRP and determine/calculate average RSRP and standard deviation of RSRP for each PRB. The wireless device also determines and/or measures RSSI and determines and/or calculates average RSSI for each PRB. Repeated or successive NACKs from the wireless base station can and will occur when two or more wireless devices attempt to utilize the same uplink data transmission resource grants by transmitting uplink data using the same resource blocks at the same time. In such cases, when the wireless device in the second group of wireless devices detects a threshold number of NACKs on a granted uplink data transmission resource, operation will proceed from step 2068 via connection node C 2070 to step 2072 shown on FIG. 2D.

In step 2072, each wireless device of the second group or set of wireless devices will use the measured and/or determined RSRP for each PRB during uplink transmissions for which NACKs are received and will compare/check the RSRP values to previously generated RSRP statistics to determine if received NACKs are Radio Frequency (RF) related, e.g., NACKS being caused by poor channel conditions as opposed to collisions in usage. Each wireless device may, and in some embodiments does, also measure the RSSI for each PRB and determines the average RSSI for each PRB and compares/checks the determined and/or measured RSSI values for PRBs for which NACKs are received as part of determining whether a NACK is the result of channel conditions or a collision with another wireless device trying to utilize the same PRBs or uplink data transmission resource grant at the same time. Operation proceeds from step 2072 to step 2074.

In step 2074, if and/or when a wireless device of the second group or set of wireless devices determines received NACKs are RF related, e.g., related to uplink channel conditions, the wireless device will continue to use the uplink resource grants for which NACKs were received. Operation proceeds from step 2074 to step 2076.

In step 2076, if and/or when a wireless device of the second group or set of wireless devices determines received NACKs are not RF related (e.g., not related to uplink channel conditions) e.g., determines the NACKs are related to or caused by collisions of two or more devices transmitting data using the same uplink data transmission resource grant at the same time, the wireless device will cease to use the grant for which NACKs have been received and/or will adjust its use of the grant for which NACKs have been received, e.g., the wireless device will wait a random or predetermined amount of time before attempting to send uplink data using the uplink data transmission resource grant for which the NACKs were received. In some embodiments, the wireless device stops or decreases the number of attempts to use that granted uplink data transmission resource for which NACKs were received and for which it determined the NACKs were not the result of uplink channel conditions.

Operation proceeds from step 2076 to step 2078.

In step 2078, operation returns to step 2014 and the process is repeated for another or additional period of time.

In some embodiments, the wireless base station in which the wireless base station provides services to both mobile and stationary terminals, the wireless base station implements the steps of method 2000 for the mobile terminals but not for the stationary terminals, e.g., CPE devices. The wireless base station may, and in some embodiments, does determine whether the connected and/or attached device is a mobile terminal or stationary terminal based on a device identification information received from the wireless device during the connection or attachment process.

Figure 11:
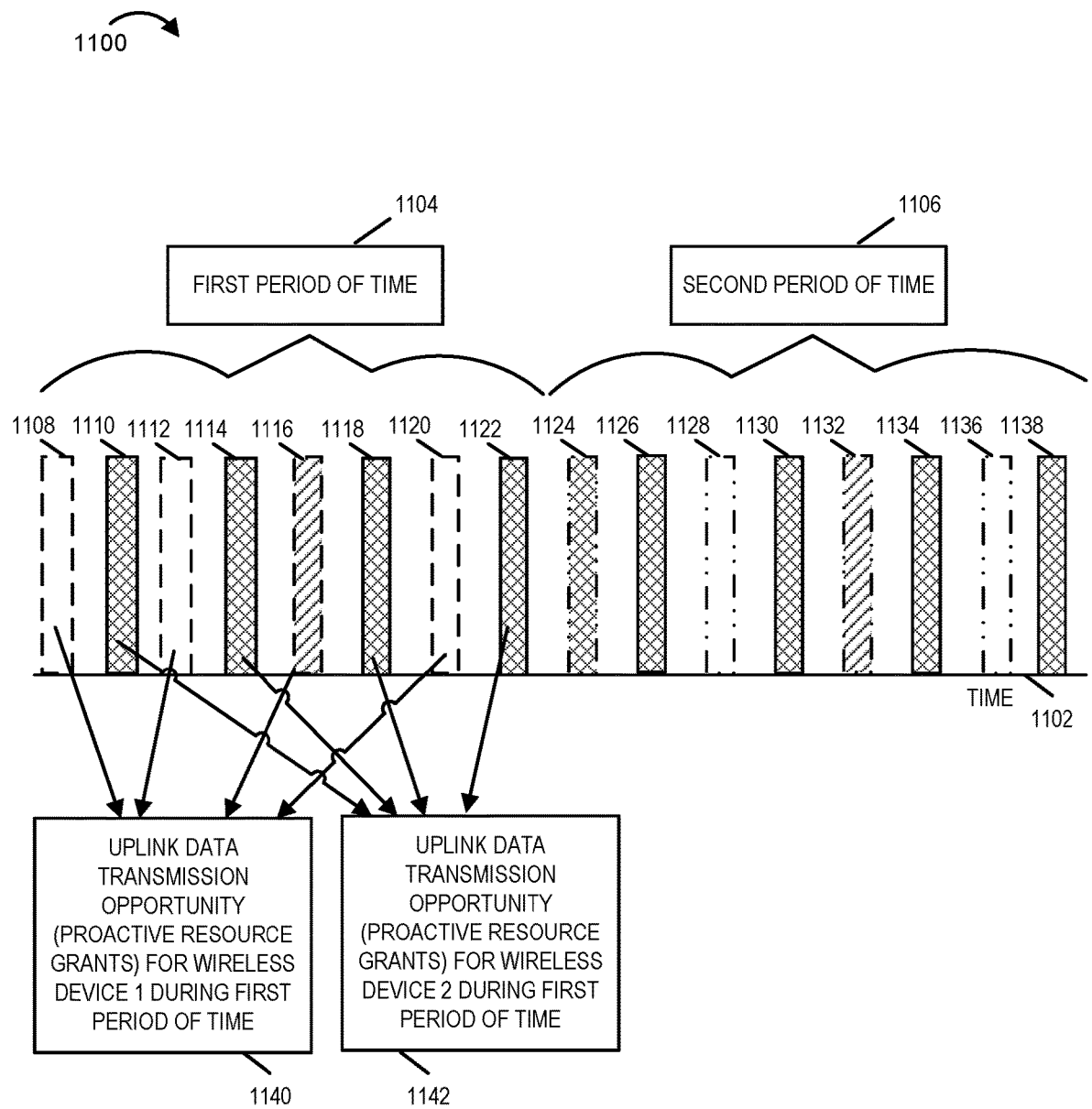
FIG. 11 illustrates the assignment and usage of uplink data transmission resource grants by wireless devices, e.g., mobile terminals, for a first and second period of time.

An example of the method 2000 simplified to using two mobile terminals, MT 1 104 and MT 2 106, for explanatory purposes will now be discussed. Diagram 1100 of FIG. 11 illustrates the granting and usage of uplink data transmission resources to MT 1 and MT 2 as will be explained in greater detail below. Diagram 1100 shows a time line 1102 which increases in time from left to right. The MT 1 and MT 2 which may be, and in some embodiments are mobile terminals, e.g., sensors on a vehicle, smartphone, or a media player, connect to the same wireless base station, e.g., wireless base station 102 (e.g., CBSD). The wireless base station having registered with a resource allocation system, e.g., a Spectrum Access System 116, and having been granted resources, e.g., spectrum, to use for communications with wireless devices within its coverage area. The wireless base station determines uplink data transmission resource grants for MT 1 104 and MT 2 106. The uplink data transmission resource grants include a first resource grant and a second resource grant. The first resource grant giving MT 1 104 the right to use a first set of resource blocks, e.g., physical resource blocks (PRBs), on a recurring basis to transmit uplink data to the wireless base station. The second resource grant giving the MT 2 106 the right to use a second set of resource blocks on a recurring basis to transmit uplink data to the wireless base station. The first and second resource grants in some embodiments, are proactive resource grants, i.e., the grants are semi-persistent in that once a wireless device, e.g., mobile terminal, receives the resource grant the wireless device continues to use the resource grant(s) until it receives a new resource grant schedule. Once the wireless base station has determined the uplink data transmission resource grants for MT 1 104 and MT 2 106, the wireless base station communicates the determined uplink data transmission resource grants to MT 1 104 and MT 2 106 in the downlink control information (DCI) transmitted to the MT 1 104 and MT 2 106 over the Physical Shared Downlink Control Channel (PSDCH). The MT 1 104 receives the downlink control information sent to MT 1 104 from the wireless base station 102 which includes information from which the uplink data transmission resource grants can be derived or generated. MT 2 106 receives the downlink control information from the wireless base station 102 which includes information from which the uplink data transmission resource grants can be derived or generated. MT 1 104 uses the downlink control information to derive or generate the uplink data transmission grant schedule for MT 1 104, i.e., the first set of resource blocks, e.g., physical or virtual resource blocks and the recurring basis, schedule or time interval on which the set of resource blocks recur. MT 2 106 uses the downlink control information to derive or generate the uplink data transmission grant schedule for MT 2 106, i.e., the second set of resource blocks, e.g., physical or virtual resource blocks and the recurring basis, schedule or time interval on which the set of resource blocks recur. The uplink data transmission resource grant in this example being a set of recurring resource blocks in the physical uplink shared channel (PUSCH).

Diagram 1100 of FIG. 11 illustrates the uplink data transmission resource grant and usages for wireless device 1 (MT 1 104) and wireless device 2 (MT 2 106) during a first period of time 1104 and a second period of time 1106.

Diagram 1100 of FIG. 11, illustrates the uplink data transmission resource grant determined for MT 1 1104 for the first period of time 1104 as including a first set of resource blocks represented as 1108. The first set of resource blocks recur as shown on the time line 1102 as resource blocks 1112, 1116, and 1120 during the first time period 1104. Each of the recurring first set of resource blocks 1108, 1112, 1116, and 1120 provide an opportunity for the MT 1 1104 to transmit uplink data from the MT 1 1104 to the wireless base station 1102. Each recurrence of the first set of resource blocks (1108, 1112, 1116, and 1120) are referred to as an uplink data transmission opportunity as they are an opportunity to transmit uplink data from the MT 1 104 to the wireless base station 102 over the uplink channel at the time of each recurrence using the resource blocks of the MT 1 104 uplink data transmission resource grant as described in the label box 1140. While only a single rectangle is shown, each rectangle represents a set of one or more resource blocks. Typically, a plurality of resource blocks are included in the set.

Diagram 1100 of FIG. 11, also illustrates the uplink data transmission resource grant determined for wireless device 2 (MT 2 106) for the first period of time 1104 as including a second set of resource blocks represented as 1110. The second set of resource blocks recur as shown on the time line 1102 as resource blocks 1114, 1118, and 1122 during the first time period 1104. Each of the recurring second set of resource blocks 1110, 1114, 1118, and 1122 provide an opportunity for MT 2 106 to transmit uplink data from the MT 2 1106 to the wireless base station 102. Each recurrence of the second set of resource blocks (1110, 1114, 1118, and 1122) are referred to as an uplink data transmission opportunity as they are an opportunity to transmit uplink data from MT 2 106 to the wireless base station 102 over the uplink channel at the time of each recurrence using the resource blocks of the MT 2 106 uplink data transmission resource grant as described in the label box 1142. While only a single rectangle is shown, each rectangle represents a set of one or more resource blocks. Typically, a plurality of resource blocks are included in the set.

The wireless base station 102 having communicated the uplink data transmission resource grants to MT 1 104 and MT 2 106 monitors the use of the resource blocks granted to MT 1 104 and MT 2 106 during the first period of time 1104.

After MT 1 104 and MT 2 106 receive the uplink data transmission resource grants, MT 1 104 and MT 2 106 begin to use their respective uplink data transmission resource grants to transmit data to the wireless base station.

MT 1 104 determines before the first uplink data transmission opportunity for MT 1 104 in the first period of time whether it has uplink data to be transmitted to the wireless base station 102. MT 1 104 in the example shown in diagram 1100 determines that it does not have data to be transmitted during the first uplink data transmission opportunity for MT 1 104 in the first period of time and as shown in FIG. 11 skips and does not use the first set of resources blocks 1108 to transmit uplink data to the wireless base station 102. MT 1 104 determines before the second uplink data transmission opportunity for MT 1 104 in the first period of time whether it has uplink data to be transmitted to the wireless base station 102. MT 1 104 in the example shown in diagram 1100 determines that it does not have data to be transmitted during the second uplink data transmission opportunity for MT 1 104 in the first period of time and as shown in FIG. 11 skips and does not use the first set of resources blocks 1112 to transmit uplink data to the wireless base station 102. MT 1 104 in the example shown in diagram 1100 determines that it has data to be transmitted during the third uplink data transmission opportunity for MT 1 104 in the first period of time and as shown in FIG. 11 fully utilizes the first set of resources blocks 1116 to transmit uplink data to the wireless base station 102. MT 1 104 in the example shown in diagram 1100 determines that it does not have data to be transmitted during the fourth uplink data transmission opportunity for MT 1 104 in the first period of time and as shown in FIG. 11 skips and does not utilize the first set of resources blocks 1120 to transmit uplink data to the wireless base station 102.

MT 2 106 determines before the first uplink data transmission opportunity for MT 2 106 in the first period of time whether it has uplink data to be transmitted to the wireless base station 102. MT 2 106 in the example shown in diagram 1100 determines that it has data to be transmitted during the first uplink data transmission opportunity for MT 2 106 in the first period of time and as shown in FIG. 11 fully utilizes the second set of resources blocks 1110 to transmit uplink data to the wireless base station 102. MT 2 106 determines before the second uplink data transmission opportunity for MT 2 106 in the first period of time whether it has uplink data to be transmitted to the wireless base station 102. MT 2 106 in the example shown in diagram 1100 determines that it has data to be transmitted during the second uplink data transmission opportunity for MT 2 106 in the first period of time and as shown in FIG. 11 fully utilizes the second set of resources blocks 1114 to transmit uplink data to the wireless base station 102. MT 2 106 in the example shown in diagram 1100 determines that it has data to be transmitted during the third uplink data transmission opportunity for MT 2 106 in the first period of time and as shown in FIG. 11 fully utilizes the second set of resources blocks 1118 to transmit uplink data to the wireless base station 102. MT 2 106 in the example shown in diagram 1100 determines that it has data to be transmitted during the fourth uplink data transmission opportunity for MT 2 106 in the first period of time and as shown in FIG. 11 fully utilizes the second set of resources blocks 1122 to transmit uplink data to the wireless base station 102.

MT 1 determines and/or measures RSRP and generates and/or calculates the average RSRP and standard deviation for each physical resource block. MT 1 also measures and/or determines RSSI and calculates and/or generates the average RSSI for each physical resource block.

MT 2 determines and/or measures RSRP and generates and/or calculates the average RSRP and standard deviation for each physical resource block. MT 2 also measures and/or determines RSSI and calculates and/or generates the average RSSI for each physical resource block.

As previously discussed, the wireless base station monitors the use of resource blocks granted to MT 1 104 and MT 2 106 during the first period of time 1140. This monitoring includes determining and/or counting the number of skipped or unused uplink data transmission opportunities by MT 1 104 and MT 2 106 for the first period of time 1104. As shown in FIG. 11, MT 1 104 skipped three out of four uplink data transmission opportunities and MT 2 106 skipped zero out of four uplink data transmission opportunities and used all resources blocks in each of the four uplink data transmission opportunities. After the first period of time has ended, the wireless base station 102 determines MT 1 104 uplink data transmission resource utilization to be 25%, i.e., 3 out of 4 uplink data transmission opportunities were skipped and 1 uplink data transmission opportunity was used with all resource blocks being entirely filled. That is 75% of the uplink data resources granted to MT 1 104 was wasted and not used and 25% of the uplink data transmission resources were used by MT 1 104 during the first period of time. After the first period of time has ended, the wireless base station 102 determines MT 2 106 uplink data transmission resource utilization to be 100%, i.e., no uplink data transmission opportunities were skipped and all resource blocks in the second set of resources was utilized by the MT 2 106 to transmit uplink data to the wireless base station 102 for each of the four uplink data transmission opportunities during the first period of time.

The wireless base station 102 determines whether the granted uplink data transmission resources have been utilized by the wireless devices, i.e., in this example the mobile terminals 1 and 2, more than a first threshold value for the first period of time. The first threshold value being an uplink data transmission utilization threshold value. In this example, the first threshold value is 75%. MT 1 104 which has an uplink data transmission resource utilization value of 25% for the first period of time is determined by the wireless base station 102 to not have utilized its granted uplink data transmission resources more than the first threshold value for the first period of time which is 75%. MT 2 106 which has an uplink data transmission resource utilization value of 100% for the first period of time is determined by the wireless base station 102 to have utilized its granted uplink data transmission resources more than the first threshold value for the first period of time which is 75%.

The wireless base station 102 determines which wireless devices connected or attached to the wireless base station 102 did not fully utilize the uplink data transmission resources granted to the wireless device and assigns these devices to be included in a first group or set of wireless devices. In some embodiments including in this example, the wireless base station 102 makes the determination based on which wireless devices' uplink data transmission resource utilization is less than or equal to the first threshold value. In this example, wireless base station 102 as previously discussed has determined that MT 1 104 did not utilize the uplink data transmission resources granted to it more than the first threshold uplink data transmission resource utilization value. The wireless base station 102 assigns MT 1 104 to the first set of wireless devices. The wireless base station 102 then determines the uplink data transmission resource grant for each of the wireless devices assigned to the first set or group of wireless devices. In this example, the first set of resource blocks was granted to MT 1 104 and it included resource blocks 1, 3 and 4, e.g., physical or virtual resource blocks 1, 3 and 4. In this example, the resource blocks are physical resource blocks.

In some embodiments, the wireless base station 102 makes the determination of which wireless devices to include in the first set of wireless devices based on which wireless devices' uplink data transmission resource utilization is less than a second threshold value which is typically less than or equal to the first threshold value. For example, if the first threshold value is 75%, the second threshold value may be, and in some embodiments is set to 50%. Such embodiments provide additional flexibility in determining which wireless devices the wireless base station 102 will target for uplink data transmission resource grant sharing. For example, while the decision to implement uplink data transmission resource sharing among wireless devices are set by a first resource utilization threshold, the wireless devices which will be impacted by the uplink data transmission resource sharing will be determined by a second threshold which can be adjusted based on statistical analysis of potential collisions to minimize collisions between competing wireless devices sharing uplink data transmission resources.

The wireless base station 102 having determined that MT 1 104 did not utilize the uplink data transmission resources granted to it more than the first threshold uplink data transmission resource utilization value also determines which wireless devices did fully utilize the uplink data transmission resources granted to the wireless device and assigns these devices to be included in a second group or set of wireless devices. In this example, the wireless base station assigns MT 2 106 to the second set or group of wireless devices as it fully utilized the uplink data transmission resources granted to it during the first period of time. The wireless base station then determines the uplink data transmission resource grant for each of the wireless devices assigned to the second set or group of wireless devices. In this example, the second set of resource blocks was granted to MT 2 106 and it included resource blocks 2, 5 and 6, e.g., physical or virtual resource blocks 2, 5 and 6. In this particular example, the resource blocks are physical resource blocks.

The wireless base station 102 stores wireless device uplink resource utilization information, e.g., for the first period of time, in memory. In this example, the wireless base station 102 stores first uplink resource utilization information about the utilization of the first set of resource blocks by MT 1 104, e.g., for the first period of time, in memory. In some embodiments, the first resource utilization information indicates whether resource blocks granted to MT 1 104 were used during the first period of time. In some embodiments, the first resource utilization information indicates when and/or which resource blocks granted to MT 1 104 were used during the first period of time and/or the portion of the first set of resource blocks that were used during the first period of time. For example, whether the resource blocks granted to MT 1 104 were fully used or only a portion were used to transmit data. This information may be, and in some embodiments is, indicated as a utilization portion or amount with a 1 or 100% indicating full utilization or a fraction or percentage indicating less than full utilization by MT 1 104.

In this example, the wireless base station 102 stores second resource uplink utilization information about the utilization of the second set of resource blocks by MT 2 106, e.g., for the first period of time in memory. In some embodiments, the first resource utilization information indicates whether resource blocks granted to MT 1 104 were used during the first period of time. In some embodiments, the second resource utilization information indicates when and/or which resource blocks granted to MT 2 106 were used during the first period of time and/or the portion of the second set of resource blocks that were used during the first period of time. For example, whether the resource blocks granted to MT 2 106 were fully used or only a portion were used to transmit data. This information may be, and in some embodiments is, indicated as a utilization portion or amount with a 1 or 100% indicating full utilization or a fraction or percentage indicating less than full utilization by MT 2 106.

The wireless base station 102 makes an uplink data transmission resource sharing decision based on the stored resource utilization information (e.g., the first and second resource utilization information. The uplink data transmission resource sharing decision in this example is that the first set of resource blocks are to be shared by MT 1 104 and MT 2 106 in a second period of time. The second period of time coming after the first period of time. The wireless base station 102 generates a third uplink data transmission resource grant for MT 2 106. The third uplink data transmission resource grant grants the MT 2 106 the right to use the first set of resource blocks (RB 1, RB 3, RB 4) on a recurring basis. MT 1 104 and MT 2 106 will share the first set of resource blocks for uplink data transmission. MT 2 106 will also still maintain the right to use the second set of resource blocks for uplink data transmissions on a recurring basis. In some embodiments in which more than the one wireless device is assigned to the first set of wireless devices and/or more than one wireless device is assigned to the second set of wireless devices, the wireless base station 102 will make decisions on which wireless devices in the first set of wireless devices will share their granted resource blocks with one or more wireless devices in the second set of wireless devices. The wireless base station 102 communicates the third uplink data transmission resource grant to MT 2 106. Upon receiving the third uplink data transmission resource grant, MT 2 106 will commence using both the first set of resource blocks and the second set of resource blocks to transmit uplink data to the wireless base station 102. In some embodiments, the wireless base station sends new or updated uplink resource grant schedules to the MT-1 104 and MT-2 106. The new or updated uplink resource grant schedule for MT-1 104 including the right to use the first set of resource blocks for data transmissions. The new or updated uplink resource grant schedule for MT-2 106 including the right to use the first and second set of uplink resource blocks for data transmissions.

MT 2 106 performs statistical measurements to track when transmission on the first set of resource blocks results in receipt of an ACK (HARQ mechanism indicating successful reception of the MT 2 106 data by the wireless base station) and when transmission on the first set of resource blocks results in receipt of an NACK (HARQ mechanism indicating failure of reception of the MT 2 106 data by the wireless base station) to determine which uplink data transmission opportunities to use to transmit data to the wireless base station using the first set of resource blocks.

In some embodiments, when MT 2 106 uses the first set of resource blocks during an uplink data transmission opportunity and receives an ACK from the wireless base station MT 2 106 will increase the number of uplink data transmission opportunities for the first set of resource blocks it will use until it receives a threshold number NACKs from the wireless base station 102. During uplink transmission, the MT 2 106 determines and/or measures RSRP for each resource block which in this example is each physical resource block during uplink transmissions and will compare/check the values to RSRP previously generated RSRP statistics to determine if the received NACKs are the result of channel conditions, e.g., poor RF channel conditions such as due to a change in the location of the mobile device and/or an increase in interference, or the result of data transmission collisions with another device trying to use the same grants (i.e., resource blocks) at the same time. When MT 2 106 determines that the NACKs are the result of uplink channel conditions, e.g., problems with interference or a weak RF connection, the MT 2 106 will continue to use the uplink resource grant and PRBs for which it received the NACKs. However, if MT 2 106 determines that the NACKs are the result of another device also trying to use the same PRBs, it will cease using the uplink resource grant and/or PRBs for which the NACKs were received at least for a period of time and instead chose different resource blocks from the uplink resource grants assigned to it from the wireless base station to transmit its uplink data to the wireless base station to avoid collusions. In some embodiments during uplink transmissions the MT 2 also determines/measures the RSSI for each PRB and compares/checks it against the average RSSI previously calculated when determining whether the NACKs are a result of the channel condition or quality. The MT 2 106 making its decision as to whether the channel conditions is the cause of the NACKs based on the RSSI measurements and RSSI averages previously generated as well as RSRP measurements and the previously generated RSRP averages and RSRP standard deviations. In some embodiments, the decision as to whether the channel conditions is the cause of the NACKs is based solely on the RSSI measurements and RSSI averages previously generated and/or other RSSI statistics generated for PRB for which the NACK was received.

In some embodiments, the wireless base station 102 generates updated uplink data transmission resource grants for the wireless devices connected to the wireless base station, e.g. MT 1 104 and MT 2 106 in this example, so that at least one uplink data transmission resource grant which was not fully utilized during the first period of time is assigned to two wireless devices (e.g., the original wireless device to which it was granted during the first period of time (MT 1) and a wireless device (e.g., MT 2) which fully utilized its uplink data transmission resource grant during the first period of time. In such embodiments, the updated uplink data transmission grants are then communicated to the wireless devices as a new uplink data transmission grant schedule.

In some embodiments, the MT 2 is communicated the uplink data transmission resource grant of MT 1 so that it can attempt to utilize the MT 1 uplink resource grants which were not previously utilized.

Figure 12:
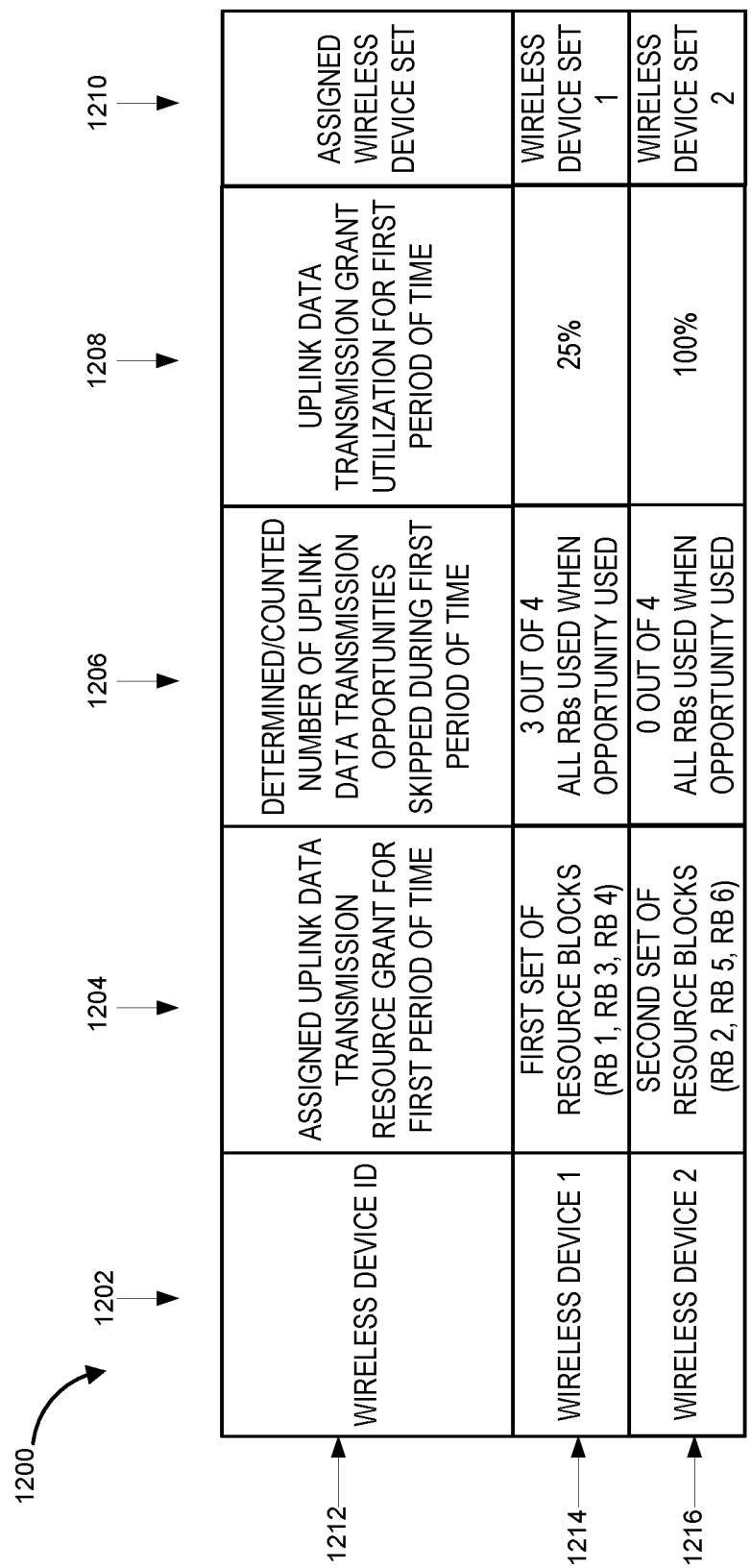
FIG. 12 illustrates an exemplary table including mobile terminal information, uplink data transmission resource grant information, and uplink data transmission grant resource utilization.

FIG. 12 illustrates an exemplary table 1200 which may be, and in some embodiments is, stored in memory or a storage device by the wireless base station 102. The table 1200 includes information about the wireless devices connected to the wireless base station during the first period of time including wireless device uplink resource utilization information. In this example, two wireless devices, a first wireless device MT 1 104 and a second wireless device MT 2 106, are connected to the wireless base station 102.

Table 1200 includes columns 1202, 1204, 1206, 1208, 1210 and rows 1212, 1214, and 1216. The first row 1212 includes labels identifying the information contained in the each of the columns. The entry (column 1202, row 1212) indicates that the entries in column 1202 includes wireless device IDs for wireless devices connected to the wireless base station. The entries in column 1204 identify the assigned uplink data transmission resource grant for the first time period (col. 1204, row 1212 entry) for the wireless device identified in the same row. The entries in column 1206 are the determined/counted number of uplink data transmission opportunities skipped during the first period of time (col. 1206, row 1212 entry) for the wireless device identified in the same row. The entries in column 1208 are the uplink data transmission grant utilization for the first period of time (col. 1208, row 1212 entry) for the wireless device identified in the same row. The entries in column 1210 are the assigned wireless device set (col. 1210, row 1212 entry) for the wireless device identified in the same row.

Row 1214 includes information for the wireless device 1, i.e., MT 1 104, (col. 1202, row 1214 entry) that indicates: (i) the wireless device 1 was assigned the first set of resource blocks which included resource block (RB) 1, RB 3 and RB4 for its uplink data transmission resource grant for the first period of time (col. 1204, row 1214 entry), (ii) wireless device 1 skipped 3 out of 4 uplink data transmission opportunities during the first period of time and that all resource blocks where used during the non-skipped transmission opportunity (col. 1206, row 1214 entry), (iii) wireless device 1 uplink data transmission grant utilization for the first period of time was 25% (col. 1208, row 1214 entry); and (iv) wireless device 1 was assigned by the wireless base station to wireless device set 1 based on its uplink data transmission rate for the first period of time (col. 1210, row 1214 entry).

Row 1216 includes information for the wireless device 2, i.e., MT 2 106 in this example, (col. 1202, row 1216 entry) that indicates: (i) the wireless device 2 was assigned the second set of resource blocks which included resource block (RB) 2, RB 5 and RB6 for its uplink data transmission resource grant for the first period of time (col. 1204, row 1216 entry), (ii) wireless device 2 skipped 0 out of 4 uplink data transmission opportunities during the first period of time and that all resource blocks were used during each uplink data transmission (col. 1206, row 1216 entry), (iii) wireless device 2 uplink data transmission grant utilization for the first period of time was 100% (col. 1208, row 1216 entry); and (iv) wireless device 2 was assigned by the wireless base station to wireless device set 2 based on its uplink data transmission rate for the first period of time (col. 1210, row 1216 entry).

Figure 13:
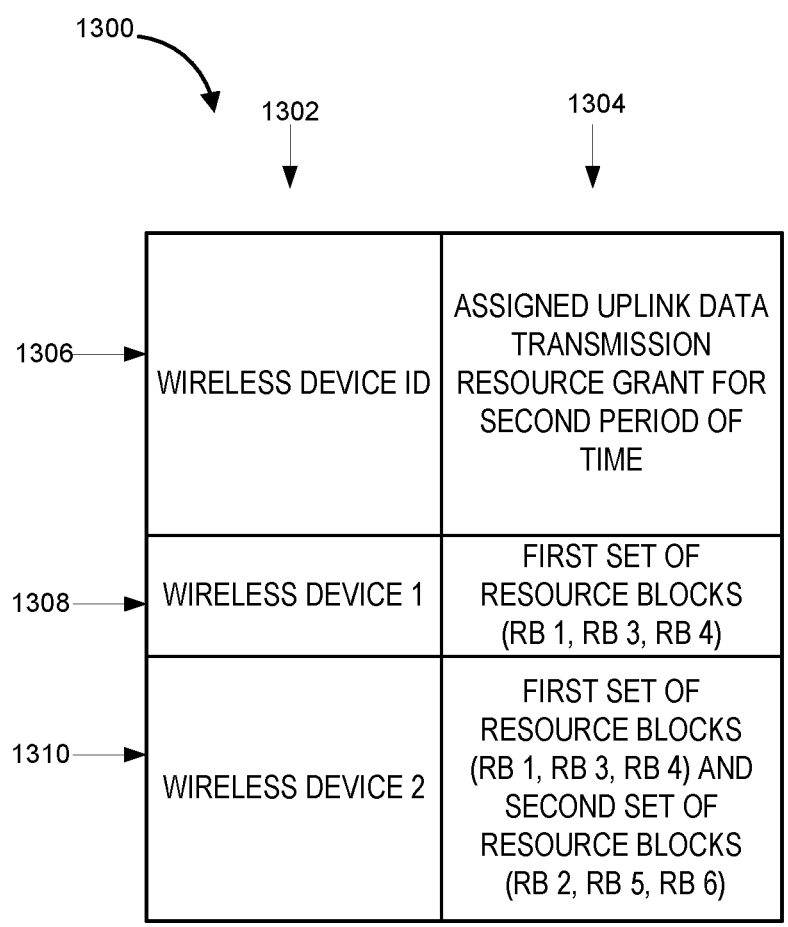
FIG. 13 illustrates an exemplary table of assignments of uplink data transmission resource grants per wireless device, e.g., mobile terminal.

FIG. 13 illustrates an exemplary table 1300 which may be, and in some embodiments is, stored in memory or a storage device by the wireless base station. The table 1300 includes information about the wireless devices connected and/or attached to the wireless base station during the second period of time including the assigned uplink data transmission resource grants for the second period of time. In this example, two wireless devices, wireless device 1, i.e., MT 1 104, and wireless device 2, i.e., MT 2 106, are connected to the wireless base station 102.

Table 1300 includes columns 1302 and 1304. The first row 1306 includes labels identifying the information contained in the each of the columns. The entry (column 1302, row 1306) indicates that the entries in column 1302 includes wireless device IDs for wireless devices connected and/or attached to the wireless base station. The entries in column 1304 identify the assigned uplink data transmission resource grant for the second period of time (col. 1304, row 1306 entry) for the wireless device identified in the same row.

Row 1308 includes information for the wireless device 1 (col. 1302, row 1308 entry) that indicates the wireless device 1 was assigned the first set of resource blocks which included resource block (RB) 1, RB 3 and RB4 for its uplink data transmission resource grant for the second period of time (col. 1304, row 1308 entry). This information is communicated from the wireless base station to the wireless device 1 in downlink control information sent to the wireless device 1, i.e., MT 1 104. The uplink data transmission grant schedule is derived and/or generated from the information contained in the downlink control information which is provided to the wireless device 1 prior to the start of the second period of time.

Row 1310 includes information for the wireless device 2, i.e., MT 2 106, (col. 1302, row 1310 entry) that indicates the wireless device 2 was assigned the first set of resource blocks (RB 1, RB 3, RB4) and the second set of resource block RB 2, RB 5 and RB6 for its uplink data transmission resource grant for the second period of time (col. 1304, row 1310 entry). This information is communicated from the wireless base station to the wireless device 2 in downlink control information sent to the wireless device 2, i.e., MT 2 104. The uplink data transmission grant schedule is derived and/or generated from the information contained in the downlink control information which is provided to the wireless device 2 prior to the start of the second period of time.

Diagram 1100 of FIG. 11, illustrates the uplink data transmission resource grant determined for wireless device 2, i.e., MT 2 106, for the second period of time as including the first set of resource blocks represented as 1124 which is shared with the wireless device 1, i.e., MT 1 104, and second set of resource blocks represented as 1126 which is not shared with wireless device 1, i.e., MT 1 104. The first set of resource blocks which is the shared set of resource blocks recur as shown on the time line 1102 as resource blocks 1124, 1128, 1132, and 1136 during the second period of time 1106. The second set of resource blocks 1126 recur as shown on the time line 1102 as resource blocks 1126, 1130, 1134, and 1138. Each of the recurring second set of resource blocks 1126, 1130, 1134, and 1138 provide an opportunity for MT 2 106 to transmit uplink data from MT 2 106 to the wireless base station 102. Each recurrence of the second set of resource blocks (1126, 1130, 1134, and 1138) are referred to as an uplink data transmission opportunity.

FIG. 11 also illustrates the usage of the resource blocks 1124, 1126, 1128, 1130, 1132, 1134, 1136, and 1138 during the second period of time. MT 2 106 uses the first set of resource blocks 1124 to transmit uplink data to the wireless base station 102. MT 2 106 uses the second set of resource blocks 1126 to transmit uplink data to the wireless base station 102. The first set of resource blocks 1128 which is a shared set of resource blocks is skipped or left empty as neither the MT 1 104 or MT 2 106 use this uplink data transmission opportunity to transmit uplink data to the wireless base station. The second set of resource blocks 1130 are used by MT 2 106 to transmit uplink data to the wireless base station 102. MT 1 104 uses the first set of resource blocks 1132 to transmit uplink data to the wireless base station 102. MT 2 106 uses the second set of resource blocks 1134 to transmit uplink data to the wireless base station 102. The first set of resource blocks 1136 which is a shared set of resource blocks is skipped or left empty as neither the MT 1 104 or MT 2 106 use this uplink data transmission opportunity to transmit uplink data to the wireless base station 102. MT 2 1106 uses the second set of resource blocks 1138 to transmit uplink data to the wireless base station 102. As can be seen from diagram 1100, the use of shared resource grants has increased the efficiency and utilization of the uplink data transmission resources. MT 2 106 in the example did not attempt to utilize all of the uplink data transmission opportunities corresponding to the recurrence of the first set of resource blocks as this would have resulted in collisions with MT 1 104 during the MT 1 104 device transmission corresponding to the 1132 first set of resource blocks. Instead the MT 2 1106 in this example randomly choose one recurrence of the first set of resource blocks to use. The wireless device, e.g., MT 2 may, and in some embodiments does, generate and use statistics based on monitoring of ACKs and NACKs in response to data transmission to increase or decrease it use of the first set of resource blocks and/or which recurring data transmission opportunities to utilize. Legend 1144 provides information for understanding the usage of the resource blocks and which of the wireless devices the set of resource blocks have been granted. Shape 1146 illustrates the shape representing a set of resource blocks granted to MT 1 104 and which has been skipped or left unused. Shape 1148 illustrates the shape representing a set of resource blocks granted to MT 1 104 and which has been fully filled with uplink data transmitted to the wireless base station from MT 1 104. Shape 1150 illustrates the shape representing a set of resource blocks granted to MT 2 1106 and which has been skipped or left unused. Shape 1152 illustrates the shape representing a set of resource blocks granted to MT 2 1106 and which has been fully filled with uplink data transmitted to the wireless base station from MT 2 1106. Shape 1154 illustrates the shape representing a shared set of resource blocks granted to both the MT 1 104 and MT 2 106 which has been skipped or left unused by both MT 1 104 and MT 2 106. Shape 1156 illustrates the shape representing a shared set of resource blocks granted to both MT 1 104 and MT 2 106 and which has been fully filled with uplink data transmitted to the wireless base station from MT 1 104. Shape 1158 illustrates the shape representing a shared set of resource blocks granted to both MT 1 104 and MT 2 106 and which has been fully filled with uplink data transmitted to the wireless base station from MT 2 106.

While only a single set of resource blocks have been illustrated as being included in an uplink data transmission resource grant, in some embodiments a plurality of different sets of resource blocks are included in an uplink data transmission resource grant. In such embodiments, the wireless base station may, and in some embodiments, does determine separately for each of the plurality of sets of resource blocks the wireless device's utilization of the set of resource blocks. Furthermore, the wireless base station may then use this resource utilization information to determine whether one or more of the plurality of sets of resource blocks are to be used as a shared set of resource blocks by more than one wireless device.

In some embodiments, the wireless base station makes one or more uplink data transmission grants to each of the wireless devices connected to the wireless base station for use during a time period, e.g., a first or second time period. In at least some of such embodiments, the wireless base station monitors the utilization of each uplink data transmission grant for a period of time and stores the resource utilization information in memory. This resource utilization information can then be used to make a resource sharing decision, e.g., to determine whether one or more of the uplink data transmission resource grants assigned to a wireless device, e.g., a mobile terminal, should be a shared resource grant assigned to multiple wireless devices, e.g., multiple wireless terminals.

Figure 3A:
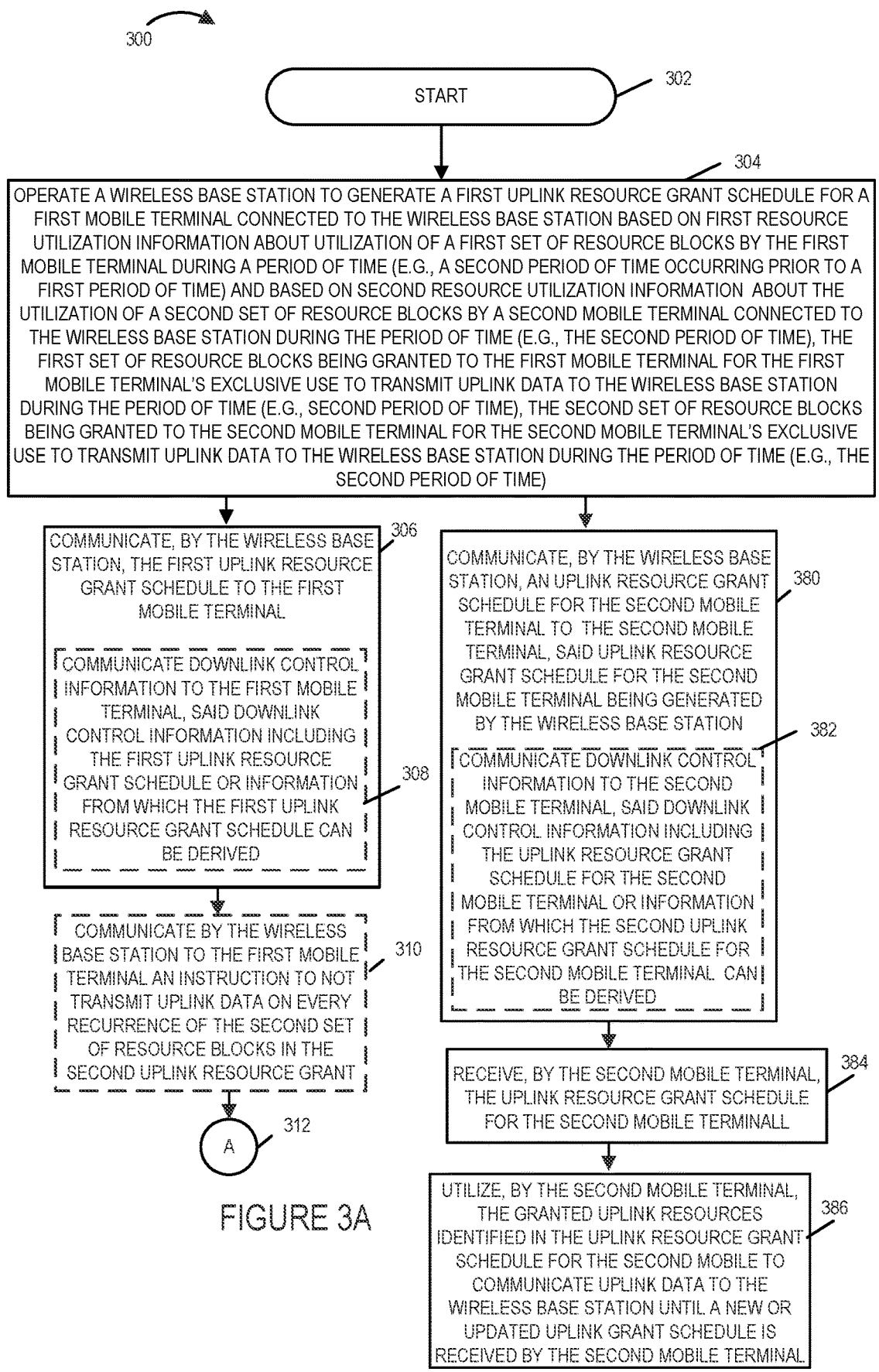
FIG. 3A illustrates the steps of the first part of another exemplary method in accordance with an embodiment of the present invention.
Figure 3B:
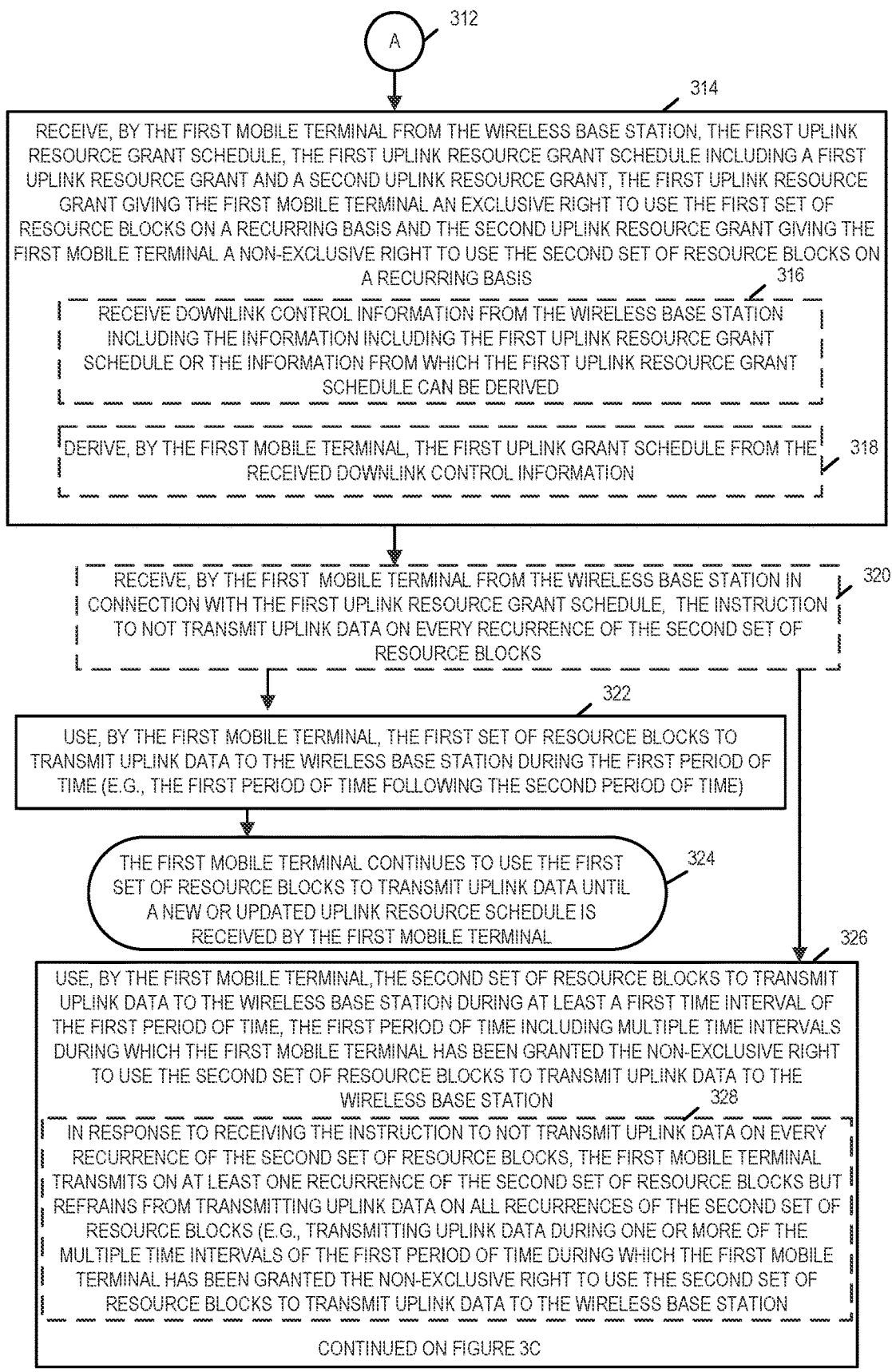
FIG. 3B illustrates the steps of the second part of another exemplary method in accordance with an embodiment of the present invention.
Figure 3C:
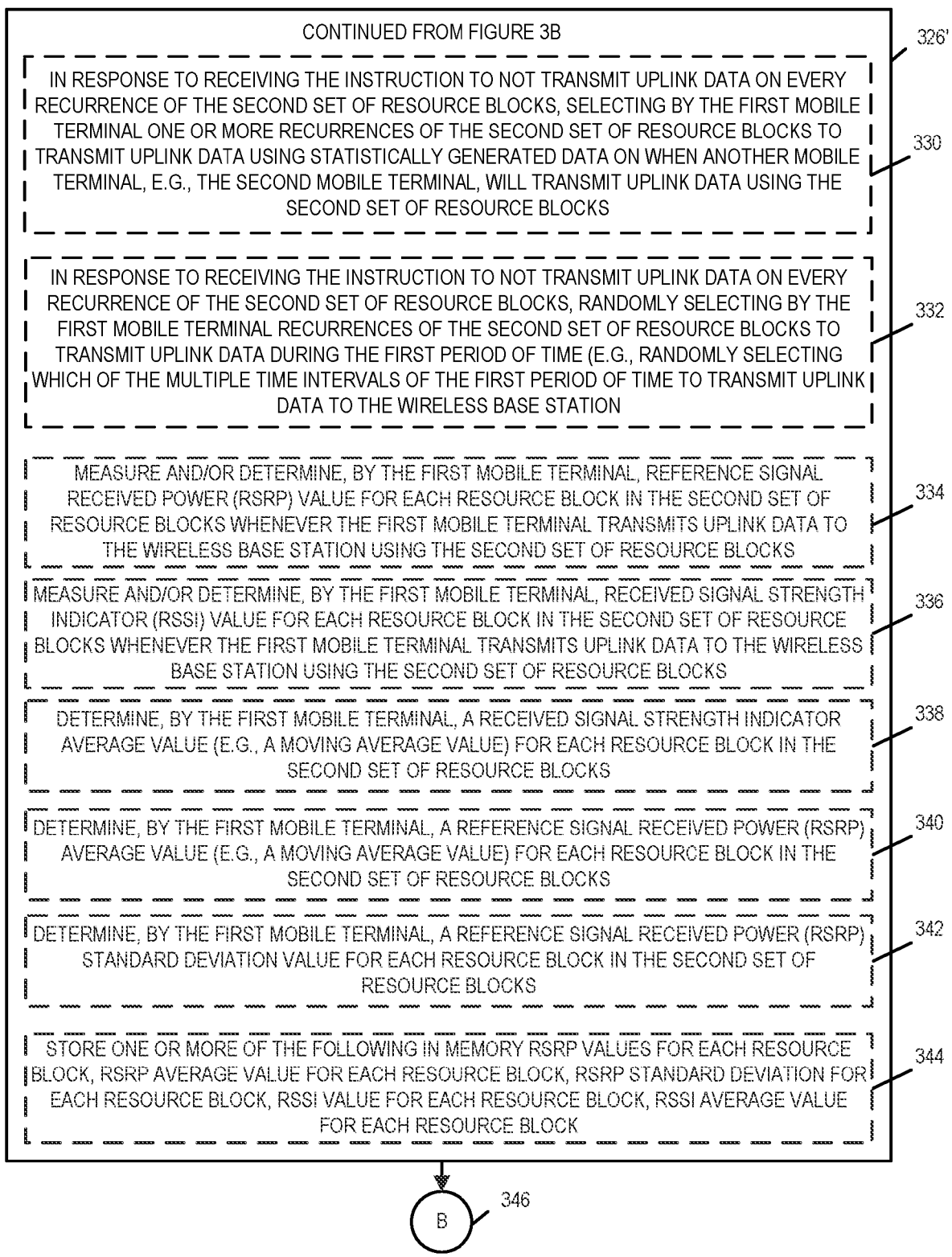
FIG. 3C illustrates the steps of the third part of another exemplary method in accordance with an embodiment of the present invention.
Figure 3D:
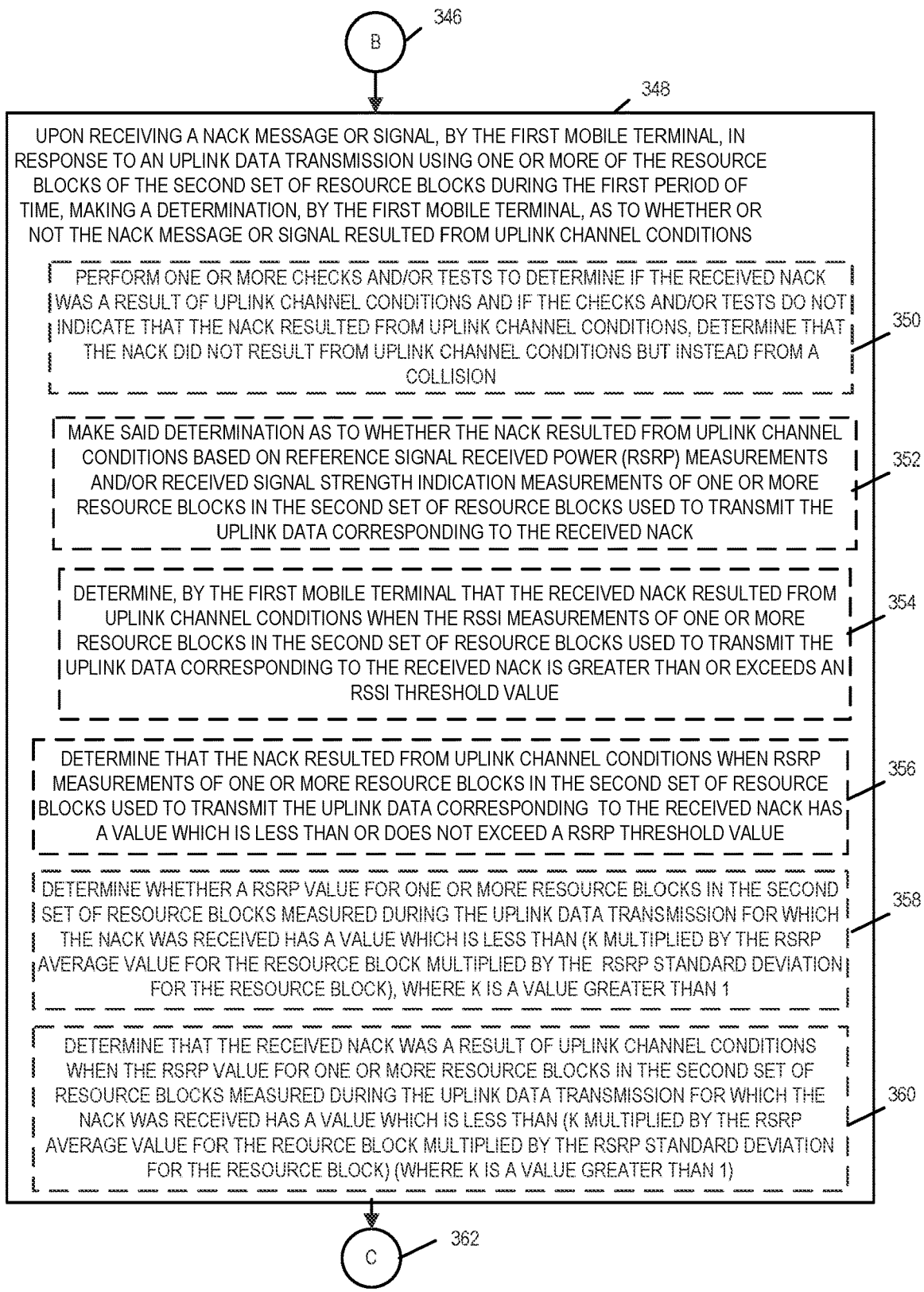
FIG. 3D illustrates the steps of the fourth part of another exemplary method in accordance with an embodiment of the present invention.
Figures 3, 3E:
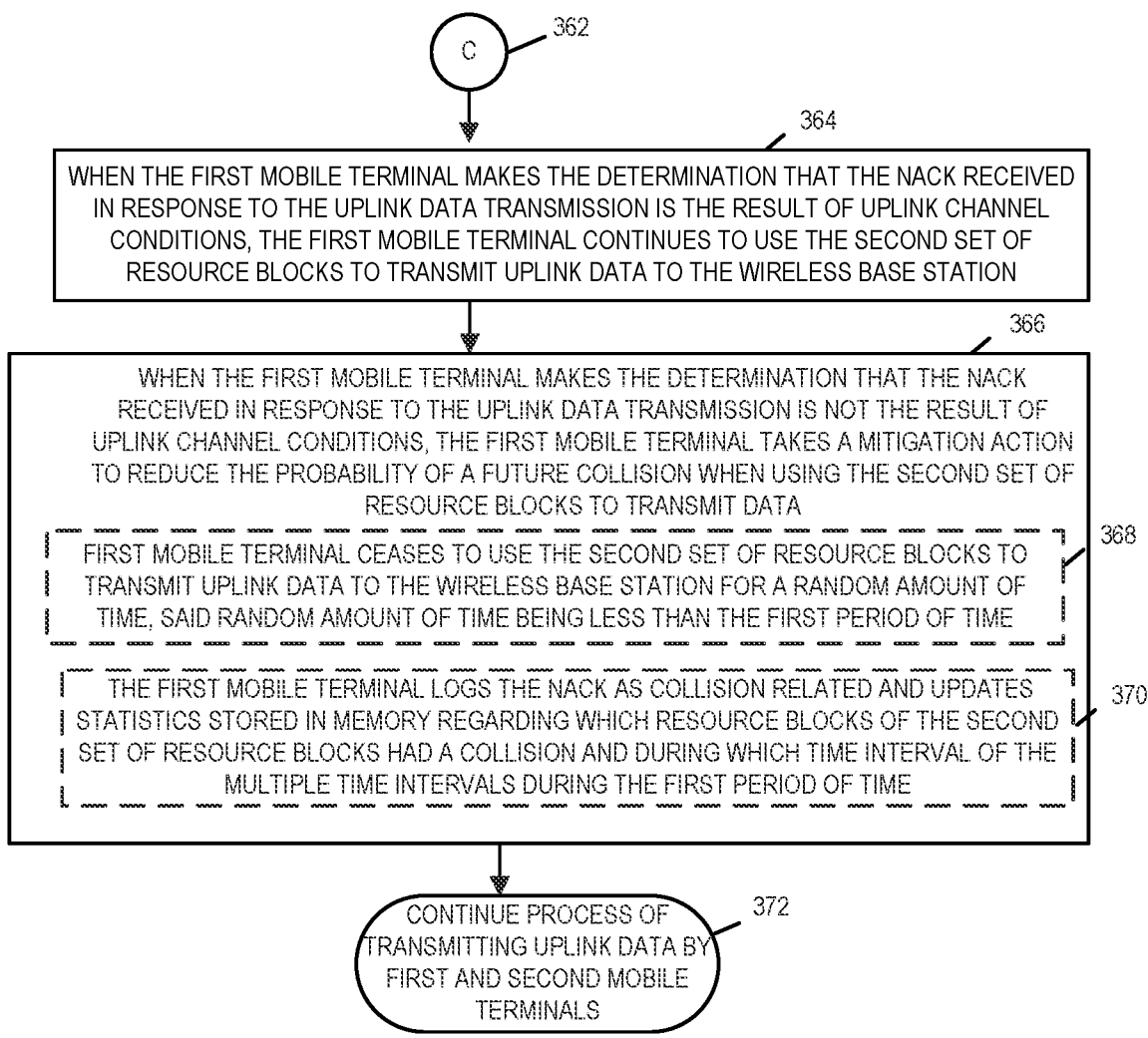
FIG. 3 illustrates the combination of FIGS. 3A, 3B, 3C, 3D and 3E.
FIG. 3E illustrates the steps of the fifth part of another exemplary method in accordance with an embodiment of the present invention.

FIG. 3 illustrates the combination of FIGS. 3A, 3B, 3C, 3D and 3E. FIG. 3A illustrates the steps of the first part of an exemplary method in accordance with an embodiment of the present invention. FIG. 3B illustrates the steps of the second part of an exemplary method in accordance with an embodiment of the present invention. FIG. 3C illustrates the steps of the third part of an exemplary method in accordance with an embodiment of the present invention. FIG. 3D illustrates the steps of the fourth part of an exemplary method in accordance with an embodiment of the present invention. FIG. 3E illustrates the steps of the fifth part of an exemplary method in accordance with an embodiment of the present invention. The exemplary method illustrated in FIG. 3 may be, and in some embodiments is, implemented using the exemplary system 100 illustrated in FIG. 1.

FIG. 3 is a flowchart 300 of an exemplary communications method in accordance with an exemplary embodiment.

Operation starts in step 302 shown on FIG. 3A. In step 302, the wireless system is initialized. Operation proceeds from start step 302 to step 304.

In step 304, the wireless base station (e.g., wireless base station 102 of FIG. 1) is operated to generate a first uplink resource grant schedule for a first mobile terminal connected to the wireless base station based on first resource utilization information about utilization of a first set of resource blocks by the first mobile terminal during a period of time (e.g., a second period of time occurring prior to a first period of time) and based on second resource utilization information about the utilization of a second set of resource blocks during the period of time (e.g., the second period of time occurring prior to a first period of time). The first set of resource blocks having been granted to the first mobile terminal (e.g., mobile terminal 104) connected to the wireless base station during the period of time (e.g., the second period of time). The first set of resource blocks having been granted to the first mobile terminal for the first mobile terminal's exclusive use to transmit uplink data to the wireless base station during the period of time (e.g., the second period of time). The second set of resource blocks having been granted to the second mobile terminal (e.g., mobile terminal 106) for the second mobile terminal's exclusive use to transmit uplink data to the wireless base station during the period of time (e.g., the second period of time). The wireless base station having determined and/or generated the first resource utilization information by monitoring the first mobile terminal's uplink data transmission during the period of time (e.g., the second period of time). The wireless base station having determined and/or generated the second resource utilization information by monitoring the uplink data transmission of the second mobile terminal during the period of time (e.g., the second period of time). The first resource utilization information in some embodiments indicates when the resource blocks granted to the first mobile terminal were used during the period of time (e.g., the second period of time), a portion or amount of the first set of resource blocks that were used during the period of time (e.g., the second period of time) (e.g., whether they were fully used or only a portion was used to transmit data—this information can be indicated as a utilization portion with a 1 indicating full utilization or a fraction indicating less than full utilization). In some embodiments, the second resource utilization information indicates when the resource blocks granted to the second mobile terminal were used during the period of time (e.g., the second period of time), a portion or an amount of the second set of resource blocks that were used during the period of time (e.g., the second period of time) (e.g., whether they were fully used or only a portion was used to transmit data—this information can be indicated as a utilization portion with a 1 indicating full utilization or a fraction indicating less than full utilization). The first resource utilization information and second resource utilization information will provide the wireless base station information from which the wireless base station can determine how to more effectively assign uplink resources to eliminate and/or reduce waste. The wireless base station will make an uplink resource grant sharing decision based on the first resource utilization information and the second resource utilization information. For example, when the first resource utilization information indicates that all resource blocks granted to the first mobile terminal during the period of time (e.g., the second time period) were used for transmitting uplink data from the first mobile terminal to the wireless base station and that the second resource utilization information indicates that no or low utilization of the resource blocks granted to the second mobile terminal to transmit uplink data from the second mobile terminal to the wireless base station during the period of time (e.g., the second time period), the wireless base station will make the uplink resource grant sharing determination that the second set of resource blocks granted to the second mobile terminal may be shared with the first mobile terminal as the second resource utilization information indicates that the second set of resource blocks have low or no uplink utilization by the second mobile terminal. Operation proceeds from step 304 to steps 306 and 380.

In step 380, the wireless base station communicates an uplink resource grant schedule for the second mobile terminal to the second mobile. The uplink resource grant schedule for the second mobile terminal being generated by the wireless base station. In some embodiments step 380 includes sub-step 382. In sub-step 382, the wireless base station communicates downlink control information to the second mobile terminal. The downlink control information including the uplink resource grant schedule for second mobile terminal or information from which the uplink resource grant schedule for the second mobile terminal can be derived. Operation proceeds from step 380 to step 384.

In step 384, the second mobile terminal receives the uplink resource grant schedule from the wireless base station. In some embodiments, the second mobile terminal receives information from which the uplink resource grant schedule for the second mobile terminal can be derived from the wireless base station and derives the uplink grant schedule for the second mobile terminal from the received information. Operation proceeds from step 384 to step 386.

In step 386, the second mobile terminal utilizes the granted uplink resources identified in the uplink grant schedule for the second mobile terminal to transmit data to the wireless base station until a new or updated grant schedule for the second mobile terminal is received by the second mobile terminal. The second mobile terminal utilizes the granted uplink resources identified in the uplink grant schedule for the second mobile terminal during the first period of time.

In step 306, the wireless base station communicates the generated first uplink resource grant schedule to the first mobile terminal. In some embodiments step 306 includes sub-step 308. In sub-step 208, the wireless base station communicates downlink control information to the first mobile terminal. The downlink control information includes the first uplink resource grant schedule or information from which the first mobile terminal can derive the first uplink resource grant schedule. In some embodiments, the downlink control information is communicated to the first mobile terminal via a Physical Downlink Shared Control Channel (PDSCH). Operation proceeds from step 306 to optional step 310.

In optional step 310, the wireless base station communicates to the first mobile terminal an instruction to not transmit uplink data on every recurrence of the second set of resource blocks in the second uplink resource grant. Operation proceeds from step 308 via connection node A 312 to step 314. When optional step 310 is not implemented operation proceeds from step 310 via connection node A 312 to step 314 shown on FIG. 3B.

In step 314, the first mobile terminal receives from the wireless base station the first uplink resource grant schedule. The first uplink resource grant schedule includes a first uplink resource grant and a second uplink resource grant. The first uplink resource grant giving or granting the first mobile terminal an exclusive right to use the first set of resource blocks on a recurring basis. The second uplink resource grant giving the first mobile terminal a non-exclusive right to use the second set of resource blocks on a recurring basis. In some embodiments, the step 314 includes one or more sub-steps 316 and 318. In sub-step 316, the first mobile terminal receives the downlink control information from the wireless base station including the information including the first uplink resource grant schedule or the information form which the first uplink resource grant schedule can be derived. In sub-step 318, the first mobile terminal derives the first uplink grant schedule from the received downlink control information. Operation proceeds from step 314 to step 320.

Step 320 is optional. In step 320, the first mobile terminal receives from the wireless base station in connection with he first uplink resource grant schedule, the instruction to not transmit uplink data on every recurrence of the second set of resource blocks. In some embodiments, this instruction is included in the downlink control information. In some embodiments, the second uplink resource grant is designated as or identified as a shared uplink resource and the receiving mobile terminal is programmed or configured to not utilize every recurrence of the resource blocks of a shared uplink resource even when no instruction to that effect is provided. Operation proceeds from step 320 to steps 322 and steps 326. When optional step 320 is not present, operation proceeds from step 314 to steps 322 and 326.

In step 322, the first mobile terminal uses the first set of resource blocks to transmit uplink data to the wireless base station during the first period of time (the first period of time following or coming after the second period of time). Operation proceeds from step 322 to step 324 wherein the first mobile terminal continues to use the first set of resource blocks to communicate or transmit uplink data to the wireless base station until a new or updated uplink resource schedule is communicated to the first mobile terminal by the wireless base station.

In step 326, the first mobile terminal uses the second set of resource blocks to transmit uplink data to the wireless base station during at least a first time interval of the first period of time. The first period of time including multiple time intervals during which the first mobile terminal has been granted the non-exclusive right to use the second set of resource blocks to transmit uplink data to the wireless base station. In some embodiments, step 326 includes one or more sub-steps 328, 330, 332, 334, 336, 338, 340, 342, and 344. Step 326 is continued from FIG. 3B onto FIG. 3C in box 326'.

In sub-step 328, in response to receiving the instruction to not transmit uplink data on every recurrence of the second set of resource blocks, the first mobile terminal transmits uplink data on at least one recurrence of the second set of resource blocks but refrains from transmitting uplink data on all recurrences of the second set of resource blocks (e.g., the first mobile terminal transmits uplink data during one or more of the multiple time intervals of the first period of time during which the first mobile terminal has been granted the non-exclusive right to use the second set of resource blocks to transmit uplink data to the wireless base station.

In sub-step 330, in response to receiving the instruction to not transmit uplink data on ever recurrence of the second set of resource blocks, the first mobile terminal selects one or more recurrences of the second set of resource blocks to transmit uplink data using statistically generated data on when another mobile terminal, e.g., the second mobile terminal, will transmit uplink data using the second set of resource blocks.

In sub-step 332, in response to receiving the instruction to not transmit uplink data on every recurrence of the second set of resource blocks, the first mobile terminal randomly selects recurrences of the second set of resource blocks to transmit uplink data during the first period of time (e.g., randomly selecting which of the multiple time intervals of the first period of time to use to transmit uplink data to the wireless base station).

In sub-step 334, the first mobile terminal measures and/or determines a Reference Signal Received Power (RSRP) value for each resource block in the second set of resource blocks whenever the first mobile terminal transmits uplink data to the wireless base station using the second set of resource blocks.

In sub-step 336, the first mobile terminal measures and/or determines a Received Signal Strength Indicator value for each resource block in the second set of resource blocks whenever the first mobile terminal transmits uplink data to the wireless base station using the second setoff resource blocks.

In sub-step 338, the first mobile terminal determines Received Signal Strength Indicator (RSSI) average value (e.g., a moving average value) for each resource block in the second set of resource blocks.

In sub-step 340, the first mobile terminal determines a Reference Signal Received Power average value (e.g., a moving average value) for each resource block in the second set of resource blocks.

In sub-step 342, the first mobile terminal determines a RSRP standard deviation value for each resource block in the second set of resource blocks.

In sub-step 344, the first mobile terminal stores one or more of the following in memory: RSRP values for each resource block, RSRP average value for each resource block, RSRP standard deviation for each resource block, RSSI value for each resource block, RSSI average value for each resource block.

In some embodiments, one or more sub-steps 328, 330 and 332 are implemented as a general procedure and regardless of whether or not an instruction to not transmit uplink data on every recurrence of the second set of resource blocks is received by the first mobile terminal.

Operation proceeds from step 326 via connection node B 346 to step 348 shown on FIG. 3D. In step 348, upon receiving a NACK message or signal, by the first mobile terminal, in response to an uplink data transmission using the one or more of the resource blocks of the second set of resource blocks during the first period of time, the first mobile terminal makes a determination as to whether or not the NACK message or signal resulted from uplink channel conditions, e.g., poor uplink channel conditions which may be due to a variety of factors such as velocity of the first mobile terminal (direction and speed of the first mobile terminal), location of the mobile terminal (e.g., mobile terminal is in a city with building interfering with transmission), co-channel interference from other devices, adjacent channel interference from other devices, electromagnetic interference, etc. In some embodiments, step 348 includes one or more sub-steps 350, 352, 354, 356, 358, and 360.

In sub-step 350, the first mobile terminal performs one or more checks and/or tests to determine if the received NACK was a result of uplink channel conditions and if the test(s) and/or check(s) do not indicate that the NACK message or signal resulted from uplink channel conditions, the first mobile terminal determines that the NACk did not result from uplink channel conditions. In some embodiments upon determining that the NACK did not result from uplink channel conditions, the first mobile terminal determines instead that the NACK resulted from a collision, i.e., more than one wireless device transmitting at the same time using the same resource block(s).

In sub-step 352, the first mobile terminal makes said determination as to whether or not the received NACK message or signal resulted from uplink channel conditions based on Reference Signal Received Power (RSRP) measurements and/or RSSI measurements of one or more resource blocks in the second set of resource blocks used to transmit the uplink data corresponding to the received NACK message or signal.

In sub-step 354, the first mobile terminal determines that the received NACK resulted from uplink channel conditions when the RSSI measurements of one or more resource blocks in the second set of resource blocks used to transmit the uplink data corresponding to the received NACK message or signal is greater than or exceeds an RSSI threshold value. In some embodiments, the RSSI threshold value is based on an RSSI average value(s) for one or more of the RSSI resource blocks. In some embodiments, a single resource block is used and the RSSI threshold is based on the RSSI average value for the particular resource block. In some embodiments, the RSSI threshold value is a value greater than an RSSI average value generated by the first mobile terminal using RSSI measurements of the one or more resource blocks in the second set of resource blocks when uplink data was successfully transmitted from the first mobile terminal to the wireless base station using the one or more resource blocks in the second set of resource blocks.

In sub-step 356, the first mobile terminal makes the determination that the NACK message or signal resulted from uplink channel conditions when the Reference Signal Received Power (RSRP) measurements of one or more resource blocks in the second set of resource blocks used to transmit the uplink data corresponding to the received NACK has a value which is less than a RSRP threshold value.

In sub-step 358, the first mobile terminal determines whether a RSRP value for one or more resource blocks measured during the uplink data transmission for which the NACK was received has a value which is less than (K multiplied by the RSRP average value for the resource block multiplied by the RSRP standard deviation for the resource block), where K is a number having a value greater than 1.

In sub-step 360, the first mobile terminal makes the determination that the NACK message or signal resulted from uplink channel conditions when the RSRP value for one or more resource blocks in the second set of resource blocks measured during the uplink data transmission and used to transmit the uplink data corresponding to the received NACK has a value which is less than (K multiplied by the RSRP average value for the resource block multiplied by the RSRP standard deviation for the resource block), where K is a value greater than 1. In some embodiments, K is a value 1, 1.2, or 3. In some embodiments, the value of K is based on the location of the first mobile terminal.

In some embodiments in steps 348 and/or one or more sub-steps 350, 352, 354, 356, 358, and 360, the one or more resource blocks is a plurality of resource blocks. In some embodiments, the one or more resource blocks is all resource blocks which were used to transmit the uplink data corresponding to the received NACK. In some embodiments, the reference signal used for RSRP and/or RSSI is the Sounding Reference Signal.

Operation proceeds from step 348 via connection node C 362 to step 364 shown on FIG. 3E.

In step 364, when the first mobile terminal makes the determination that the NACK message or signal received in response to the uplink data transmission is the result of uplink channel conditions, the first mobile terminal continues to use the second set of resource blocks to transmit uplink data to the wireless base station in the same manner as before the NACK message or signal was received without taking a mitigation action to reduce the probability of a future collision when using the second set of resource blocks to transmit data.

Operation proceeds from step 364 to step 366. In step 366, when the first mobile terminal makes the determination that the NACK message or signal received in response to the uplink data transmission is not the result of uplink channel conditions, the first mobile terminal takes a mitigation action, e.g., a data collision mitigation action, to reduce the probability of a future collision when using the second set of resource blocks to transmit data. In some embodiments, step 366 includes one or more sub-steps 368 and 370.

In sub-step 368, the first mobile terminal ceases to use the second set of resource blocks to transmit uplink data to the wireless base station for a random amount of time. The random amount of time being less than the first period of time.

In sub-step 370, the first mobile terminal logs the NACK message or signal as collision related and updates statistics stored in memory regarding which resource blocks of the second set of resource blocks had a collision and during which time interval of the multiple time intervals during the first period of time. The first mobile terminal then using the statistics to determine when, e.g., which recurring time intervals, to use the second set of resource blocks to transmit uplink data to the wireless base station to reduce the probability of a collision with another mobile terminal or wireless device also attempting to use the second set of resource blocks to transmit uplink data to the wireless base station.

Operation proceeds from step 366 to step 372 where the first and second mobile terminals continue to transmit uplink data to the wireless base station using the uplink resources granted to them.

In some embodiments, the first mobile terminal monitors the ACK and NACK messages received from the wireless base station in response to data transmission attempts using the second set of resource blocks and adjusts the frequency of data transmission attempts using the second set of resource blocks to minimize collisions with data transmission from the second mobile terminal which is also using the second set of resource blocks. In some embodiments, the first mobile terminal in addition to or in place of adjusting the frequency of data transmission attempts changes the recurring time intervals during a period of time during which the first mobile terminal sends data to the wireless base station using the second set of resource blocks.

In some embodiments, the wireless base station generates from information obtained over the first period of time by the wireless base station, a wireless device profile for each of the individual wireless devices, e.g., mobile terminal 1 and mobile terminal 2, connected to the wireless base station, each of said wireless device profiles including a wireless device identifier which identifies the wireless device to which the wireless device profile corresponds, the resource grants to the wireless device and the utilization of wireless device resource grants during the first time period. The wireless base station then adjusts the uplink resource grants to the wireless devices, e.g., mobile terminal 1 and mobile terminal 2, connected to the wireless base station in view of the uplink resource utilization of the wireless devices during the first period of time as was previously done during the second period of time which occurred before the first period of time. The adjusted uplink resource grants are then communicated to the wireless devices connected to the wireless base station, e.g., mobile terminals 1 and 2. In some embodiments, the adjusted uplink resource grants are generated as part of generating new or updated resource grant schedule for the wireless devices. In some such embodiments, the adjusted uplink resource grants are communicated to the wireless devices, e.g., MT 1 and MT 2, as part of communicating new or updated resource grant schedules to the wireless devices connected and/or attached to the wireless base station.

In some embodiments in step 348 instead of determining whether or not the NACK message or signal resulted from uplink channel conditions, the first mobile terminal determines whether or not the NACK message or signal resulted from the simultaneously uplink data transmissions by multiple wireless devices using the same resources, e.g., PRB(s). In such embodiments, the steps 364 and 366 would also be modified. Step 364 would be modified to: when the first mobile terminal makes the determination that the NACK message or signal received in response to the uplink data transmission is not the result of multiple simultaneous transmission using the same resources, the first mobile terminal continues to use the second set of resource blocks to transmit uplink data to the wireless base station in the same manner as before the NACK message or signal was received. The first mobile terminal in response to such a determination would not take or would refrain from taking a mitigation action to reduce the probability of a future collision when using the second set of resource blocks to transmit data.

Step 366 would be modified to be when the first mobile terminal makes the determination that the NACK message or signal received in response to the uplink data transmission is the result of multiple wireless devices simultaneously transmitting data using the resources, e.g., resource blocks, the first mobile terminal takes a mitigation action to reduce the probability of a future collision when using the second set of resource blocks to transmit data. In some such embodiments step 366 would still include one or more sub-steps 368 and 370.

In various embodiments of the method 300, the resource blocks of the first and second uplink resource grants are physical resource blocks. In some embodiments, the first mobile terminal and the second mobile terminal communicate using the 5G New Radio protocol. In most embodiments, the first and second uplink resource grants are pro-active resource grants. In some embodiments, the wireless base station is a CBSD and the first and second mobile terminals are CBRS mobile terminals.

The various methods and apparatus described above including the method 300 illustrated in FIG. 3 and the method 2000 illustrated in FIG. 2 provide technological solutions of how a wireless base station can effectively and efficiently manage uplink data transmission grants, e.g., proactive grants, to wireless devices, e.g., mobile terminals, in a wireless network thereby increasing uplink data transmission resource utilization as well as how the wireless devices can minimize or reduce data transmission failures resulting from collisions when multiple devices attempt to use the same shared resources at the same time. The various embodiments described in connection with method 2000 and method 300 also provide new and novel methods for sharing uplink data transmission resource grants, e.g., pro-active grants, in 5G and/or CBRS fixed wireless access systems including wireless devices and/or mobile terminals. The methods and apparatus discussed above also provides new and/or improved methods for sharing uplink grant and data transmission information and resources among wireless devices through a wireless base station.

In some embodiments, the information in the tables 1200 and 1300 are stored in the memory of the wireless base station, e.g., non-volatile memory so that the information is not lost upon a power failure or a reset of the wireless base station. In some embodiments, the information in the tables 600, 900, and 1000 are stored in memory of a wireless device, e.g., a mobile terminal, e.g., non-volatile memory so that the information is not lost upon a power failure or a reset of the wireless device.

Various exemplary numbered embodiments illustrating different features of the present invention will now be discussed.

LIST OF EXEMPLARY NUMBERED METHOD EMBODIMENTS

Method Embodiment 1. A communications method, the method comprising: receiving, by a first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis; using, by the first mobile terminal, the first set of resource blocks to transmit uplink data to the wireless base station during a first period of time; and using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station. (E.g., using the second set of resource blocks at least once during the first period of time, the second set of resource blocks recurring multiple times during the first period of time, for example the second set of resource blocks are available for use four times during the first period of time and the first mobile terminal uses the second set of resources blocks to transmit uplink data at least once out of the four times the second set of resource blocks are available for use during the first period of time).

Method Embodiment 1A. The method of Method Embodiment 1, wherein the resource blocks are physical resource blocks.

Method Embodiment 1AA. The method of Method Embodiment 1, wherein the first uplink resource grant schedule is derived from or included in downlink control information received from the wireless base station over a Physical Downlink Shared Control Channel.

Method Embodiment 1AAA. The communications method of Method Embodiment 1, wherein the first mobile terminal and the wireless base station are part of a Citizens Broadband Radio Service network; and said wireless base station is a Citizens Broadband Radio Service Device (CBSD).

Method Embodiment 1AAAA. The communications method of Method Embodiment 1, wherein the first mobile terminal and wireless base station communicate using the 5G New Radio wireless protocol.

Method Embodiment 1B. The communications method of Method Embodiment 1, wherein the first uplink resource grant and the second uplink resource grant are proactive uplink resource grants.

Method Embodiment 2. The method of Method Embodiment 1, wherein the first set of resource blocks includes one or more resource blocks; and wherein the second set of resource blocks includes one or more resource blocks which are different from the resource blocks in said first set of resource blocks.

Method Embodiment 3. The method of Method Embodiment 2, wherein the second set of resource blocks are resource blocks also granted to a second mobile terminal for use in communicating uplink data to the wireless base station during the first period of time; and wherein the method further comprising: receiving, by the first mobile terminal from the wireless base station in connection with the first uplink resource grant schedule, an instruction to not transmit uplink data on every recurrence of the second set of resource blocks.

Method Embodiment 3A. The method of Method Embodiment 3 further comprising: in response to receiving the instruction to not transmit uplink data on every recurrence of the second set of resource blocks refraining from transmitting uplink data on every recurrence of the second set of resource blocks.

Method Embodiment 3B. The method of Method Embodiment 3 further comprising: in response to receiving the instruction to not transmit uplink data on every recurrence of the second set of resource blocks selecting one or more recurrences of the second set of resource blocks to transmit uplink data using statistically generated data on when the second mobile terminal will transmit uplink data using the second set of resource blocks.

Method Embodiment 3C. The method of Method Embodiment 3 further comprising: in response to receiving the instruction to not transmit uplink data on every recurrence of the second set of resource blocks randomly selecting recurrences of the second set of resource blocks to transmit uplink data during the first period of time.

Method Embodiment 3CC. The method of Method Embodiment 3C, wherein said random selection is based on an output of a random number generator included in the first mobile terminal that generates numbers between 0 and 1 using a gaussian distribution; wherein for each recurrence of the second set of resource blocks during the second period of time the first mobile terminal generates a random number between 0 and 1 and when the random generated number is less than 0.5, the first mobile terminal refrains from transmitting uplink data using the second set of resource blocks, and when the random number generated is equal to or greater than 0.5 the first mobile terminal transmits uplink data using the second set of resource blocks.

Method Embodiment 4. The method of Method Embodiment 3, wherein said second set of resource blocks were granted to the second mobile device for the exclusive use of the second mobile terminal during a second period of time but were not used or had low usage by the second mobile terminal during the second period of time, said second period of time occurring prior to the first period of time.

Method Embodiment 4A. The method of Method Embodiment 4, further comprising: operating the wireless base station to generate the first uplink resource grant schedule based on first resource utilization information about utilization of said first set of resource blocks by the first mobile terminal during the second period of time and second resource utilization information about the utilization of said second set of resource blocks by the second mobile terminal during the second period of time; and wherein said first set of resource blocks are granted to the first mobile terminal for the first mobile terminal's exclusive use to transmit uplink data to the wireless base station during the second period of time.

Method Embodiment 4B. The method of Method Embodiment 4A, wherein the first resource utilization information indicates: when the resource blocks granted to the first mobile terminal were used during the second period of time, a portion or amount of the first set of resource blocks that were used during the second period of time (e.g., whether they were fully used or only a portion was used to transmit data—this information can be indicated as a utilization portion with a 1 indicating full utilization or a fraction indicating less than full utilization).

Method Embodiment 4BB. The method of Method Embodiment 4B, wherein the second resource utilization information indicates, when the resource blocks granted to the second mobile terminal were used during the second period of time, a portion or an amount of the second set of resource blocks that were used during the second period of time (e.g., whether they were fully used or only a portion was used to transmit data—this information can be indicated as a utilization portion with a 1 indicating full utilization or a fraction indicating less than full utilization).

Method Embodiment 4C. The method of Method Embodiment 4BB, wherein the wireless base station generates the first resource utilization information and the second resource utilization information.

Method Embodiment 4D. The method of Method Embodiment 4BB, wherein the first resource utilization information indicates that all resource blocks granted to the first mobile terminal during the second period of time were used for transmitting uplink data from the first mobile device to the wireless base station; and wherein the second resource utilization information indicates that no or low utilization of the resource blocks granted to the second mobile terminal to transmit uplink data from the second mobile terminal to the wireless base station during the second period of time.

Method Embodiment 5. The method of Method Embodiment 1 further comprising: upon receiving a NACK by the first mobile terminal in response to an uplink data transmission using one or more of the resource blocks of the second set of resource blocks during the first period of time, making a determination, by the first mobile terminal, as to whether or not the NACK resulted from uplink channel conditions.

Method Embodiment 6. The method of Method Embodiment 1 further comprising: upon receiving a NACK by the first mobile terminal in response to an uplink data transmission using one or more of the resource blocks of the second set of resource blocks during the first period of time, making a determination, by the first mobile terminal, as to whether or not the NACK resulted from multiple mobile terminals simultaneously transmitting uplink data using one or more of the same resource blocks of the second set of resource blocks.

Method Embodiment 7. The method of Method Embodiment 5, wherein said determination, by the first mobile terminal, as to whether the NACK resulted from uplink channel conditions is based on Reference Signal Received Power (RSRP) measurements of one or more resource blocks in the second set of resource blocks used to transmit the uplink data corresponding to the received NACK.

Method Embodiment 7A. The method of Method Embodiment 7, wherein the reference signal is a Sounding Reference Signal.

Method Embodiment 8. The method of Method Embodiment 5, wherein said determination, by the first mobile terminal, as to whether the NACK resulted from uplink channel conditions is based on Reference Signal Strength Indicator (RSSI) measurements of one or more resource blocks in the second set of resource blocks used to transmit the uplink data corresponding to the received NACK.

Method Embodiment 8A. The method of Method Embodiment 8, wherein the RSSI measurements are RSSI measurements of a Sounding Reference Signal or another reference signal generated by a mobile terminal during transmission to a mobile base station.

Method Embodiment 8B. The method of Method Embodiment 8, wherein said first mobile terminal determines that the NACK resulted from uplink channel conditions when the RSSI measurements of one or more resource blocks in the second set of resource blocks used to transmit the uplink data corresponding to the received NACK is greater than an RSSI threshold value.

Method Embodiment 8C. The method of Method Embodiment 8B, wherein the RSSI threshold value is a value greater than an RSSI average value generated by the first mobile terminal using RSSI measurements of the one or more resource blocks in the second set of resource blocks when uplink data was successfully transmitted from the first mobile terminal to the wireless base station using the one or more resource blocks in the second set of resource blocks.

Method Embodiment 9. The method of Method Embodiment 5 further comprising: measuring, by the first mobile terminal, a Reference Signal Received Power (RSRP) value for at least one resource block in the second set of resource blocks whenever the first mobile terminal transmits uplink data to the wireless base station; determining a moving average RSRP value as each RSRP value of the at least one resource block in the second set of resource blocks is measured; and determining a RSRP standard deviation for the measured RSRP values.

Method Embodiment 10. The method of Method Embodiment 9, wherein said making a determination, by the first mobile terminal, as to whether the NACK resulted from uplink channel conditions includes determining whether a RSRP value for the at least one resource block in the second set of resource blocks measured during the uplink data transmission for which the NACK was received has a value which is less than K multiplied by the moving average RSRP value multiplied by the RSRP standard deviation value, where K is a value greater than 1. The moving average RSRP value and the RSRP standard deviation value being for the resource block for which the RSRP value was measured.

Method Embodiment 10A. The method of Method Embodiment 10, wherein the value of K is based on the location of the first mobile terminal.

Method Embodiment 10B. The method of Method Embodiment 10, wherein K is equal to 1.2.

Method Embodiment 10C. The method of Method Embodiment 10, wherein K is equal to 2.

Method Embodiment 10D. The method of Method Embodiment 10, wherein K is equal to 3.

Method Embodiment 11. The method of Method Embodiment 5, further comprising: when the first mobile terminal makes the determination that the NACK received in response to the uplink data transmission is the result of uplink channel conditions, the first mobile terminal continues to use the second set of resource blocks to transmit uplink data to the wireless base station.

Method Embodiment 11A. The method of Method Embodiment 5, further comprising: when the first mobile terminal makes the determination that the NACK received in response to the uplink data transmission is the result of uplink channel conditions, the first mobile terminal continues to use the second set of resource blocks to transmit uplink data to the wireless base station without taking a data collision mitigation action.

Method Embodiment 12. The method of Method Embodiment 11, further comprising: when the first mobile terminal makes the determination that the NACK received in response to the uplink data transmission is not the result of uplink channel conditions, the first mobile terminal ceases to use the second set of resource blocks to transmit uplink data to the wireless base station for a random amount of time, said random amount of time being less than the first period of time.

Method Embodiment 12A. The method of Method Embodiment 11, further comprising: when the first mobile terminal makes the determination that the NACK received in response to the uplink data transmission is not the result of uplink channel conditions, the first mobile terminal takes or performs a data collision mitigation action to reduce the probability that its transmissions using the second set of resource blocks will result in a data collision with another device's use of the second set of resource blocks. For example, the first mobile terminal may, and in some embodiments does, make a change to when the first mobile terminal transmits uplink data to the wireless base station using the second set of resource blocks based on statistics its generates as to when collisions are occurring during transmissions using the second set of resource blocks. In some embodiments, the data collision mitigation action is to cease using the second set of resource blocks and to switch to another set of resource blocks to transmit uplink data. In some embodiments, the data collision mitigation action is to reduce the number of data transmission the first mobile terminal makes during a period of time using the second set of uplink resource blocks.

Method Embodiment 13. The method of Method Embodiment 6, further comprising: when the first mobile terminal makes the determination that the NACK received in response to the uplink data transmission resulted from multiple mobile terminals simultaneously transmitting uplink data using one or more of the same resource blocks, the first mobile terminal ceases to use the second set of resource blocks to transmit uplink data to the wireless base station for a random amount of time, said random amount of time being less than the first period of time.

Method Embodiment 13A. The method of Method Embodiment 6, further comprising: when the first mobile terminal makes the determination that the NACK received in response to the uplink data transmission resulted from multiple mobile terminals simultaneously transmitting uplink data using one or more of the same resource blocks, the first mobile terminal takes a mitigation action to reduce the probability of multiple mobile terminals simultaneously transmitting uplink data using or more of the same resource blocks of the second set of resource blocks.

Method Embodiment 14. The method of Method Embodiment 6, further comprising: when the first mobile terminal makes the determination that the NACK received in response to the uplink data transmission did not result from multiple mobile terminals simultaneously transmitting uplink data using one or more of the same resource blocks, the first mobile terminal continues to use the second set of resource blocks to transmit uplink data to the wireless base station.

LIST OF EXEMPLARY NUMBERED SYSTEM EMBODIMENTS

System Embodiment 1. A wireless communications system comprising: a first mobile terminal, said first mobile terminal including: a memory; and a first processor, said first processor controlling the first mobile terminal to perform the following operations: receive, by the first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis; use, by the first mobile terminal, the first set of resource blocks to transmit uplink data to the wireless base station during a first period of time; and use, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station.

System Embodiment 1A. The communications system of System Embodiment 1, wherein the resource blocks are physical resource blocks.

System Embodiment 1AA. The communications system of System Embodiment 1, wherein the first uplink resource grant schedule is derived from or included in downlink control information received from the wireless base station over a Physical Downlink Shared Control Channel.

System Embodiment 1AAA. The communications system of System Embodiment 1, wherein the first mobile terminal and the wireless base station are part of a Citizens Broadband Radio Service network; and said wireless base station is a Citizens Broadband Radio Service Device (CBSD).

System Embodiment 1AAAA. The communications system of System Embodiment 1, wherein the first mobile terminal and wireless base station communicate using the 5G New Radio wireless protocol.

System Embodiment 1B. The communications system of System Embodiment 1, wherein the first uplink resource grant and the second uplink resource grant are proactive uplink resource grants.

System Embodiment 2. The communications system of System Embodiment 1, wherein the first set of resource blocks includes one or more resource blocks; and wherein the second set of resource blocks includes one or more resource blocks which are different from the resource blocks in said first set of resource blocks.

System Embodiment 3. The communications system of System Embodiment 2, wherein the second set of resource blocks are resource blocks also granted to a second mobile terminal for use in communicating uplink data to the wireless base station during the first period of time; and wherein the first processor further controls the first mobile terminal to perform the following additional operation: receive, by the first mobile terminal from the wireless base station in connection with the first uplink resource grant schedule, an instruction to not transmit uplink data on every recurrence of the second set of resource blocks.

System Embodiment 3A. The communications system of System Embodiment 3, wherein in response to receiving the instruction to not transmit uplink data on every recurrence of the second set of resource blocks, the first processor further controls the first mobile terminal to: refrain from transmitting uplink data on every recurrence of the second set of resource blocks.

System Embodiment 3B. The communications system of System Embodiment 3, wherein in response to receiving the instruction to not transmit uplink data on every recurrence of the second set of resource blocks, the first processor further controls the first mobile terminal to select one or more recurrences of the second set of resource blocks to transmit uplink data using statistically generated data on when the second mobile terminal will transmit uplink data using the second set of resource blocks.

System Embodiment 3C. The communications system of System Embodiment 3, wherein in response to receiving the instruction to not transmit uplink data on every recurrence of the second set of resource blocks, the first processor further controls the first mobile terminal to: randomly select recurrences of the second set of resource blocks to transmit uplink data during the first period of time.

System Embodiment 3CC. The communications system of System Embodiment 3C, wherein said random selection is based on an output of a random number generator included in the first mobile terminal that generates numbers between 0 and 1 using a gaussian distribution; wherein for each recurrence of the second set of resource blocks during the second period of time the first mobile terminal generates a random number between 0 and 1 and when the random generated number is less than 0.5, the first mobile terminal refrains from transmitting uplink data using the second set of resource blocks, and when the random number generated is equal to or greater than 0.5 the first mobile terminal transmits uplink data using the second set of resource blocks.

System Embodiment 4. The communications of System Embodiment 3, wherein said second set of resource blocks were granted to the second mobile device for the exclusive use of the second mobile terminal during a second period of time but were not used or had low usage by the second mobile terminal during the second period of time, said second period of time occurring prior to the first period of time.

System Embodiment 4A. The communications system of System Embodiment 4, wherein the wireless base station including a second processor, said second processor controlling the wireless base station to perform the following operations: to generate the first uplink resource grant schedule based on first resource utilization information about utilization of said first set of resource blocks by the first mobile terminal during the second period of time and second resource utilization information about the utilization of said second set of resource blocks by the second mobile terminal during the second period of time; and wherein said first set of resource blocks are granted to the first mobile terminal for the first mobile terminal's exclusive use to transmit uplink data to the wireless base station during the second period of time.

System Embodiment 4B. The communications system of System Embodiment 4A, wherein the first resource utilization information indicates: when the resource blocks granted to the first mobile terminal were used during the second period of time, a portion or amount of the first set of resource blocks that were used during the second period of time (e.g., whether they were fully used or only a portion was used to transmit data—this information can be indicated as a utilization portion with a 1 indicating full utilization or a fraction indicating less than full utilization).

System Embodiment 4BB. The communications system of System Embodiment 4B, wherein the second resource utilization information indicates, when the resource blocks granted to the second mobile terminal were used during the second period of time, a portion or an amount of the second set of resource blocks that were used during the second period of time (e.g., whether they were fully used or only a portion was used to transmit data—this information can be indicated as a utilization portion with a 1 indicating full utilization or a fraction indicating less than full utilization).

System Embodiment 4C. The communications system of System Embodiment 4BB, wherein the wireless base station generates the first resource utilization information and the second resource utilization information.

System Embodiment 4D. The communications system of System Embodiment 4BB, wherein the first resource utilization information indicates that all resource blocks granted to the first mobile terminal during the second period of time were used for transmitting uplink data from the first mobile device to the wireless base station; and wherein the second resource utilization information indicates that no or low utilization of the resource blocks granted to the second mobile terminal to transmit uplink data from the second mobile terminal to the wireless base station during the second period of time.

System Embodiment 5. The communications system of System Embodiment 1, wherein upon receiving a NACK by the first mobile terminal in response to an uplink data transmission using one or more of the resource blocks of the second set of resource blocks during the first period of time, the first processor further controls the first mobile terminal to make a determination as to whether or not the NACK resulted from uplink channel conditions.

System Embodiment 6. The communications system of System Embodiment 1, wherein upon receiving a NACK by the first mobile terminal in response to an uplink data transmission using one or more of the resource blocks of the second set of resource blocks during the first period of time, the first processor further controls the first mobile terminal to make a determination as to whether or not the NACK resulted from multiple mobile terminals simultaneously transmitting uplink data using one or more of the same resource blocks of the second set of resource blocks.

System Embodiment 7. The communications system of System Embodiment 5, wherein said determination as to whether the NACK resulted from uplink channel conditions is based on Reference Signal Received Power (RSRP) measurements of one or more resource blocks in the second set of resource blocks used to transmit the uplink data corresponding to the received NACK.

System Embodiment 7A. The communications system of System Embodiment 7, wherein the reference signal is a Sounding Reference Signal.

System Embodiment 8. The communication system of System Embodiment 5, wherein said determination as to whether the NACK resulted from uplink channel conditions is based on Reference Signal Strength Indicator (RSSI) measurements of one or more resource blocks in the second set of resource blocks used to transmit the uplink data corresponding to the received NACK.

System Embodiment 8A. The communications system of System Embodiment 8, wherein the RSSI measurements are RSSI measurements of a Sounding Reference Signal.

System Embodiment 8B. The communications system of System Embodiment 8, wherein said first mobile terminal determines that the NACK resulted from uplink channel conditions when the RSSI measurements of one or more resource blocks in the second set of resource blocks used to transmit the uplink data corresponding to the received NACK is greater than an RSSI threshold value.

System Embodiment 8C. The communications system of System Embodiment 8B, wherein the RSSI threshold value is a value greater than an RSSI average value generated by the first mobile terminal using RSSI measurements of the one or more resource blocks in the second set of resource blocks when uplink data was successfully transmitted from the first mobile terminal to the wireless base station using the one or more resource blocks in the second set of resource blocks.

System Embodiment 9. The communications system of System Embodiment 5, wherein the first processor further controls the first mobile terminal to perform the following additional operations: measure a Reference Signal Received Power (RSRP) value for at least one resource block in the second set of resource blocks whenever the first mobile terminal transmits uplink data to the wireless base station; determine a moving average RSRP value as each RSRP value of the at least one resource block in the second set of resource blocks is measured; and determine a RSRP standard deviation for the measured RSRP values.

System Embodiment 10. The communications system of System Embodiment 9, wherein said make a determination as to whether the NACK resulted from uplink channel conditions includes: determining whether a RSRP value for the at least one resource block in the second set of resource blocks measured during the uplink data transmission for which the NACK was received has a value which is less than K multiplied by the moving average RSRP value multiplied by the RSRP standard deviation, where K is value greater than 1. The moving average RSRP value being a mean RSRP value. The moving average RSRP value and RSRP standard deviation being for the at least one resource block in the second set of resource blocks to which the measured RSRP value corresponds.

System Embodiment 10A. The communications system of System Embodiment 10, wherein the value of K is based on the location of the first mobile terminal.

System Embodiment 10B. The communications system of System Embodiment 10, wherein K is equal to 1.2.

System Embodiment 10C. The communications system of System Embodiment 10, wherein K is equal to 2.

System Embodiment 10D. The communications system of System Embodiment 10, wherein K is equal to 3.

System Embodiment 11. The communications system of System Embodiment 5, wherein when the first mobile terminal makes the determination that the NACK received in response to the uplink data transmission is the result of uplink channel conditions, the first mobile terminal continues to use the second set of resource blocks to transmit uplink data to the wireless base station.

System Embodiment 12. The communications system of System Embodiment 11, wherein when the first mobile terminal makes the determination that the NACK received in response to the uplink data transmission is not the result of uplink channel conditions, the first mobile terminal ceases to use the second set of resource blocks to transmit uplink data to the wireless base station for a random amount of time, said random amount of time being less than the first period of time.

System Embodiment 13. The communications system of System Embodiment 6, wherein when the first mobile terminal makes the determination that the NACK received in response to the uplink data transmission resulted from multiple mobile terminals simultaneously transmitting uplink data using one or more of the same resource blocks, the first mobile terminal ceases to use the second set of resource blocks to transmit uplink data to the wireless base station for a random amount of time, said random amount of time being less than the first period of time.

System Embodiment 14. The communications system of System Embodiment 6, wherein when the first mobile terminal makes the determination that the NACK received in response to the uplink data transmission did not result from multiple mobile terminals simultaneously transmitting uplink data using one or more of the same resource blocks, the first mobile terminal continues to use the second set of resource blocks to transmit uplink data to the wireless base station.

LIST OF EXEMPLARY NUMBERED NON-TRANSITORY COMPUTER READABLE MEDIUM EMBODIMENTS

Non-transitory Computer Readable Medium Embodiment 1. A non-transitory computer readable medium including a first set of computer executable instructions which when executed by a processor of a first mobile terminal cause the first mobile terminal to perform the steps of: receiving, by a first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis; using, by the first mobile terminal, the first set of resource blocks to transmit uplink data to the wireless base station during a first period of time; and using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station.

Non-transitory Computer Readable Medium Embodiment 1A.

The non-transitory computer readable medium of Non-transitory Computer Readable Medium Embodiment 1, wherein the resource blocks are physical resource blocks.

Non-transitory Computer Readable Medium Embodiment 1AA. The non-transitory computer readable medium of Non-transitory Computer Readable Medium Embodiment 1, wherein the first uplink resource grant schedule is derived from or included in downlink control information received from the wireless base station over a Physical Downlink Shared Control Channel.

Non-transitory Computer Readable Medium Embodiment 1AAA. The non-transitory computer readable medium of Non-transitory Computer Readable Medium Embodiment 1, wherein the first mobile terminal and the wireless base station are part of a Citizens Broadband Radio Service network; and wherein said wireless base station is a Citizens Broadband Radio Service Device (CBSD).

Non-transitory Computer Readable Medium Embodiment 1AAAA. The non-transitory computer readable medium of Non-transitory Computer Readable Medium Embodiment 1, wherein the first mobile terminal and wireless base station communicate using the 5G New Radio wireless protocol.

Non-transitory Computer Readable Medium Embodiment 1B. The non-transitory computer readable medium of Non-transitory Computer Readable Medium Embodiment 1, wherein the first uplink resource grant and the second uplink resource grant are proactive uplink resource grants.

Non-transitory Computer Readable Medium Embodiment 2. The non-transitory computer readable medium of Non-transitory Computer Readable Medium Embodiment 1, wherein the first set of resource blocks includes one or more resource blocks; and wherein the second set of resource blocks includes one or more resource blocks which are different from the resource blocks in said first set of resource blocks.

Non-transitory Computer Readable Medium Embodiment 3. The non-transitory computer readable medium of Non-transitory Computer Readable Medium Embodiment 2, wherein the second set of resource blocks are resource blocks also granted to a second mobile terminal for use in communicating uplink data to the wireless base station during the first period of time; and wherein the non-transitory computer readable medium further includes instructions which when executed by the processor of the first mobile terminal cause the first mobile terminal to perform the following additional step of: receiving, by the first mobile terminal from the wireless base station in connection with the first uplink resource grant schedule, an instruction to not transmit uplink data on every recurrence of the second set of resource blocks.

Non-transitory Computer Readable Medium Embodiment 4. The non-transitory computer readable medium of Non-transitory Computer Readable Medium Embodiment 3, wherein said second set of resource blocks were granted to the second mobile device for the exclusive use of the second mobile terminal during a second period of time but were not used or had low usage by the second mobile terminal during the second period of time, said second period of time occurring prior to the first period of time.

The techniques of various embodiments may be implemented using software, hardware and/or a combination of software and hardware. Various embodiments are directed to apparatus, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements. Various embodiments are also directed to methods, e.g., method of controlling and/or operating wireless base stations, wireless devices, mobile terminals, sensors, vehicles, user equipment, CBSDs, CBRS tower base stations, CBRS CPE devices, SAS devices, user devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements described herein are implemented using one or more components to perform the steps corresponding to one or more methods, for example, ranking, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements are configured to perform the steps of the methods described as being performed by the wireless base stations, wireless devices, mobile terminals, sensors, vehicles, user equipment, CBSDs, CBRS tower base stations, CBRS CPE devices, SAS devices, user devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements, with a processor which includes a component corresponding to each of the steps of the various described methods performed by the device in which the processor is included. In some but not all embodiments a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, sensors, vehicles, user equipment, CBSDs, CBRS tower base stations, CBRS CPE devices, SAS devices, user devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, sensors, vehicles, user equipment, CBSDs, CBRS tower base stations, CBRS CPE devices, SAS devices, user devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   receiving, by a first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis;
   receiving, by the first mobile terminal from the wireless base station in connection with the first uplink resource grant schedule and prior to the first mobile terminal transmitting uplink data using resources of the second uplink resource grant, an instruction to not transmit uplink data on every recurrence of the second set of resource blocks;
   using, by the first mobile terminal, the first set of resource blocks to transmit uplink data to the wireless base station during a first period of time;
   using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station; and
   in response to receiving the instruction to not transmit uplink data on every recurrence of the second set of resource blocks, transmitting by the first mobile terminal uplink data on at least one recurrence of the second set of resource blocks but refraining from transmitting uplink data on all recurrences of the second set of resource blocks during the time in which the second uplink resource grant is in effect for the first mobile terminal.

2. The communications method of claim 1,
   wherein the first uplink resource grant and the second uplink resource grant are proactive uplink resource grants; and
   wherein the first mobile terminal remains silent and does not transmit using resources of the first uplink resource grant when the first mobile terminal does not have uplink data to transmit; and
   wherein the first mobile terminal remains silent and does not transmit using resources of the second uplink resource grant when the first mobile terminal does not have uplink data to transmit.

3. The method of claim 1,
   wherein the first set of resource blocks includes one or more resource blocks; and
   wherein the second set of resource blocks includes one or more resource blocks which are different from the resource blocks in said first set of resource blocks.

4. The method of claim 3,
   wherein the second set of resource blocks are resource blocks also granted to a second mobile terminal for use in communicating uplink data to the wireless base station during the first period of time; and
   wherein the method further comprises:
      in response to receiving the instruction to not transmit uplink data on every recurrence of the second set of resource blocks, randomly selecting by the first mobile terminal recurrences of the second set of resource blocks to transmit uplink data during the first period of time, said random selection being based on random numbers generated by the first mobile terminal.

5. The method of claim 4,
   wherein said second set of resource blocks were granted to the second mobile terminal for the exclusive use of the second mobile terminal during a second period of time but were not used or had low usage by the second mobile terminal during the second period of time, said second period of time occurring prior to the first period of time.

6. The method of claim 1, further comprising:
   receiving an ACK message from the wireless base station, by the first mobile terminal, in response to transmitting uplink data to the wireless base station using an occurrence of the second set of resource blocks; and
   in response to receiving the ACK message, increasing, by the first mobile terminal, the number of occurrences of the second set of resource blocks the first mobile terminal uses to transmit uplink data until said first mobile terminal receives a NACK message in response to the transmission of uplink data to the wireless base station using the second set of resource blocks.

7. The method of claim 6, further comprising:
   in response to receiving the NACK message in response to the transmission of uplink data to the wireless base station using the second set of resource blocks, determining, by the first mobile terminal, whether the NACK message resulted from uplink channel conditions or from multiple mobile terminals simultaneously transmitting uplink data using one or more of the same resource blocks of the second set of resource blocks during the first period of time;
   when the determination is that the NACK message resulted from uplink channel conditions, the first mobile terminal increases the number of occurrences of the second set of resource blocks the first mobile terminal uses to transmit uplink data until said first mobile terminal receives a NACK message in response to the transmission of uplink data to the wireless base station using the second set of resource blocks resulting from multiple mobile terminals simultaneously transmitting uplink data using one or more of the same resource blocks of the second set of resource blocks during the first period of time; and
   when the determination is that the NACK message resulted from multiple mobile terminals simultaneously transmitting uplink data using one or more of the same resource blocks of the second set of resource blocks during the first period of time, decreasing, by the first mobile terminal, the number of occurrences of the second set of resource blocks the first mobile terminal uses to transmit uplink data.

8. The method of claim 1, further comprising:

upon receiving a NACK by the first mobile terminal in response to an uplink data transmission using one or more of the resource blocks of the second set of resource blocks during the first period of time, making a determination, by the first mobile terminal, as to whether the NACK resulted from uplink channel conditions or the NACK resulted from multiple mobile terminals simultaneously transmitting uplink data using one or more of the same resource blocks of the second set of resource blocks during the first period of time.

9. The method of claim 8, wherein said determination, by the first mobile terminal, as to whether the NACK resulted from uplink channel conditions or the NACK resulted from multiple mobile terminals simultaneously transmitting uplink data using one or more of the same resource blocks of the second set of resource blocks during the first period of time, is based on Reference Signal Received Power (RSRP) measurements of one or more resource blocks in the second set of resource blocks used to transmit the uplink data corresponding to the received NACK, said Reference Signal Received Power (RSRP) measurements being for a Sounding Reference Signal generated by a second mobile terminal during transmission to the wireless base station, said second set of resource blocks being resource blocks also granted to the second mobile terminal for use in communicating uplink data to the wireless base station during the first period of time.

10. The method of claim 8, wherein said determination, by the first mobile terminal, as to whether the NACK resulted from uplink channel conditions or the NACK resulted from multiple mobile terminals simultaneously transmitting uplink data using one or more of the same resource blocks of the second set of resource blocks during the first period of time, is based on Reference Signal Strength Indicator (RSSI) measurements of one or more resource blocks in the second set of resource blocks used to transmit the uplink data corresponding to the received NACK; and wherein the RSSI measurements are RSSI measurements of a reference signal generated by a second mobile terminal during transmission to the wireless base station.

11. The method of claim 10, further comprising:

wherein the RSSI measurements are for Sounding Reference Signals generated by the second mobile terminal during transmission to the wireless base station.

12. The method of claim 9, further comprising:

when the first mobile terminal makes the determination that the NACK received in response to the uplink data transmission resulted from multiple mobile terminals simultaneously transmitting uplink data using one or more of the same resource blocks of the second set of resource blocks during the first period of time, the first mobile terminal takes a data collision mitigation action.

13. A wireless communications system comprising:

a first mobile terminal, said first mobile terminal including:
- a memory; and
- a first processor, said first processor controlling the first mobile terminal to perform the following operations:
  receiving, by the first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis;
  receiving, by the first mobile terminal from the wireless base station in connection with the first uplink resource grant schedule and prior to the first mobile terminal transmitting uplink data using resources of the second uplink resource grant, an instruction to not transmit uplink data on every recurrence of the second set of resource blocks;
  using, by the first mobile terminal, the first set of resource blocks to transmit uplink data to the wireless base station during a first period of time;
  using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station; and
  in response to receiving the instruction to not transmit uplink data on every recurrence of the second set of resource blocks, transmitting by the first mobile terminal uplink data on at least one recurrence of the second set of resource blocks but refraining from transmitting uplink data on all recurrences of the second set of resource blocks during the time in which the second uplink resource grant is in effect for the first mobile terminal.

14. The wireless communications system of claim 13, wherein the first uplink resource grant and the second uplink resource grant are proactive uplink resource grants.

15. The wireless communications system of claim 13, wherein the first set of resource blocks includes one or more resource blocks; and wherein the second set of resource blocks includes one or more resource blocks which are different from the resource blocks in said first set of resource blocks.

16. The wireless communications system of claim 15, wherein the second set of resource blocks are resource blocks also granted to a second mobile terminal for use in communicating uplink data to the wireless base station during the first period of time; and wherein the first processor further controls the first mobile terminal to perform the following additional operation:

in response to receiving the instruction to not transmit uplink data on every recurrence of the second set of resource blocks, randomly selecting recurrences of the second set of resource blocks to transmit uplink data during the first period of time, said random selection being based on random numbers generated by the first mobile terminal.

17. The wireless communications system of claim 16, wherein said second set of resource blocks were granted to the second mobile device for the exclusive use of the second mobile terminal during a second period of time but were not used or had low usage by the second mobile terminal during the second period of time, said second period of time occurring prior to the first period of time.

18. The wireless communications system of claim 13, wherein the first processor further controls the first mobile terminal to perform the following additional operations:

receiving an ACK message from the wireless base station, by the first mobile terminal, in response to transmitting uplink data to the wireless base station using an occurrence of the second set of resource blocks; and in response to receiving the ACK message, increasing, by the first mobile terminal, the number of occurrences of the second set of resource blocks the first mobile terminal uses to transmit uplink data until said first mobile terminal receives a NACK message in response to the transmission of uplink data to the wireless base station using the second set of resource blocks.

19. The wireless communications system of claim 18, wherein the first processor further controls the first mobile terminal to perform the following additional operation: in response to receiving the NACK message in response to the transmission of uplink data to the wireless base station using the second set of resource blocks, determining, by the first mobile terminal, whether the NACK message resulted from uplink channel conditions or from multiple mobile terminals simultaneously transmitting uplink data using one or more of the same resource blocks of the second set of resource blocks during the first period of time; and wherein said determination as to whether the NACK resulted from uplink channel conditions is based on Reference Signal Received Power (RSRP) measurements of one or more resource blocks in the second set of resource blocks used to transmit the uplink data corresponding to the received NACK, said RSRP measurements being for a Sounding Reference Signal transmitted by a mobile terminal different than the first mobile terminal while transmitting uplink data to the wireless base station.

20. A non-transitory computer readable medium including a first set of computer executable instructions which when executed by a processor of a first mobile terminal cause the first mobile terminal to perform the steps of:

receiving, by the first mobile terminal from a wireless base station, a first uplink resource grant schedule, said first uplink resource grant schedule including a first uplink resource grant and a second uplink resource grant, said first uplink resource grant giving the first mobile terminal an exclusive right to use a first set of resource blocks on a recurring basis and the second uplink resource grant giving the first mobile terminal a non-exclusive right to use a second set of resource blocks on a recurring basis;

receiving, by the first mobile terminal from the wireless base station in connection with the first uplink resource grant schedule and prior to the first mobile terminal transmitting uplink data using resources of the second uplink resource grant, an instruction to not transmit uplink data on every recurrence of the second set of resource blocks;

using, by the first mobile terminal, the first set of resource blocks to transmit uplink data to the wireless base station during a first period of time;

using, by the first mobile terminal, the second set of resource blocks to transmit uplink data to the wireless base station during at least a first time interval of the first period of time, said first period of time including multiple time intervals during which the first mobile terminal has been granted the non-exclusive right to use the second set of resource blocks to transmit uplink data to the wireless base station; and in response to receiving the instruction to not transmit uplink data on every recurrence of the second set of resource blocks, transmitting by the first mobile terminal uplink data on at least one recurrence of the second set of resource blocks but refraining from transmitting uplink data on all recurrences of the second set of resource blocks during the time in which the second uplink resource grant is in effect for the first mobile terminal.

* * * * *